United States Patent [19]
Tsurumi

[11] Patent Number: 5,915,122
[45] Date of Patent: Jun. 22, 1999

[54] ACTIVATION OF A MAGNETIC DISK APPARATUS

[75] Inventor: Hiroshi Tsurumi, Kawasaki, Japan

[73] Assignee: Fujitsu Limited, Kawasaki, Japan

[21] Appl. No.: 08/798,041

[22] Filed: Jan. 2, 1997

Related U.S. Application Data

[62] Division of application No. 08/658,299, Jun. 5, 1996, Pat. No. 5,675,816, which is a continuation of application No. 08/185,882, filed as application No. PCT/JP93/00703, May 26, 1993.

[30] Foreign Application Priority Data

| May 26, 1992 | [JP] | Japan | 4-133352 |
| May 26, 1992 | [JP] | Japan | 4-133353 |
| May 26, 1992 | [JP] | Japan | 4-133354 |
| May 26, 1992 | [JP] | Japan | 4-133355 |
| May 26, 1992 | [JP] | Japan | 4-133787 |
| May 26, 1992 | [JP] | Japan | 4-133872 |
| May 26, 1992 | [JP] | Japan | 4-133890 |
| May 26, 1992 | [JP] | Japan | 4-133891 |

[51] Int. Cl.$^6$ .................................................. G06F 1/26
[52] U.S. Cl. ........................ 395/750.07; 395/750.03; 711/101
[58] Field of Search ........................ 395/750.01, 750.03, 395/750.07, 750; 711/101

[56] References Cited

U.S. PATENT DOCUMENTS

| 4,233,666 | 11/1980 | Walberg et al. | 395/750 |
| 4,279,020 | 7/1981 | Christian et al. | |
| 4,312,035 | 1/1982 | Greene | 395/750 |
| 4,365,290 | 12/1982 | Nelms et al. | |
| 5,206,772 | 4/1993 | Hirano et al. | 360/98.01 |
| 5,317,752 | 5/1994 | Jewett et al. | |
| 5,325,488 | 6/1994 | Carteau et al. | |
| 5,341,493 | 8/1994 | Yanai et al. | |

FOREIGN PATENT DOCUMENTS

| 0-273322 | 7/1988 | European Pat. Off. |
| 59-191631 | 10/1984 | Japan |
| 61-97730 | 5/1986 | Japan |
| 4-78062 | 3/1992 | Japan |

Primary Examiner—Ayaz R. Sheikh
Assistant Examiner—Jeffrey K. Seto
Attorney, Agent, or Firm—Greer, Burns & Crain, Ltd.

[57] ABSTRACT

A magnetic disk apparatus which is used as a subsystem of a computer system, in particular a medium-sized computer system which uses commercial power and does not have its own backup power, provided with a plurality of directors (118), a plurality of magnetic disk modules (148) commonly accessed from the plurality of directors, a plurality of director batteries (114-m) for supplying power individually to the plurality of directors, magnetic disk module batteries (114-n) for supplying power to the magnetic disk modules, and a power controller (110) for independently controlling the supply of power from the plurality of director batteries and magnetic disk module batteries in accordance with the operating state of the plurality of directors and magnetic disk modules. (FIG. 1).

10 Claims, 62 Drawing Sheets

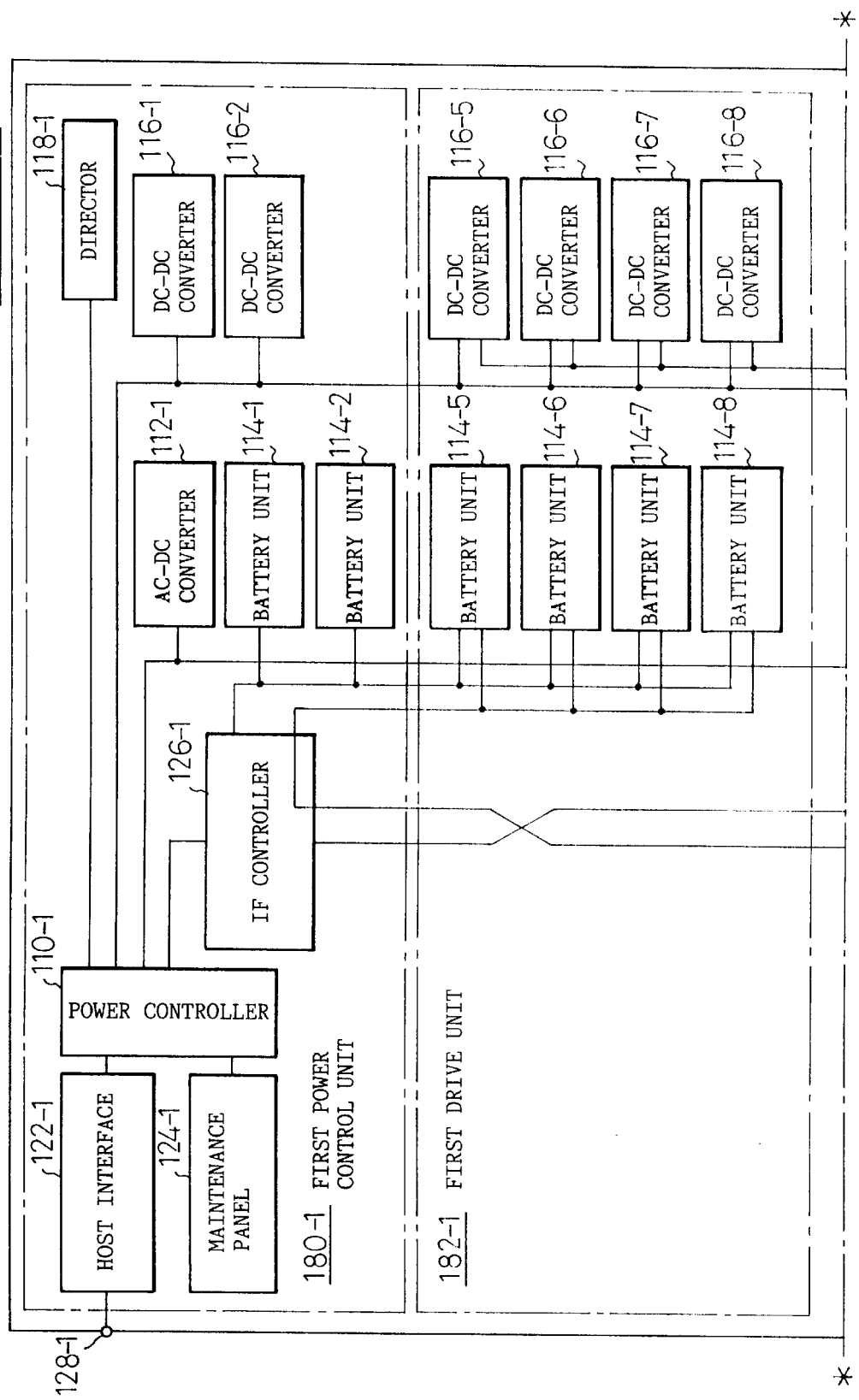

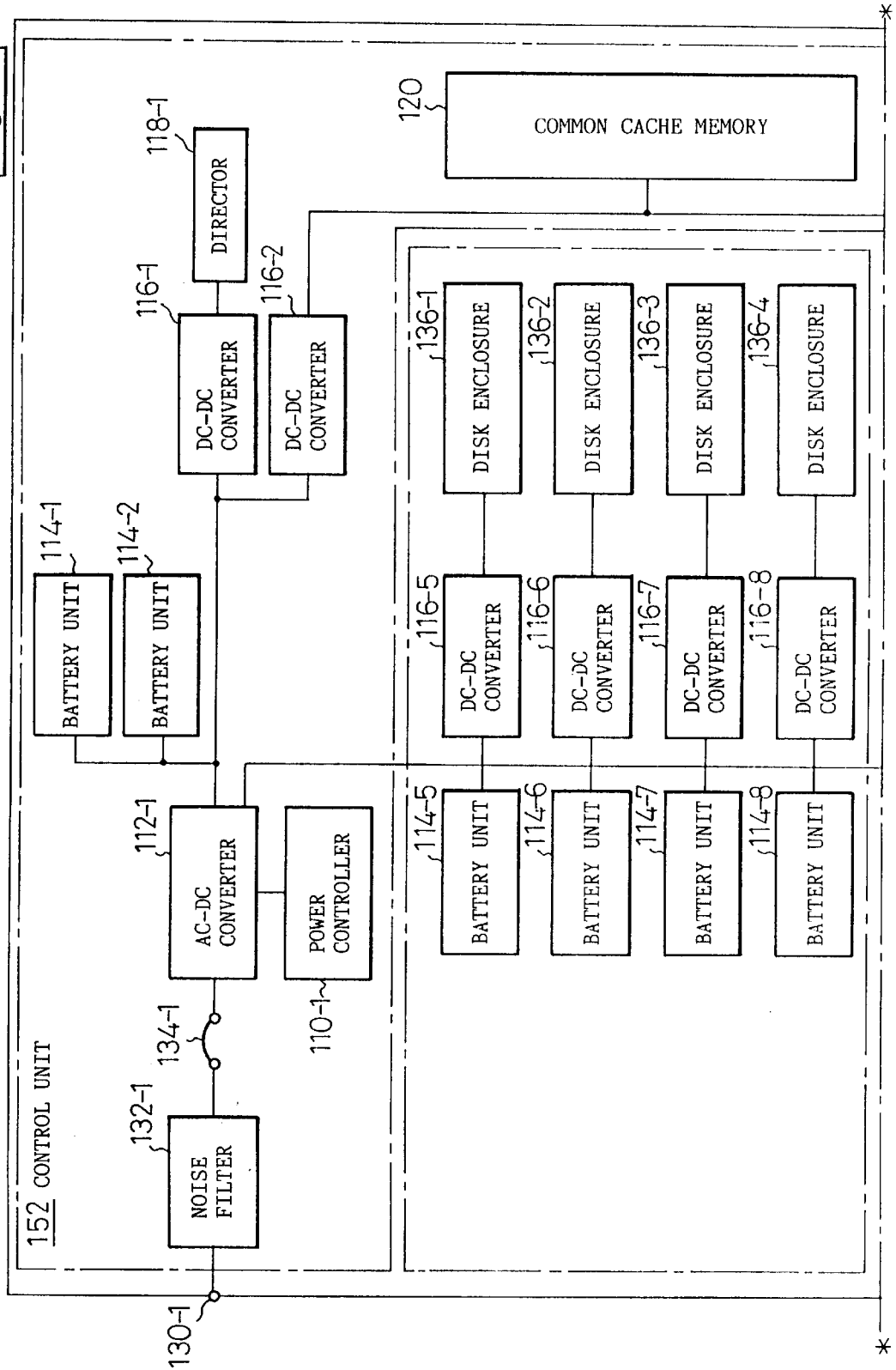

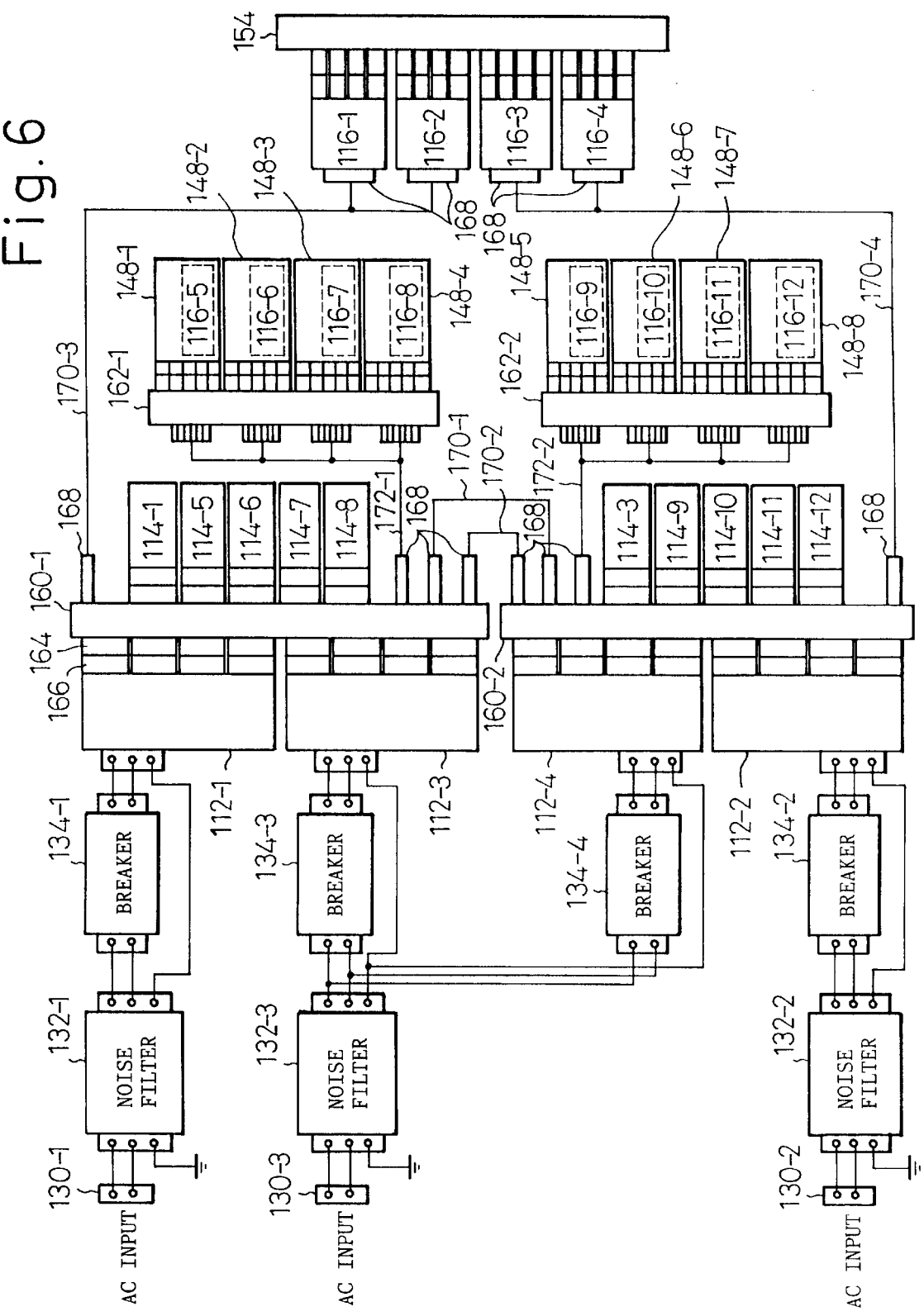

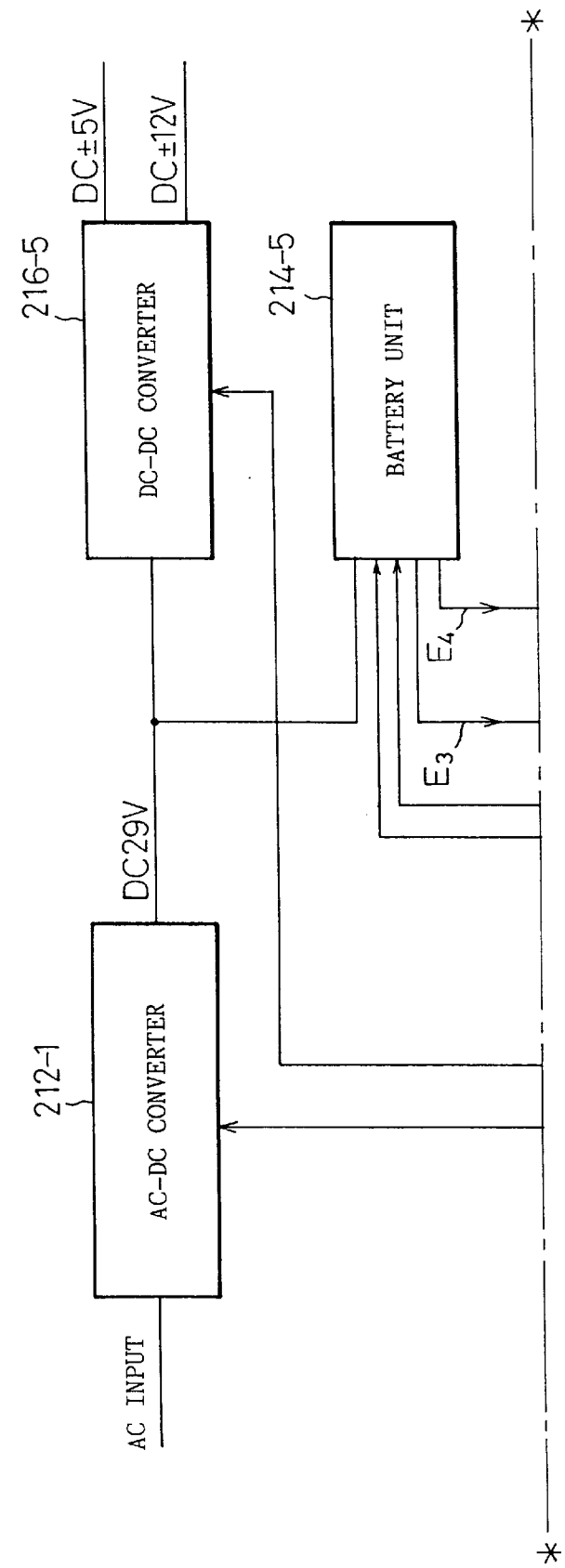

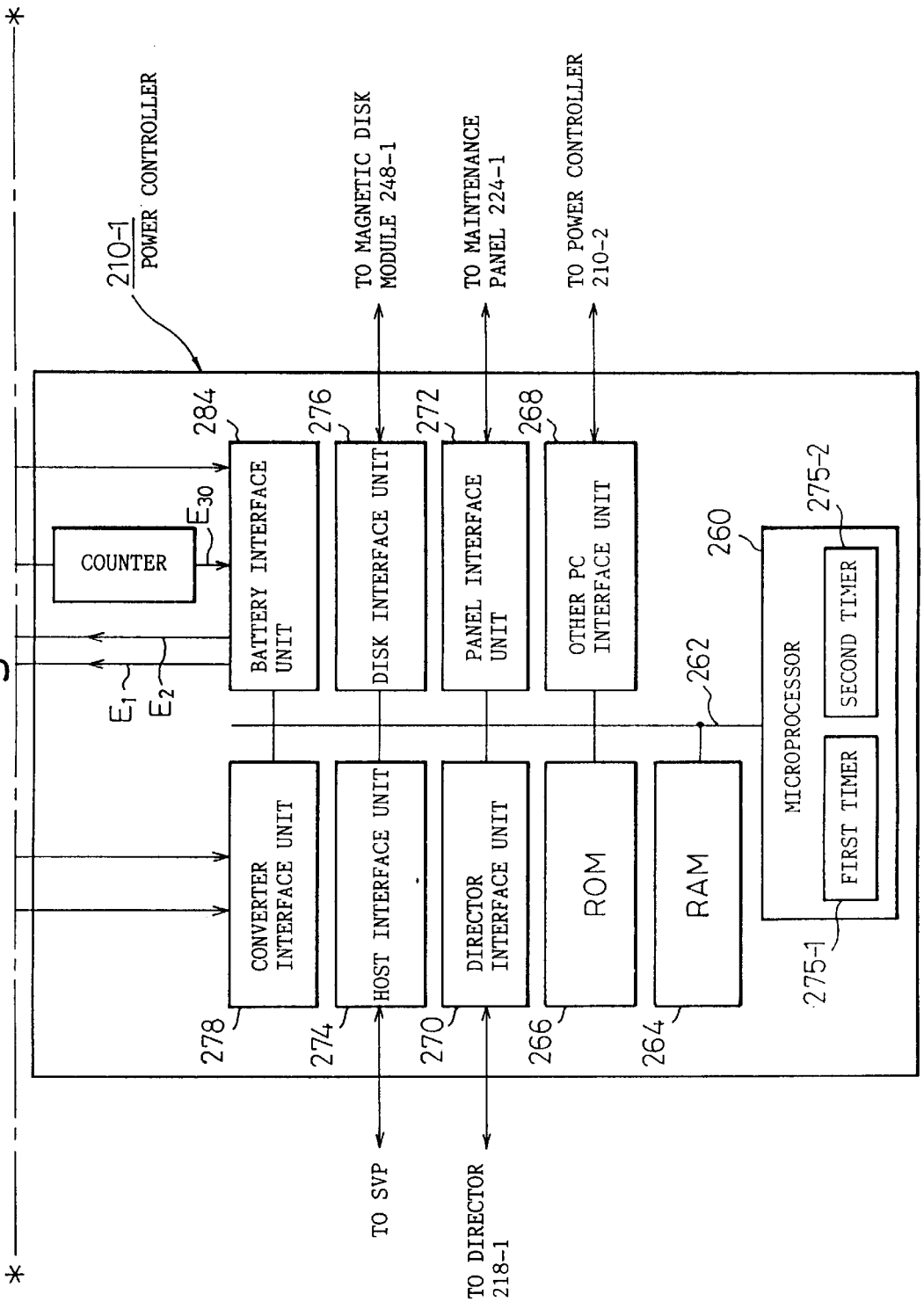

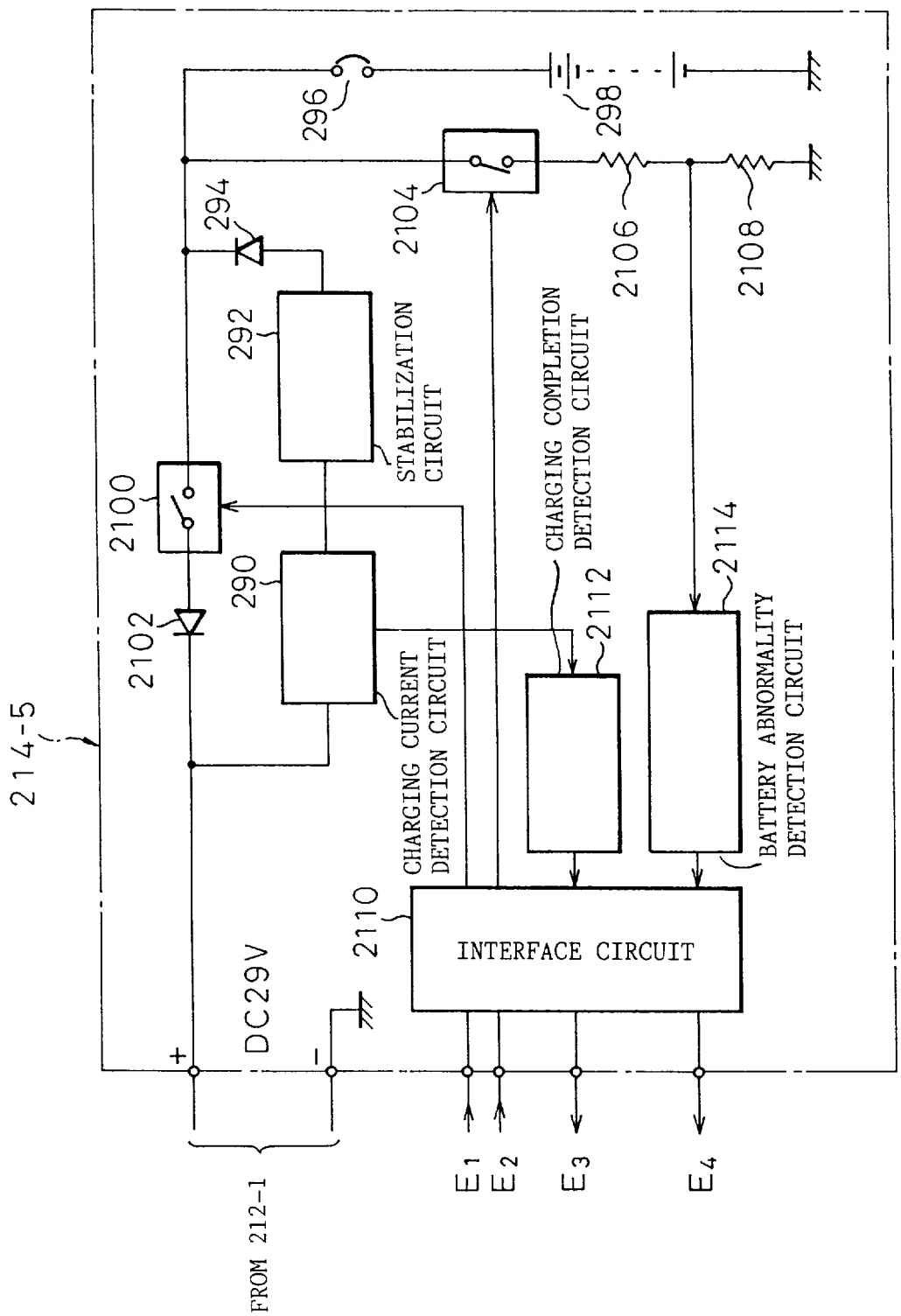

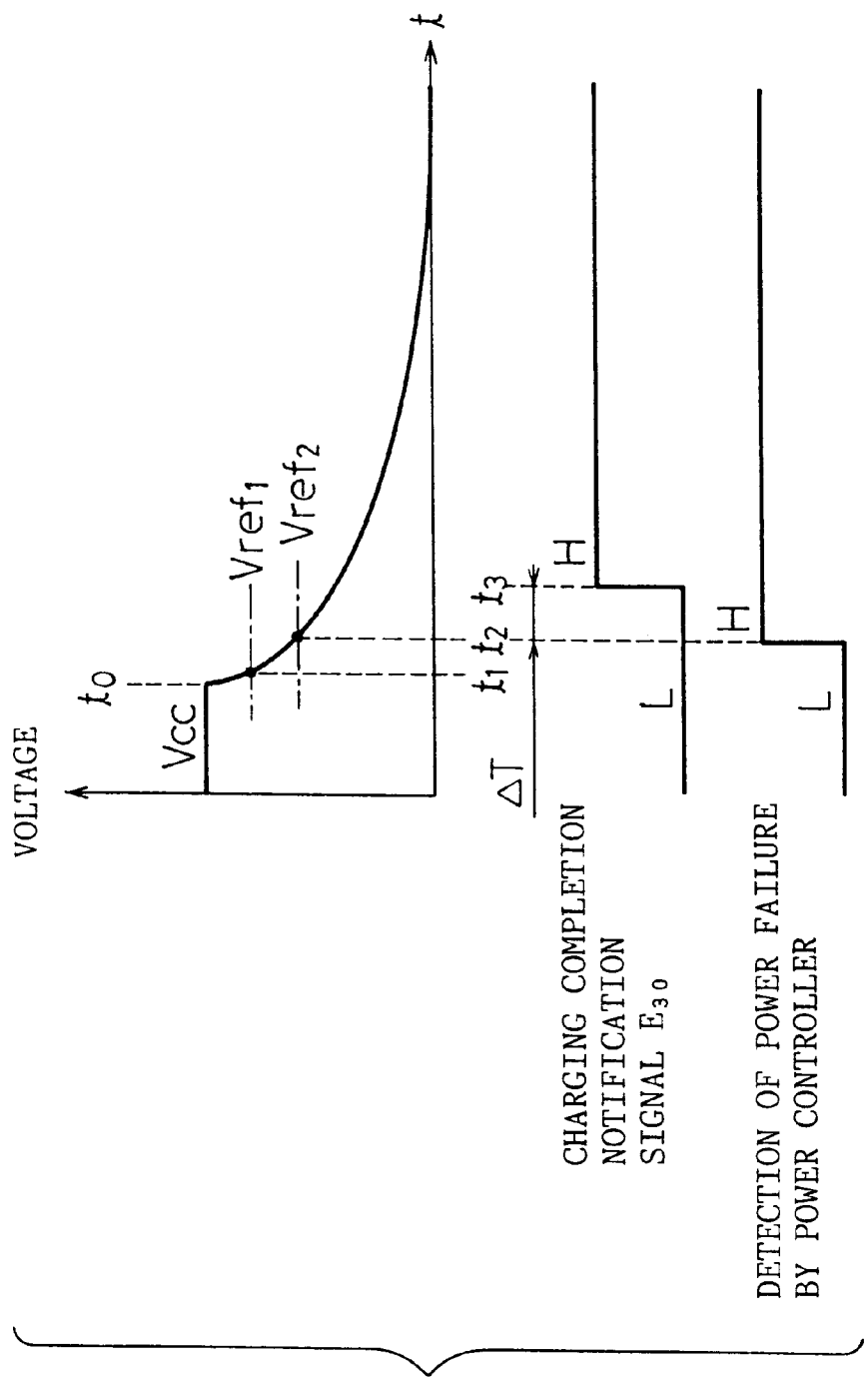

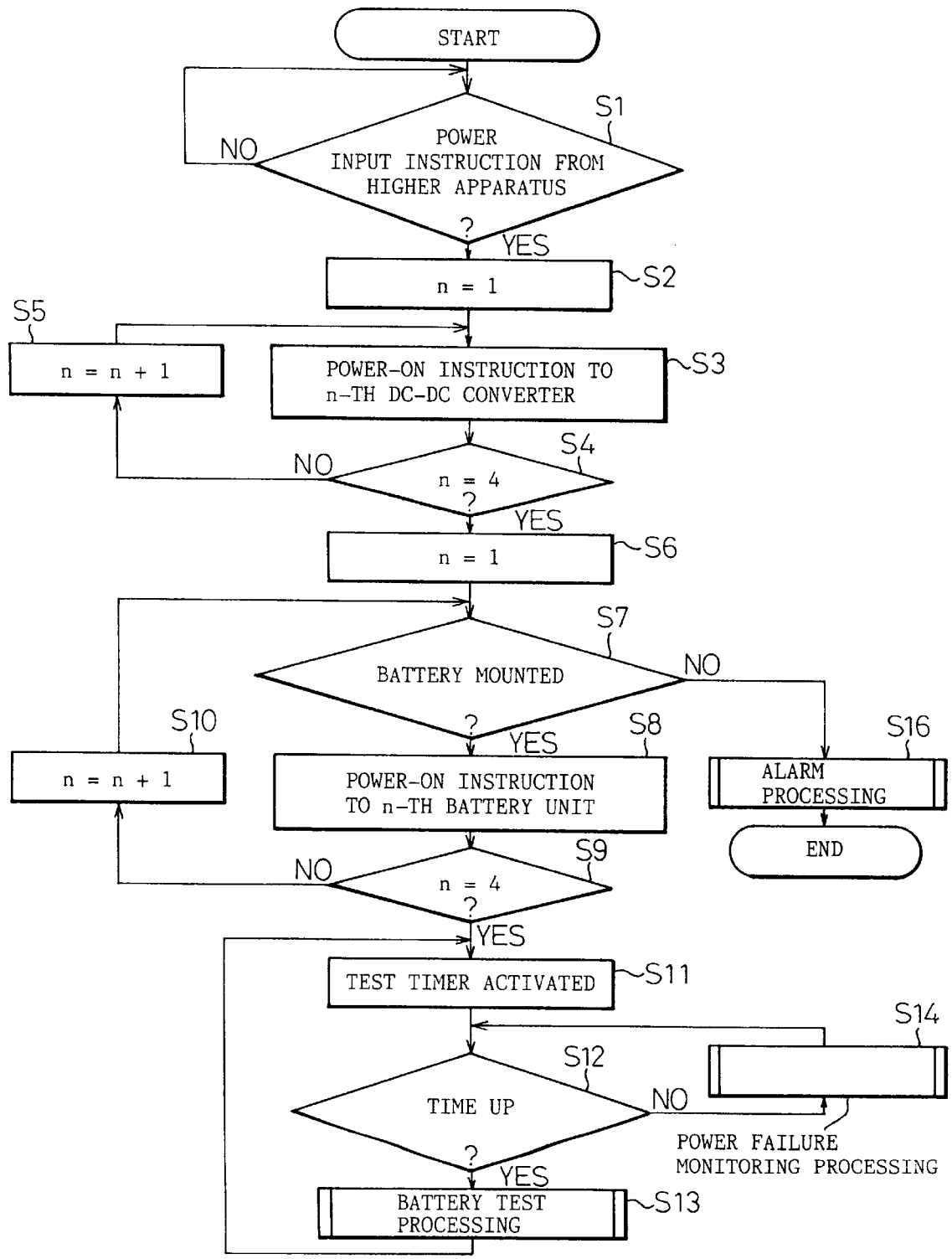

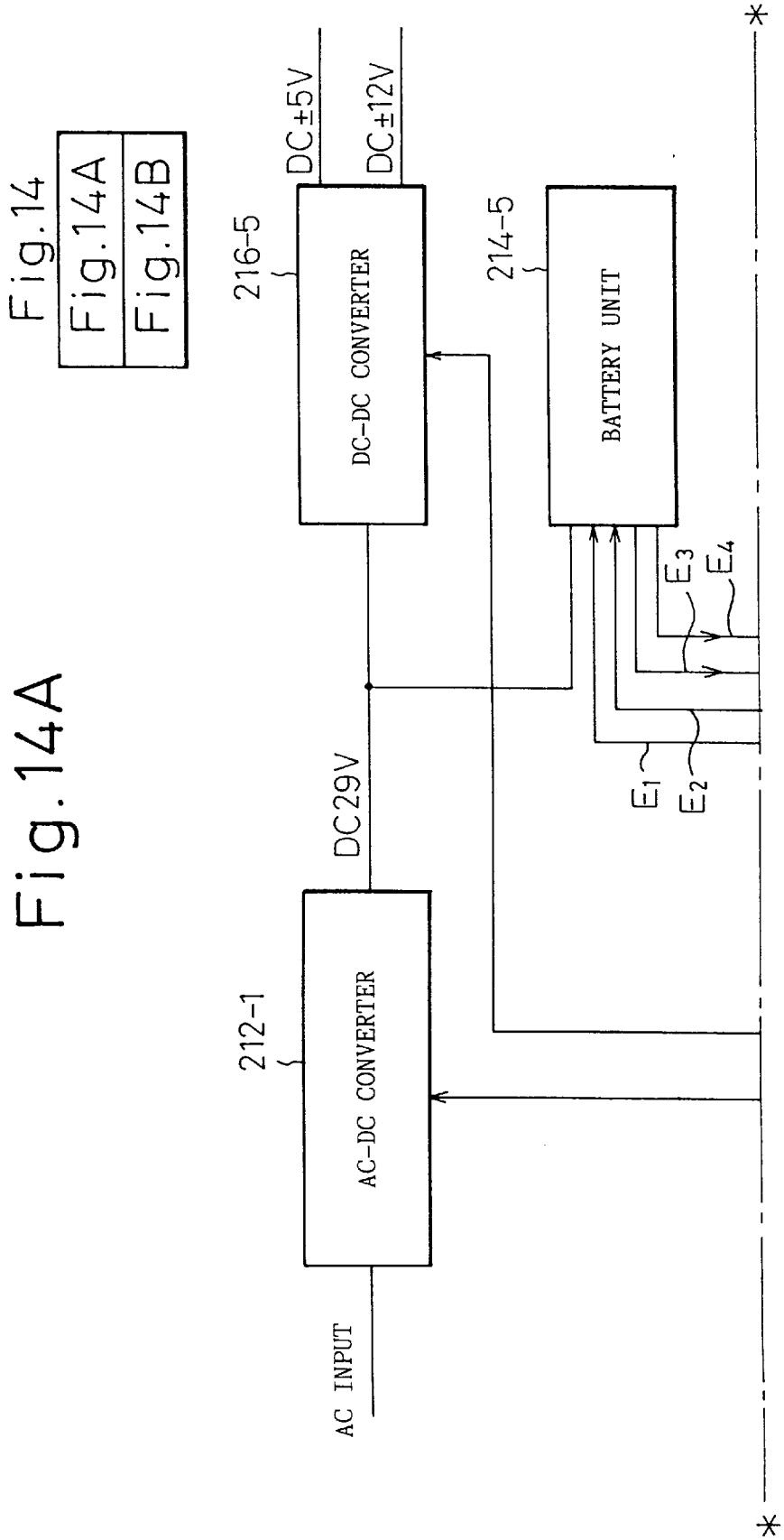

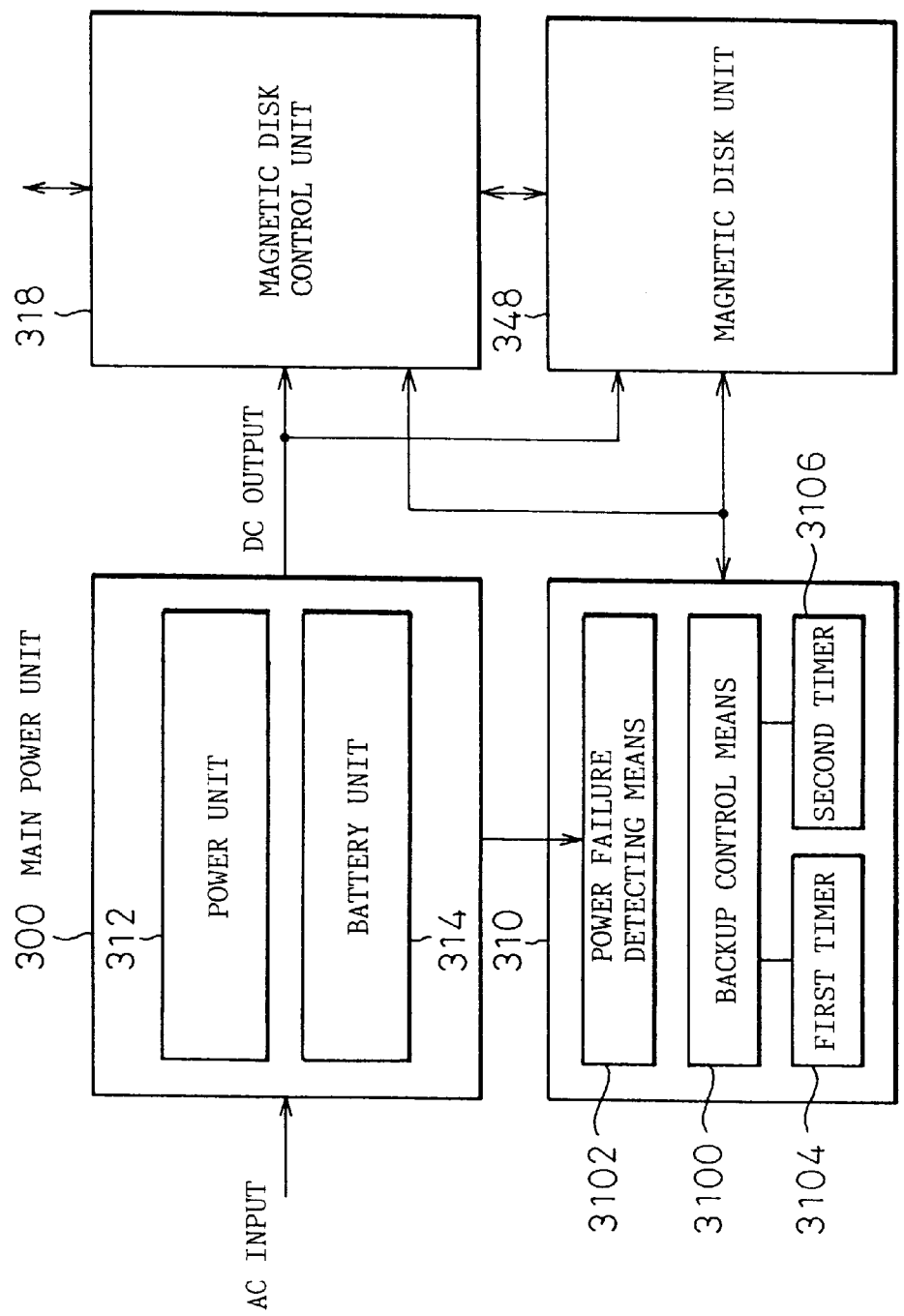

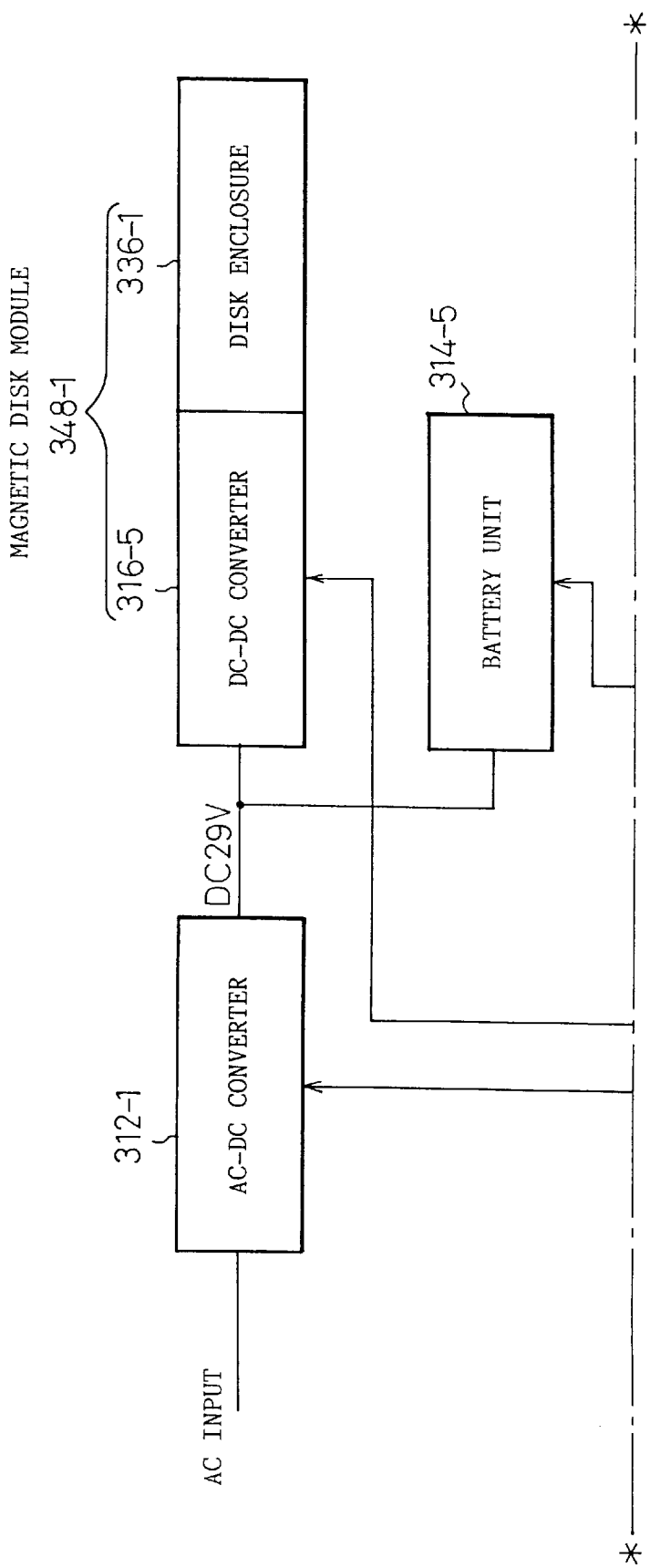

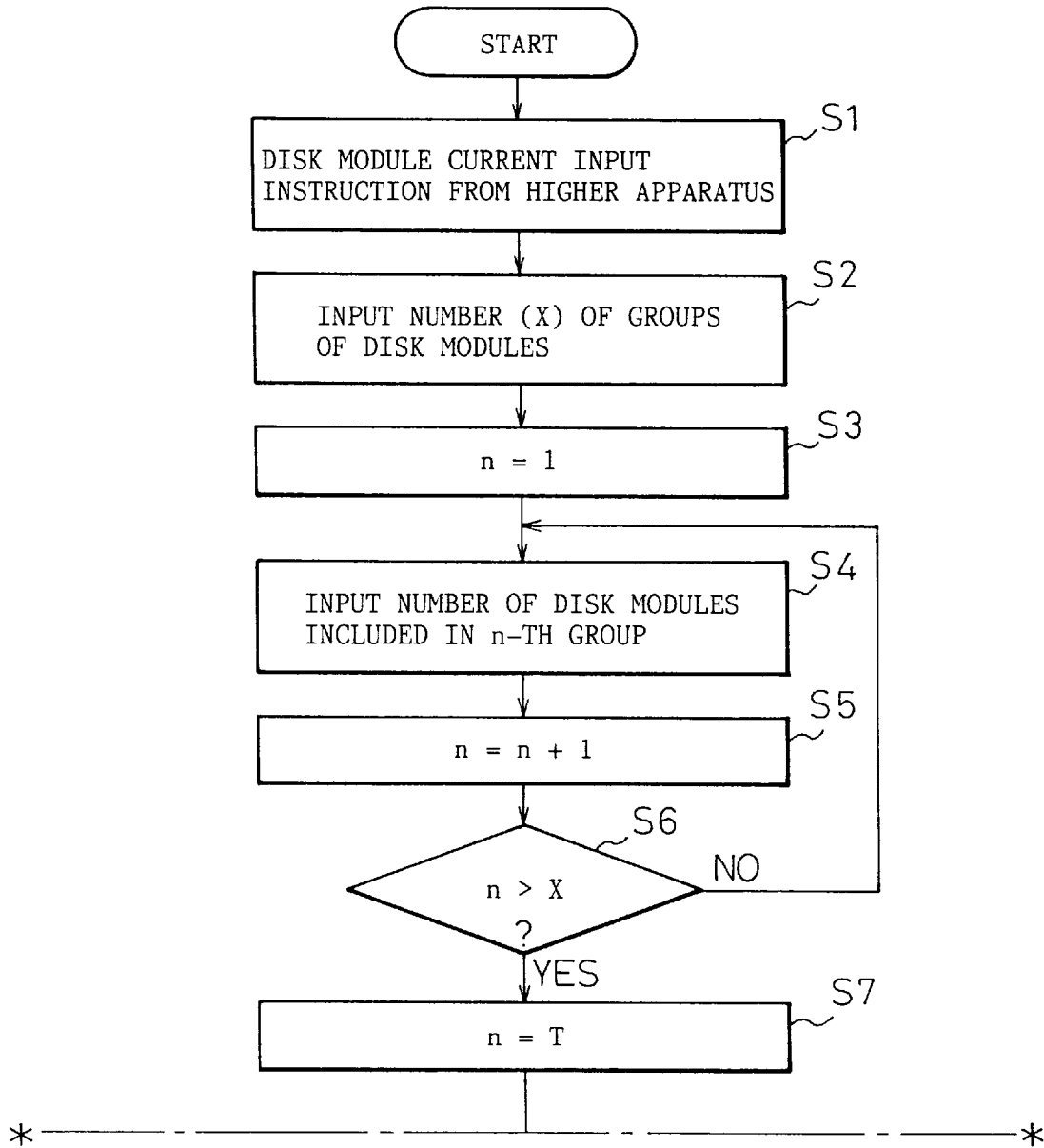

MAGNETIC DISK APPARATUS

ACTIVATION OF A MAGNETIC DISK APPARATUS

This is a divisional of Ser. No. 08/658,299, filed on Jun. 5, 1996, now abandoned, which is a continuation of Ser. No. 08/185,882, filed on Mar. 2, 1994, and which is a 371 of PCT/JP93/00703 filed on May 26, 1993.

TECHNICAL FIELD

The present invention relates to a magnetic disk apparatus used as a subsystem of a computer system, more particularly relates to the improvement of the compactness and density of a magnetic disk apparatus used as a subsystem of a medium-sized host computer system and a control system for a back-up power supply housed in the same. More specifically, it relates to the internal construction for increasing the compactness and density of a locker type magnetic disk apparatus housing a backup power supply and a magnetic disk control apparatus in addition to a plurality of magnetic disk modules, relates to a magnetic disk apparatus in which there is a back-up control system for the supply of power from a battery unit during a power failure, relates to a method of activation of a plurality of magnetic disk modules in a magnetic disk apparatus, relates to the monitoring of the power for controlling the switching of one system with another system and the back-up batteries which are attached to the two systems, relates to the control of the cut-off of power in a magnetic disk apparatus, and relates to a device for the display of the state of the power in a magnetic disk apparatus.

BACKGROUND ART

The demands on the reliability of computer systems are extremely high. A system which can continue its normal system operation even when power has failed due to external factors such as a breakdown of the power facilities of the computer system or lightning, a system which can complete the processing currently in progress normally even when the power has failed for more than an allowable extent, and a system which can guarantee the safety of the data being written into the magnetic disk apparatus are demanded.

Therefore, even in a magnetic disk apparatus provided as a subsystem of a computer, it is necessary to control the power to enable efficient and inexpensive back-up when the input power has failed.

In general, for example, a 60 to 360 Gbyte magnetic disk apparatus connected to a large-sized computer system is installed in a computer center is provided with a full-scale power facility along with the large-sized computer system, so no battery is provided in the magnetic disk apparatus itself.

That is, the large-sized computer system and the magnetic disk apparatus receive the supply of power from a common power facility. In this case, the power facility is provided with an external power supply and a back-up battery and further is provided with an emergency generator in some cases. In general, the back-up battery is large in capacity and therefore there are various restrictions as to the construction and appearance of the battery due to provisions of fire prevention laws, so the installation space becomes large.

On the other hand, a medium-sized computer system installed in a general office etc. uses a medium-sized magnetic disk apparatus of for example a 5 to 20 Gbyte capacity. In the case of such a medium-sized computer system, there is no full-scale power facility provided as in the case of a large-sized computer system. Rather, the commercial power is used. Therefore, it is necessary to provide a back-up battery for the magnetic disk apparatus in this case.

In a medium-sized computer system, however, when providing a back-up battery in the magnetic disk apparatus, it is necessary to make the installation space of the battery as small as possible and also to limit the battery to the range of power capacity which is free from restriction under fire prevention laws. On the other hand, no matter how small the battery capacity, back-up power is required and must be guaranteed. In this case, the consumption (discharge) of the battery when power fails or is momentarily cut off is remarkable. If the battery cannot be charged fast enough, then there is the danger that back-up of power can no longer be guaranteed for the system.

Accordingly, in a magnetic disk apparatus used for a medium-sized computer system, a key problem is how to suppress the consumption of the back-up battery as much as possible.

On the other hand, a magnetic disk apparatus carries a plurality of compact magnetic disk modules in a single locker. If all the modules are activated at once, then current of a level several times the steady state flows and a large capacity of power becomes required. Accordingly, the modules are activated in succession so as prevent the rush current from overlapping. To achieve further compactness of the power facilities, however, it is desired to control the activation even finer.

Further, improvements are required in the monitoring of the power, the battery test, the analysis of the causes at the time of power failure, the display for maintenance of the power, etc.

DISCLOSURE OF THE INVENTION

A first object of the present invention lies in the improvement of the internal mounting structure of the magnetic disk apparatus, that is, lies in the increase of the number of magnetic disk modules mounted in the housing (locker) of the magnetic disk apparatus and the improvement of the mounting density and lies in the structure of a magnetic disk apparatus of the locker storage type which can keep down the amount of cables used and achieve a higher density of mounting when providing a plurality of power units and back-up battery units, a magnetic disk control apparatus, etc.

A second object of the present invention lies in improvement of the control at the time of a power failure, that is, lies in enabling a suitable cut-off of the power without causing abnormal ending of the system or destruction of data even when a power failure occurs before the completion of charging of the battery.

Further, a third object of the present invention lies in improvement of the back-up control, that is, lies in enabling suitable control of the back-up in the event power stops being input in the case of provision of a battery unit in the apparatus itself.

A fourth object of the present invention lies in the improvement of the method of activation of the magnetic disk apparatus, that is, lies in suppression of the activation power and shortening of the start-up time.

Further, a fifth object of the present invention lies in monitoring of the power, in particular the battery, that is, lies in providing power monitoring times at suitable times and the control of the competition between two systems so as to quickly enable incorporation of a battery in the system.

Also, a sixth object of the present invention lies in the monitoring of the battery, as above, in this case the prevention of competition during battery tests.

A seventh object of the present invention lies in control of the cut-off of the power, that is, lies in enabling easy analysis of the causes of a cut-off of the power.

Further, an eighth object of the present invention lies in enabling reliable prevention of omission of switching of an R/L switch at the time of the end of the maintenance work on the magnetic disk apparatus and the power apparatus.

To achieve the above objects, the present invention provides a magnetic disk apparatus which is used as a subsystem of a computer system, in particular, a medium-sized computer system which uses commercial power and does not have a back-up power supply itself, provided with:

a plurality of directors, a plurality of magnetic disk modules commonly accessed from the plurality of directors, a plurality of director batteries for supplying power individually to the plurality of directors, magnetic disk module batteries for supplying power to the magnetic disk modules, and a power controller for independently controlling the supply of power from the plurality of director batteries and magnetic disk module batteries in accordance with the operating state of the plurality of directors and magnetic disk modules.

Further, the present invention provides a magnetic disk apparatus which is used as a subsystem of a computer system, in particular, a medium-sized computer system which uses commercial power and does not have a back-up power supply itself, which magnetic disk apparatus has a structure accommodating in a housing a plurality of magnetic disk modules comprised as independent units and a plurality of power units outputting a predetermined DC voltage to the magnetic disk modules, characterized in that the plurality of power units are connected to a single mother board to form a common power supply.

As an embodiment, the mother board has connected to it back-up battery units in addition to the power units.

As an embodiment, the power units are connected to one side of the mother board and the back-up battery units are connected to the other side.

As an embodiment, the battery units output the same DC voltage as the power units.

As an embodiment, the power units are connected to the mother board by being plugged in.

As an embodiment, the battery units are connected to the mother board by being plugged in.

As an embodiment, a plurality of mother boards with a plurality of power units connected to them are provided and the power lines among the plurality of mother boards are connected in common to form a common power supply.

As an embodiment, the magnetic disk modules house DC/DC converters which convert the DC input voltage from the power units to a predetermined DC voltage and supply that as power.

As an embodiment, the magnetic disk modules, power units, and mother board are mounted in a single housing along with the magnetic disk control apparatus of the magnetic disk modules.

As an embodiment, the magnetic disk modules and the magnetic disk control apparatus are provided with DC/DC converters which receive the same DC input voltage and output a particular DC voltage.

Further, the present invention provides a magnetic disk apparatus which is provided with magnetic disk modules connected under the control of a magnetic disk control means, power units which convert the input voltage from an outside power supply to a predetermined DC voltage and supply the same to the magnetic disk modules, battery units which supply the magnetic disk modules with the same DC voltage as the power units, and a power control means which controls the input and cutoff of the power of the power units and the magnetic disk modules, wherein provision is further made of:

charging completion detecting means which are provided in the battery units and judge the completion of charging of the batteries accommodated when the charging current becomes less than a predetermined value and output a charging completion notification signal to the power control means and a charging completion invalidating means which is provided in the power control means and invalidates the charging completion detection signal output from the charging completion detecting means at the time of detecting a power failure, whereby when a charging completion notification signal is output while the charging current falls as a result of a power failure caused before the completion of charging, it can be judged that the charging has not yet been completed at the time of detection of the power failure.

As an embodiment, provision is further made of a delaying means for causing a delay of a predetermined time to the charging completion notification signal from the charging completion detecting means and then supplies the same to the power control means and, when the charging completion notification signal is output while the charging current is falling due to a power failure caused before the completion of charging, the charging completion notification signal is received after a power failure detection time of the power control means at a delay caused by the delay means, and it is judged that the charging has not yet been completed at the time of detection of the power failure.

As an embodiment, provision is further made of a charging completion judging means which is provided at the power control means, reads in and holds the charging completion notification signal at predetermined intervals, reads out the charging completion detection signal detected a predetermined time before when detecting a power failure, and judges the existence of the completion of charging and also, when a charging completion notification signal is output while the charging current is falling due to a power failure occurring before the completion of charging, it can be judged that the charging has not yet been completed at the time of the detection of the power failure.

As an embodiment, when it is judged that the charging has been completed at the time of the detection of the power failure, the power control means instructs the magnetic disk control means to disconnect the magnetic disk modules when a predetermined back-up time (T1) has elapsed and stops the supply of power by the power units when receiving from the magnetic disk control means a cut-off authorization response.

As an embodiment, the power control means stops the supply of power by the power units without receiving the cut-off authorization response when it does not receive the cut-off authorization response from the magnetic disk control means even after the elapse of a predetermined time ($T_2$) from when the cut-off request was made.

Further, the present invention provides a magnetic disk apparatus provided with a main power unit provided with power units which receive as input an AC power and convert the same to DC voltage and battery units which are charged by the DC voltage of the power units and output the same DC voltage at the time of a power failure, magnetic disk modules which operate receiving the power from the main power unit, a magnetic disk control unit which receives the power from the main power unit and controls the magnetic disk modules, and a power control unit which controls the input and cut-off of power from the main power unit to the magnetic disk modules and the magnetic disk control unit, wherein provision is further made of, in the power control unit, a power failure detecting means for detecting the stopping of the input of the AC power, a first timer which activates when the power failure detecting means detects a power failure, monitors the time during which the input of power has stopped, and produces a timer output when a predetermined back-up time ($T_1$) has been reached, and a back-up control means for executing a power cutoff processing of the magnetic disk modules and magnetic disk control unit on the basis of a power cut-off command which it receives from a higher apparatus before the timer output of the first timer and executes a power cutoff processing of the magnetic disk modules and the magnetic disk control unit when not receiving a command for power cut-off from the higher apparatus, but when the first timer output is obtained.

As an embodiment, the back-up control means, as the power cut-off processing of the magnetic disk modules and the magnetic disk control unit, outputs a power cut-off control signal to the magnetic disk control unit to cause the input and output operation of the magnetic disk unit to end and, when receiving a cut-off authorization notification signal on the basis of the end of the input and output operation from the magnetic disk control unit, cuts off the power of the magnetic disk modules and the magnetic disk control unit.

As an embodiment, the power control unit is provided with a second timer which activates simultaneously with when a power cut-off control signal is output from the back-up control unit to the magnetic disk control unit, monitors the end of the input and output operation of the magnetic disk modules, and produces a timer output when a predetermined time ($T_2$) has been reached, wherein the back-up control means cuts the power of the magnetic disk modules and the magnetic disk control unit on the basis of a power cut-off authorization notification received from the magnetic disk control apparatus before the timer output of the second timer and cuts off the power of the magnetic disk modules and the magnetic disk control unit when not receiving the power cut-off authorization notification from the magnetic disk control apparatus, but when the timer output of the second timer is obtained.

As an embodiment, the back-up control means stops the back-up operation and causes the operation of the apparatus to continue by clearing the first timer when restoration of the power input is detected after the detection of a power failure.

As an embodiment, when detecting the restoration of power input after activation of the second timer, the back-up control means clears the second timer and also prohibits a cut-off operation on the basis of a power cut-off authorization notification from the magnetic disk control unit and causes the operation of the apparatus to continue.

Further, the present invention provides a method for activation of a magnetic disk apparatus activated by input of power of a plurality of magnetic disk modules, wherein the plurality of magnetic disk modules are divided into a plurality of groups of the same number of units and the groups are activated in succession by changing the time intervals for each of the same.

As an embodiment, the groups are successively activated by shifting them at least by the time ($\Delta T$) during which a rush current flows just after activation.

As an embodiment, first two groups are successively activated by shifting them by exactly the time ($\Delta T$) during which the rush current flows just after activation, then the succeeding groups are activated successively and repeatedly without overlap after the end of activation of the second activated group.

As an embodiment, processing is repeated so as to successively activate two groups by shifting them by exactly the time ($\Delta T$) during which the rush current flows just after activation and similarly successively activates the next two groups after the end of activation of the second activated group.

Further, the present invention provides a method of activation of a magnetic disk apparatus activated by input of power of the plurality of magnetic disk modules, wherein the plurality of magnetic disk modules are divided into a plurality of groups of mutually different numbers of units and the groups are activated successively in the order of the groups with the greater number of units by shifting each group a predetermined time interval.

As an embodiment, the groups are successively activated by shifting them about half of the activation time each.

Further, the present invention provides a method of activation of a magnetic disk apparatus activated by input of power of the plurality of magnetic disk modules, wherein the plurality of magnetic disk modules are divided into a plurality of groups of mutually different numbers of units and the groups are activated successively by changing the time intervals of activation for each group.

As an embodiment, the groups are successively activated by shifting them at least by the time ($\Delta T$) during which a rush current flows just after activation.

As an embodiment, processing is repeated so as to successively activate two groups by shifting them by exactly the time ($\Delta T$) during which a rush current flows just after activation and then similarly successively activate the next two groups after the end of the activation of the second activated group.

Further, the present invention provides a magnetic disk apparatus having power units of a plurality of systems and battery units ancillary to the power units and has power units and batteries common with other systems, wherein provision is made between the power control apparatus of one system and the power control unit of another system a patrol control means for giving a signal during a battery monitoring operation and a priority order to the battery monitoring, which is used to monitor the function of the batteries attached to a common power supply and, further, when incorporated in a magnetic disk apparatus, controls the simultaneous monitoring of batteries and the time of incorporation of the batteries into the magnetic disk apparatus.

As an embodiment, the power control apparatus monitors the ready states of the batteries at suitable times and when detecting that a battery is in a ready state enabling back-up, immediately starts the monitoring operation of the battery and, if the battery functions are suitable, incorporates the battery into the system.

As an embodiment, when its own apparatus is doing the monitoring, the power control means sends a master signal to that effect to the patrol control means and the patrol control means sends an other-system patrol signal to the power control apparatus at the side not receiving the master signal indicating that another system is in operation to monitor the battery.

Further, the present invention provides a magnetic disk apparatus having in each of a plurality of systems power units and battery units ancillary to the power units and having power units and batteries common with other systems, wherein provision is made of a cross control means for cross-controlling the connection to the common power supply and batteries between the power control apparatus of one system and the power control unit of another system and provision is made of an address setting means for setting the address showing one's own apparatus in each of the power control apparatuses and the cross control means is switched based on the address of the selected one system, whereby the common power units and attached batteries are made common to two systems.

As an embodiment, the battery test and monitoring are performed only from one system by setting the address of one's own system by the address setting means.

The present invention further provides a magnetic disk control apparatus provided with at least a main power unit and a functional unit and performing the control of the cut-off of the power, wherein provision is made, in each of the drive modules, of a power unit for supplying power and a battery unit for backing up the power at the time of a power failure, while provision is made in the functional unit of a first storage means for recording the history such as the occurrence of breakdowns and also a second storage means for obtaining a log of the state of use of the power, the main power unit sending to the functional unit when the power of the system is cut off a back-up signal indicating that the back-up battery is being used due to a power failure and an automatic cut-off signal indicating that the power is automatically cut off along with the elapse of a maximum discharge time after switching to the battery, and next, when a power cut-off request signal is sent from the main power unit to the functional unit and the functional unit receives the power cut-off request signal, the functional unit performs a predetermined processing including preparations for power cut-off, then sends a power cut-off signal to the main power unit; the second storage means of the functional unit logs the back-up signal and the automatic cut-off signal when receiving the power cut-off request signal; and the second storage means is referred to so as to judge the state of use of the power such as the previous power cutoff when next inputting power.

As an embodiment, the automatic cut-off signal is set to a high level when notifying the fact that the power is automatically cut off after the elapse of a maximum discharge time of the battery and is set to the low level when the power is forcibly cut off before the elapse of the maximum discharge time.

As an embodiment, the second storage means uses a part of the memory area of the first storage means.

As an embodiment, the first and second storage means use a hard disk.

Further, the present invention provides a magnetic disk apparatus which displays the state of the power, which is provided on a power maintenance panel of the magnetic disk apparatus with a power ON/OFF switch which is operated manually at the time of maintenance work or performs the power input and cut-off through a power control interface from a higher apparatus, an R/L switch for switching between a side enabling input and cut-off of power from a remote location (REMOTE) and a side enabling input and cut-off of power locally (LOCAL), and a display means for displaying the state of the R/L switch, wherein during maintenance work of the magnetic disk apparatus, the R/L switch is turned to the "LOCAL" side, the power ON/OFF switch is used to cut off the power, and, after the end of the maintenance work, the R/L switch is turned to the REMOTE side and the display means is made to give a display.

BRIEF DESCRIPTION OF THE DRAWINGS

FIG. 6 is an explanatory view showing the mounting structure of FIG. 1 and FIG. 2 taken out of the locker and spread out.

FIGS. 9A and B are a block diagram of a circuit of an embodiment showing the power supply system of FIG. 8, FIG. 10 is a block diagram of a circuit of an embodiment of a battery unit of FIG. 8.

FIG. 11 is a timing chart showing the timing of judgement of the charging completion notification signal at the time of a power failure in FIG. 9.

FIG. 12 is a flow chart showing the power control routine in FIG. 9.

FIG. 19 is a basic structural view of back-up control according to the present invention.

BEST MODE FOR CARRYING OUT THE INVENTION

First, an explanation will be made of the structure of a magnetic disk apparatus according to the present invention. Before explaining the present invention, however, the conventional structure and problems in the same will be explained in accordance with the drawings.

Figure 7:
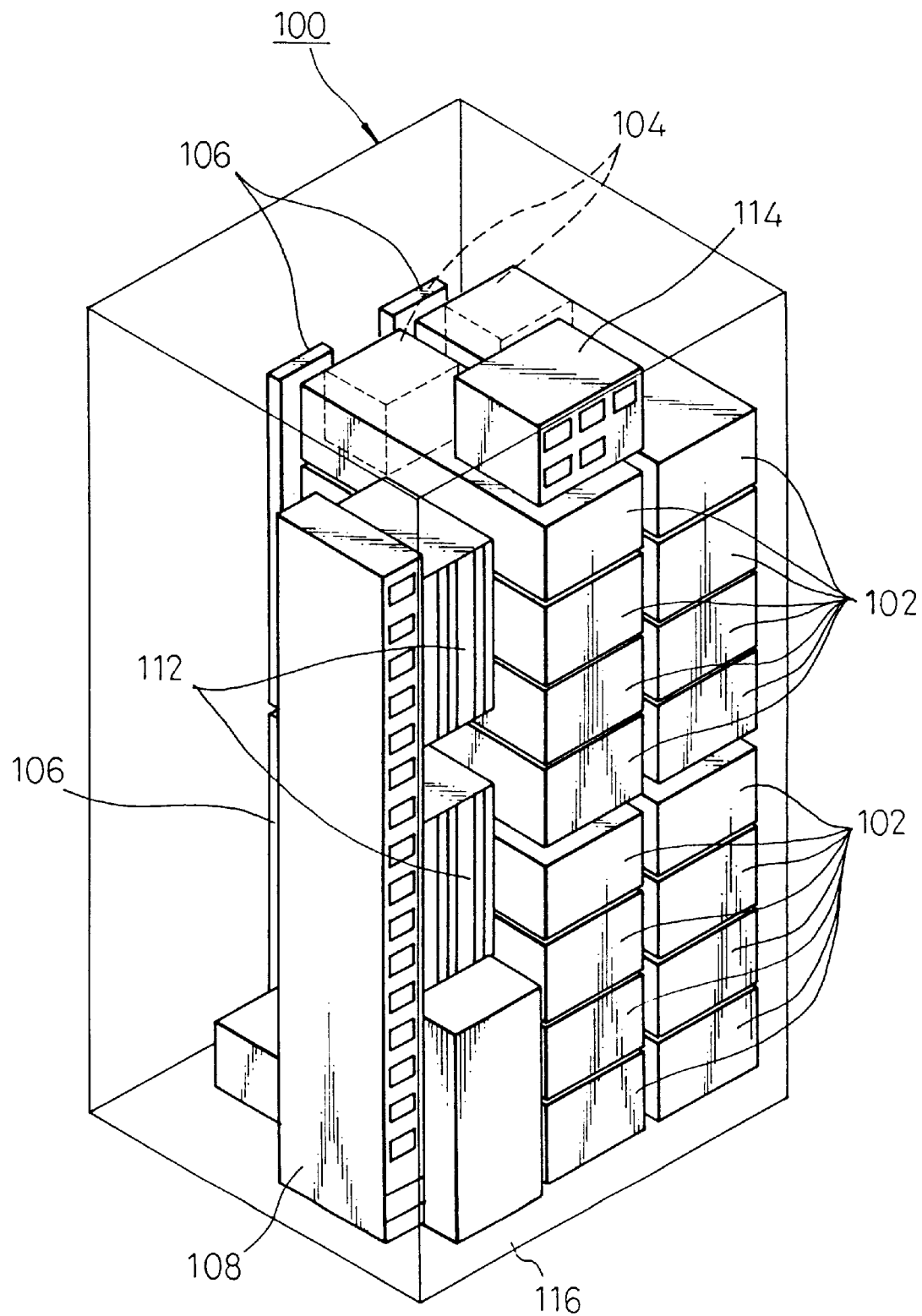
FIG. 7 is a view of the mounting structure of an example of the conventional magnetic disk apparatus.

FIG. 7 is a structural view of an example of a conventional magnetic disk apparatus. The figure shows the locker mounting structure in a transparent state. In the figure, 100 is a locker of a magnetic disk apparatus, in which locker 100 for example 16 magnetic disk modules 102 are plugged in on a circuit board 106. The magnetic disk modules 102 house AC-DC converters 104, which receive the supply of commercial power of AC 100V from a module-use NFB108 and generate the DC ±5V and DC ±12V necessary for the drive of the magnetic disk modules 102.

The magnetic disk modules 102 are attached to the circuit board 106 by a detachable plug-in system to enable exchange in the event of a breakdown. The power is supplied to the AD-DC converters 104 built in them, however, by cable connection.

On the other hand, the magnetic disk control apparatuses for controlling the 16 magnetic disk modules have the magnetic disk modules 102 disposed under their control in units of eight. Therefore, two magnetic disk control apparatuses are accommodated in separate lockers (not shown). Two AC-DC converters 112 for supplying power to the magnetic disk control apparatuses of the separate lockers are provided in the locker 100 as shown in the figure. These receive the supply of AC 100V from the control-use NFB114, create a prescribed DC voltage, and supply the same to the magnetic disk control apparatuses using power cables. Note that 116 is an interface holding box for connecting the 16 magnetic disk modules 102.

On the other hand, there is a strong market demand for greater compactness of the magnetic disk modules and for greater density, that is, increasing the number of units mounted in a locker along with this.

As a factor inhibiting a greater density, there is the attempt to achieve greater compactness by mounting the magnetic disk control apparatuses, which had been stored in separate lockers as mentioned earlier, in the same locker as the magnetic disk modules and, as a result, the increase in the amount of cables used for supplying power to the magnetic disk modules and the magnetic disk control apparatuses from the power units. This therefore becomes a factor inhibiting higher density mounting.

Further, as mentioned earlier, in general, ordinary commercial power is not used for the power of large-sized computer systems, but exclusive power facilities are provided. These power facilities have back-up battery units and emergency generators. The large-sized computer systems themselves are not provided with back-up batteries. Further, locker storage types of magnetic disk apparatuses are used as subsystems of large-sized computer systems, but receive in common power from external power facilities. Accordingly, back-up power supplies are provided at the outside.

Medium-sized computer systems used for offices etc., however, are not provided with external power facilities such as with large-sized computer systems, but are made to operate with ordinary commercial power. Accordingly, back-up by external power facilities is not possible. On the other hand, in recent years, even in such medium-sized computer systems, locker storage type magnetic disk apparatuses have been used as subsystems in the same way as with large-sized systems and, consequently, it is necessary to mount back-up power supplies in the lockers of the magnetic disk apparatuses.

Accordingly, the amount of power cables used is increased due to the housing of the battery units in the lockers and this becomes a further factor inhibiting greater density.

In summary, it is necessary to house the magnetic disk control apparatuses and house back-up batteries in a locker type magnetic disk apparatus used as a subsystem of a medium-sized computer system. Therefore, the amount of the power cables used increases, which becomes a factor inhibiting the greater density due to the increase of the number of units accompanying the greater compactness of magnetic disk modules.

Figure 1:
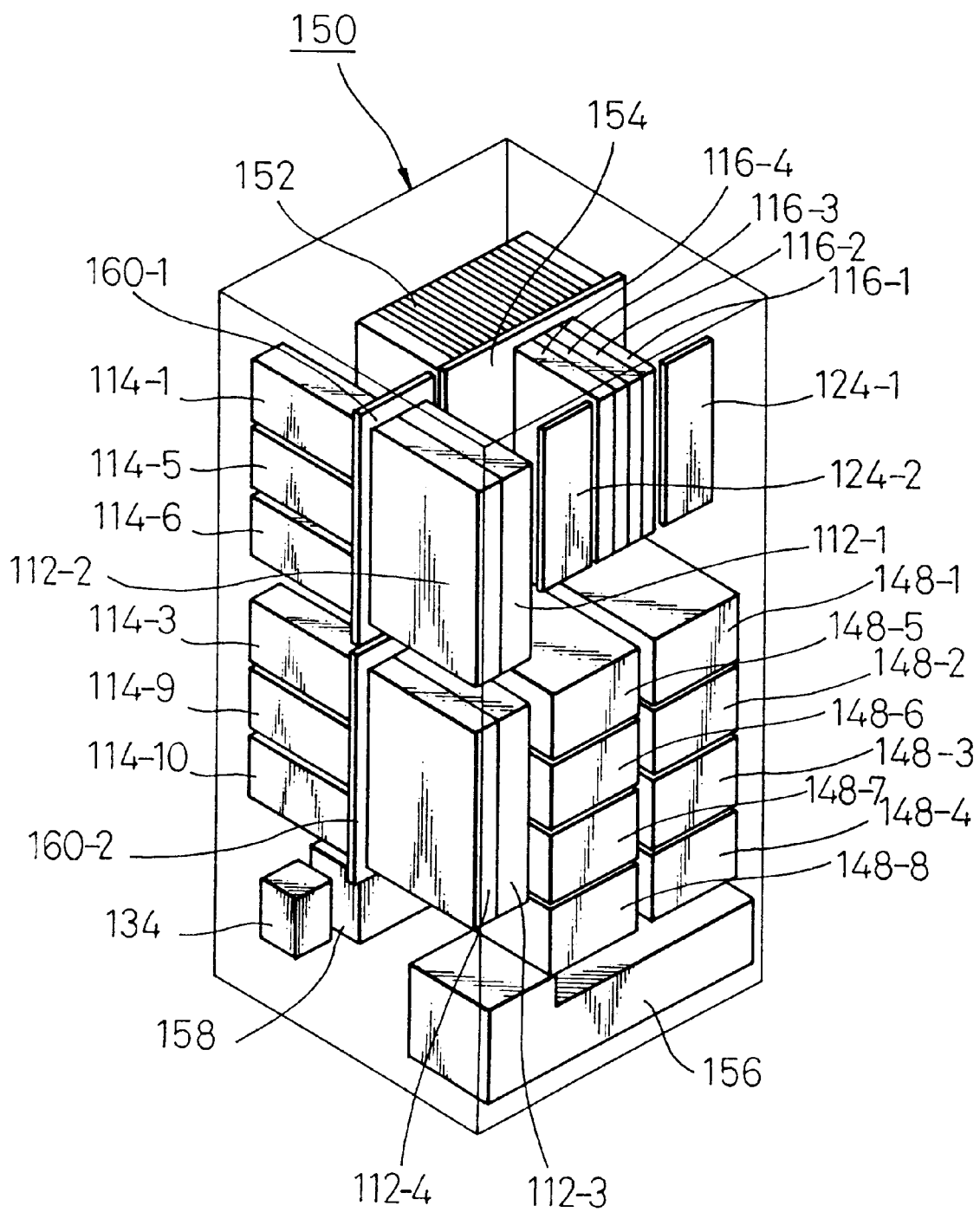
FIG. 1 is a view of the mounting structure of a magnetic disk apparatus according to the present invention.

FIG. 1 is a structural view of an example of a magnetic disk apparatus according to the present invention. This figure shows a locker type magnetic disk apparatus in a transparent state. As shown in the figure, the magnetic disk apparatus of the present invention is comprised of a locker 150 in which are housed a plurality of magnetic disk modules 148-1 to 148-8, a plurality of power units (AC/DC converters) 112-1 to 112-4 converting AC input voltage to a predetermined DC voltage and supplying the same to the magnetic disk modules 148, and a magnetic disk control apparatus 152. Two power units 112-1 and 112-2 are connected to a power mother board 160-1, while two power units 112-3 and 112-4 are plugged into a power mother board 160-2. Further, the mother boards 160-1 and 160-2 have connected to them back-up battery units 114-1 to 114-12. To one side of these batteries and mother board 160-1 and 160-2 are connected the power units 112-1 to 112-4, while to the other side are connected the back-up battery units 114-1 to 114-12. The power units 112 and the battery units 114 are connected to the mother boards 160 by a detachable plug-in system.

When providing a plurality of mother boards 160-1 and 160-2, power lines between them are commonly connected to make a common power supply.

Further, the magnetic disk modules 148-1 to 148-8 are provided with DC-DC converters 116-1 to 116-4 for converting DC input voltage from the power units 112-1 to 112-4 to a predetermined DC output voltage for the supply of power.

These magnetic disk modules 148, power units 112, mother boards 160, and a magnetic disk control apparatus 152 are mounted in a single locker.

In this case, the magnetic disk modules 148 and the magnetic disk control apparatus 152 are provided with DC/DC converters 116 which receive the same DC input voltage and output their own DC voltage.

In such a construction, by connecting a plurality of power units 112 by a mother board 160, it is possible to make common use of the power units 112 and therefore to duplex the power. Further, by connecting the battery units 114 to the mother board 160, it becomes possible to back up power at the time of a breakdown of the power supply or a power failure.

Further, the power units 112 output the same DC power as the battery units 114, so the same power lines can be used and the number of cables can be slashed. At the same time, compared with supplying high voltage AC power, by supplying low voltage DC power, it becomes possible to use cables with low insulation resistances and possible to slash the cable space.

Further, by connecting the power units 112 by the plug-in system, it is possible to easily change or increase the number of units. Similarly, by connecting the battery units 114 by the plug-in system, it is possible to easily change or increase the number of units.

Also, by housing DC/DC converters 116 supplying the same input voltage in the magnetic disk control apparatus 152 and magnetic disk modules 148, a single power line from the power units 112 is enough, the cable space can be drastically reduced, and the cable connection work can be improved.

In FIG. 1, the locker 150 constituting the housing of the magnetic disk apparatus, in this example, has eight magnetic disk modules 148-1 to 148-8 mounted in it. As shown in the figure, four each are disposed in two rows. Further, the control mother board 154 has a magnetic disk control apparatus 152 mounted to it. In the magnetic disk control apparatus 152, as mentioned later, are housed two directors and a common cache memory. On the opposite side of the control mother board 154 are mounted the DC/DC converters 116-1 to 116-4. On the two sides of the DC/DC converters 116 are provided control panels 124-1 to 124-2 corresponding to the two systems of power control.

On the power mother board 160-1 are mounted two AC/DC converters 112-1 to 112-2. Further, on the power mother board 160-2 are mounted two AC/DC converters 112-3 to 112-4. On the opposite side of the power mother board 160-1 are mounted five back-up units 114-1 and 114-5 to 114-8, while on the opposite side of the power mother board 160-2 are mounted the five battery units 114-3 and 114-7 to 114-12.

At the bottom of the locker 150 are installed a breaker housing box 134, an interface housing box 156, and an AC power lead-in box 158.

Figure 2:
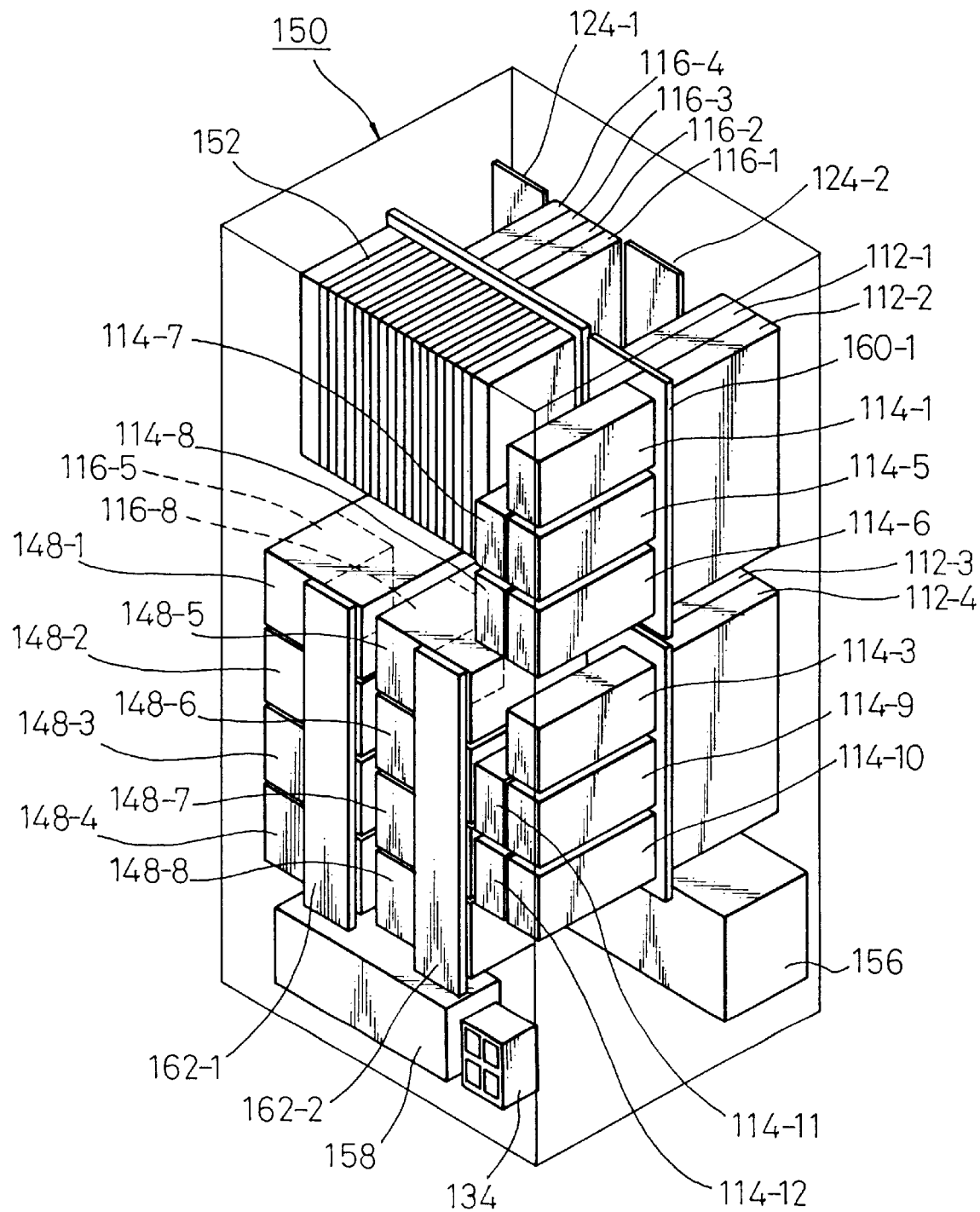
FIG. 2 is a structural view of the back surface of the mounting structure of FIG. 1.

FIG. 2 is an explanatory view showing the locker mounting structure of FIG. 1 from the back side in a transparent state in the same way.

In FIG. 2, it is seen that four magnetic disk modules 148-1 to 148-4 and 148-5 to 148-8 each are mounted with respect to the two drive mother boards 162-1 and 162-2 set at the rear side. Further, at the rear side of the power mother boards 160-1 and 160-2, five battery units 114-1 and 114-5 to 114-8 and battery units 114-9 to 114-12 each are mounted.

The AC-DC converters 112-1 to 112-4 and battery units 114-1 to 114-12 for the power mother boards 160-1 and 160-2 shown in FIG. 1 and FIG. 2 are attached detachably by a plug-in structure.

Figure 3:
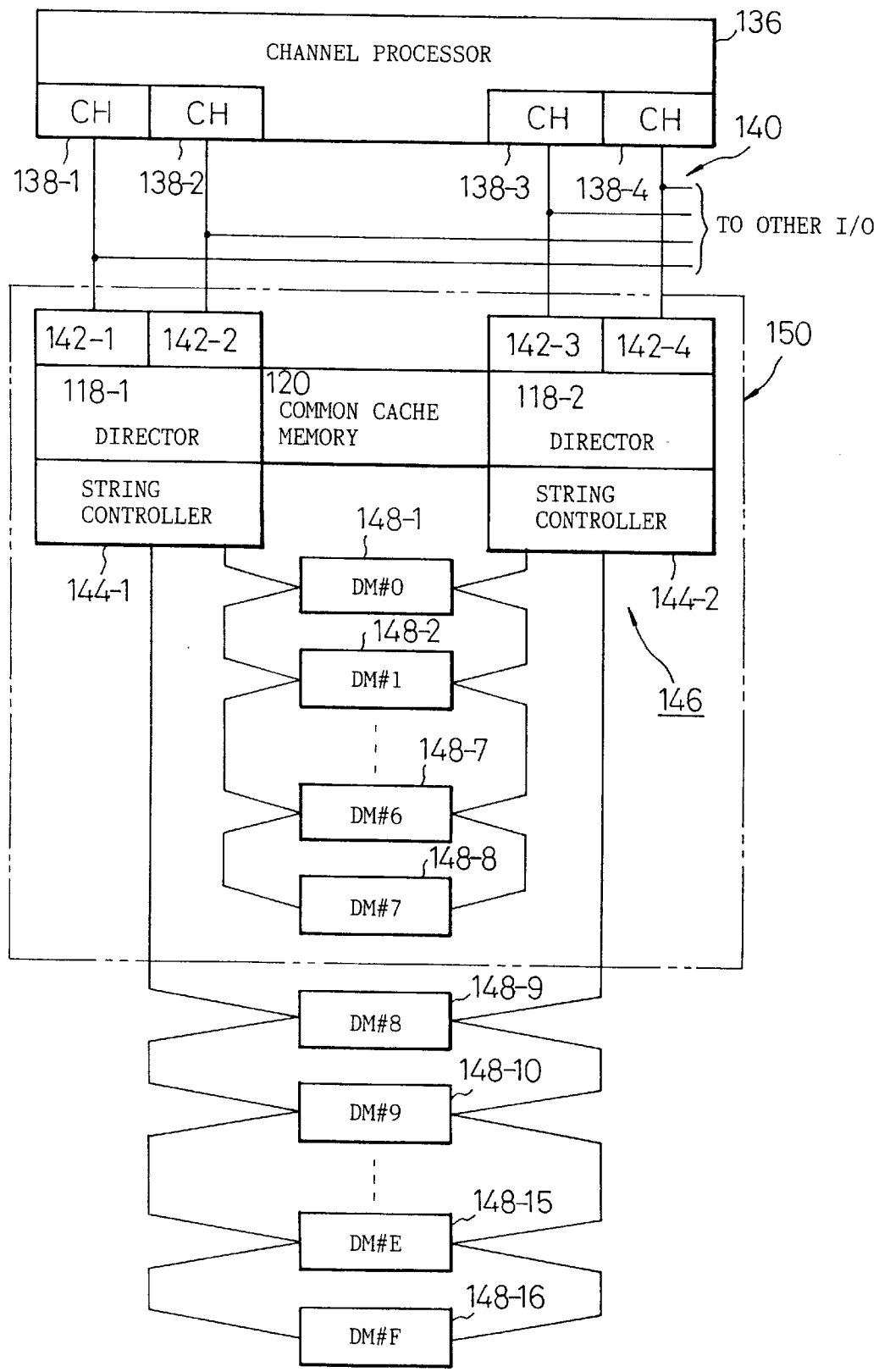
FIG. 3 is a block diagram showing the system constitution of FIG. 1.

FIG. 3 is a block diagram of a circuit showing a subsystem of a computer system using the magnetic disk apparatus of the present invention.

In FIG. 3, 136 is a channel processor which has four channels 138-1 to 138-4.

In the locker of the magnetic disk apparatus are provided directors 118-1 and 118-2, which function as the magnetic disk control apparatuses. These are connected to the channels 138-1 to 138-4 by BMC boards 142-1 to 142-4 through a BMC interface (block multiplexer channel interface) 140.

String controllers 144-1 and 144-2 are provided with respect to the directors 118-1 and 118-2, from which string controllers 144-1 and 144-2 are led out, for example, a total of four systems of buses, two for each system, by a device interface 146.

Further, in the embodiment of FIG. 1, eight magnetic disk modules 148-1 to 148-8 are mounted. The remaining magnetic disk modules 148-9 to 148-16 are mounted in a separate locker as a further addition.

The channel processor 136 is connected as a subsystem to the channels of a main storage control apparatus (MSC) of a computer system provided with a CPU, main storage control apparatus, and main storage unit (MSU).

Figure 4B:
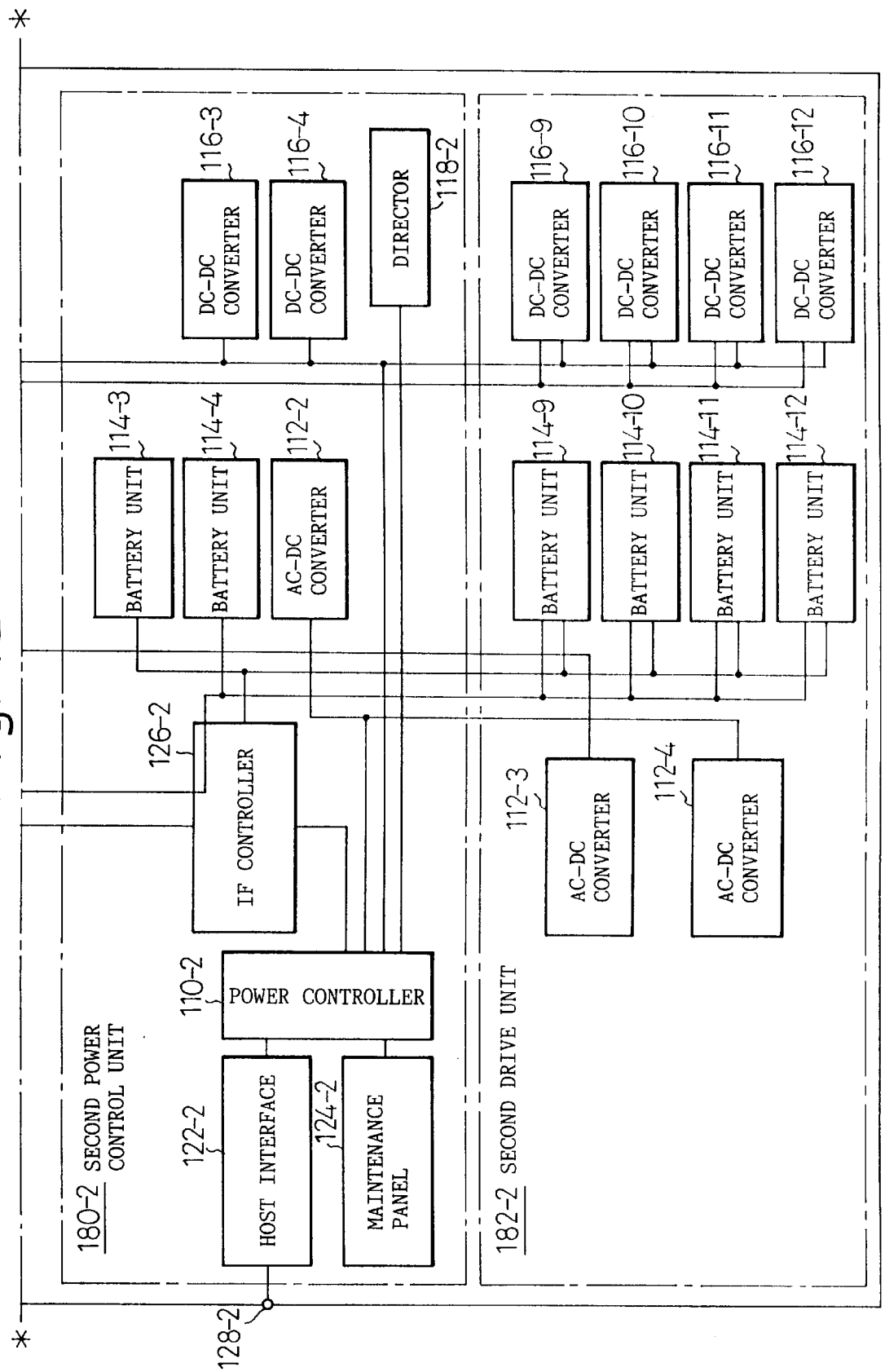
FIGS. 4A and B are a block diagram of a circuit showing a power control system of FIG. 1.

FIG. 4 is a block diagram of a circuit showing a power control system in the embodiment of FIG. 1 and FIG. 2.

In FIG. 4, a first power control unit 180-1 and a second power control unit 180-2 are provided in the magnetic disk control apparatus 152 of FIG. 1. Further, a first drive unit 182-1 is provided corresponding to the four magnetic disk modules 148-1 to 148-4 and a second drive unit 182-2 is provided corresponding to the magnetic disk modules 148-5 to 148-8.

In the first power control unit 180-2, a power controller 110-1 is provided, which controls the input and cut-off of power to the different components. The power controller 110-1 has connected to it through a higher interface 122-1 by a terminal 128-1, for example, an outside service processor (SVP) etc., which service processor gives a power input command which when received starts the control of the input of power of the apparatus as a whole.

The power controller 110-1 also is provided with a maintenance panel 124-1, which is provided with switches for manually inputting or cutting off power units under the control of the power controller 110-1 and a 7-segment display which shows the alarm state of the power units.

The control lines from the power controller 110-1 are allocated individually to the director 118-1, DC-DC converters 116-1 and 116-2, AC-DC converter 112-1, and battery units 114-1 and 114-2. Further control lines from the power controller 110-1 to the battery units 114-1 and 114-2 are laid through an interface controller 126-1.

The construction of the second power control unit 180-2 side is the same.

The battery units 114-5 to 114-8 and the DC-DC converters 116-5 to 116-8 provided at the first drive unit 182-1 are given control lines of two systems from the power controllers 110-1 and 110-2.

The battery units 114-9 to 114-12 and the DC-DC converters 116-9 to 116-12 provided at the second drive unit 182-2 are given control lines of two systems from the power controllers 110-1 and 110-2.

Further, the AC-DC converters 112-3 and 112-4 provided at the second drive unit 182-2 are also given control lines of two systems from the power controllers 110-1 and 110-2.

Therefore, the power controller 110-1 controls the units provided at the first drive unit 182-1 and the AC-DC converter 112-3 provided at the second drive unit 182-2, while the power controller 110-2 controls the units other than the AC-DC converter 112-3 provided at the second drive unit 182-2.

In this way, the components controlled by the power controllers 110-1 and 110-2 are determined in advance, but if either breaks down, the normal side places all of the power units under its control and controls the input or cut-off of power for the same, thereby achieving duplex control.

The common cache memory 120 is excluded from the scope of the control of power by the power controllers 110-1 and 110-2.

Figure 5B:
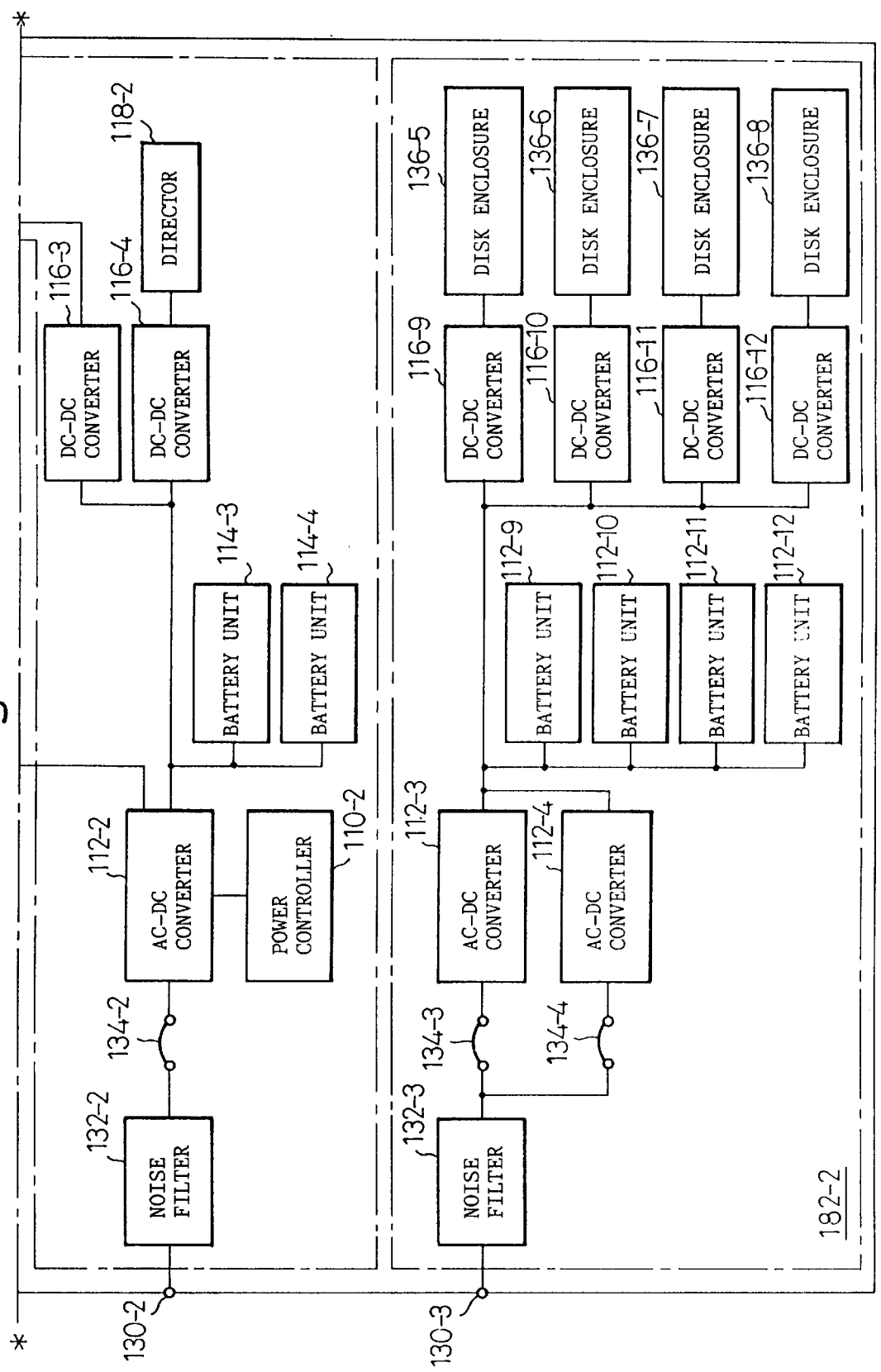
FIGS. 5A and B are a block diagram of a circuit showing a power supply system of FIG. 1.

FIG. 5 is a block diagram of a circuit showing the power supply system in the embodiment of FIG. 1 taken out.

In FIG. 5, the power supply system is divided into the power control unit 152 and the first and second drive units 182-1 and 182-2.

The power supply system in the power control unit 152 is provided symmetrically with respect to the common cache memory. For example, looking at the top of the common cache memory 120, the AC input from the AC input terminal 130-1 is input through a noise filter 132-1 and a breaker 134-1 to the AC-DC converter 112-1, which for example outputs DC 29V.

The AC-DC converter 112-1 supplies power to the power controller 110-1 to enable an ordinary operating state. Further, the DC 29V output of the AC-DC converter 112-1 is converted by the DC-DC converter 116-1 to for example DC ±5V and ±12V, which are supplied to the director 118-1. Further, this is converted to the same DC ±5V and DC ±12V at the DC-DC converter 116-1 and supplied to the common cache memory 120.

At the bottom side of the common cache memory 120 as well, similarly the AC input from the AC input terminal 130-2 is converted through the noise filter 132-2 and breaker 134-2 by the AC-DC converter 112-2 to DC 29V. This is converted to the predetermined DC voltage by the DC converters 116-3 and 116-2, then the power is supplied to the director 118-2 and the common cache memory 120.

Further, DC voltage is supplied to the power controller 110-2 by the AC-DC converter 112-2.

At the power lines of the AC-DC converters 112-1 and 112-2 are connected the battery units 114-1, 114-2 and 114-3, 114-4. The battery units 114-1 to 114-4 receive a supply of DC 29V from the AC-DC converters 112-1 and 112-2 in the normal state, so their internal cells are in a charged state. When the AC input is cut by a power failure or momentary power cut-off, they supply the same DC 29V as the AC-DC converters 112-1 and 112-2 to the DC-DC converters 116-1 to 116-3 so as to back up the directors 118-1 and 118-2 and the common cache memory 120.

On the other hand, the drive unit 182-1 is provided with the DC-DC converters 116-5 to 116-8. These receive in common DC 29V from the two AC-DC converters 112-1 and 112-2 provided at the power control unit 152 and supply DC ±5V and DC ±12V to the corresponding disk enclosures 136-1 to 136-4.

Here, the DC-DC converters 116-5 to 116-8 and the disk enclosures 136-1 to 136-4 are housed in the magnetic disk modules 148-1 to 148-4 shown in FIG. 3.

Further, the first drive unit 182-1 is provided with battery units 114-5 to 114-8 which are commonly connected to power lines from the AC-DC converters 112-1 and 112-2 and supply for example DC 24V in the event of a failure or momentary cut of the AC input so as to back up the converters 116-5 to 116-8.

The second drive unit 182-2 supplies the AC input from the AC input terminal 130-3 through the noise filter 132-3 and further through the breakers 134-3 and 134-4, which are divided into two systems, to the AC-DC converters 112-3 and 112-4. The AC-DC converters 112-3 and 112-4 convert the AC 100V input to DC 29V and supply the same as common power to the DC-DC converters 116-9 to 116-12.

The DC-DC converters 116-9 to 116-112 supply DC ±5V and DC ±12V to the disk enclosures 136-5 to 136-8. Further, the output lines of the AC-DC converters 112-3 and 112-4 have the battery units 112-9 to 112-2 commonly connected to them, which can provide back-up in the event of a power failure or momentary power cut.

Further, in the mounting structure of FIG. 1 and FIG. 2, the battery units 114-2 and 114-4 provided at the power control unit 152 of FIG. 5 are not mounted. The example is shown of the case of mounting the remaining 10 battery units.

FIG. 6 is an explanatory view showing the mounting structure shown in FIG. 1 and FIG. 2 taken out and spread open. The spread out view of FIG. 6 corresponds to the block diagram of the circuit of the power supply system shown in FIG. 5 and clarifies the state of connection of the units to the mother boards and the state of connection of the cables between the mother boards and the units.

In FIG. 6, the power mother boards 160-1 and 160-2 have plugged into them the AC-DC converters 112-1, 112-3, and 112-2, 112-4. The plugged-in state is realized by plugging in the connectors 66 attached to the units to the connectors 164 of the boards.

At the surface of the opposite side of the power mother boards 160-1 and 160-2 are plugged in the battery units 114-1, 114-5 to 114-8 and 114-3, 114-9 to 114-12 by the plug-in construction using the connectors 164 and 166.

Further, the drive mother boards 162-1 and 162-2 have plugged into them, respectively, the magnetic disk modules 148-1 to 148-4 and 148-5 to 148-8. Further, the magnetic disk modules 148-1 to 148-8 house the DC-DC converters 116-5 to 116-12.

Further, the control mother board 54 has plugged into it four DC-DC converters 116-5 to 116-12.

The power mother boards 160-1 and 160-2 are connected by the power cables 170-1 and 170-2 to make common use of the power as shown in the power system diagram of FIG. 5. Further, the mother board 160-1 and the drive mother board 162-1 are connected by the power cable 172-1. Similarly, the power mother board 160-2 and drive mother board 162-2 are connected by the power cable 172-2. At this portion as well, common use is made of the power as shown by the power system diagram of FIG. 5.

Further, the DC-DC converters 116-1, 116-2 and 116-3, 116-4 are supplied with power by the power cables 170-3 and 170-4 individually from the power mother boards 160-1 and 160-2.

As explained above, according to the construction of the magnetic disk apparatus according to the present invention, by connecting a plurality of power units to the mother boards, it is possible to make common use of a plurality of power units without the need for power cables and it is possible to reduce the amount of power cables used and therefore realize a higher density of mounting in the apparatus.

Further, by mounting the battery units at the back side of the mother boards on which the power units are mounted, it is possible to realize back-up at the time of breakdown of the power supply or power failure and it is possible to realize a higher density of mounting since the battery units as well need not be connected by cables.

Also, by making the construction one which the power units and battery units are detachably plugged in, it is possible to suitably set the power capacity required for additional installation of magnetic disk modules.

Further, by providing DC-DC converters at the magnetic disk control apparatus and the magnetic disk modules and performing the conversion to the required DC voltage at the same, it is possible to make the DC voltage supplied from the power units provided at the mother boards the same voltage and therefore connection by a single power cable is sufficient, so the amount of the power cables used can be further reduced.

Next, an explanation will be made of the back-up by the battery units at the time of a power failure according to the present invention. Before explaining the present invention, the conventional system and its problems will be described.

Figure 17:
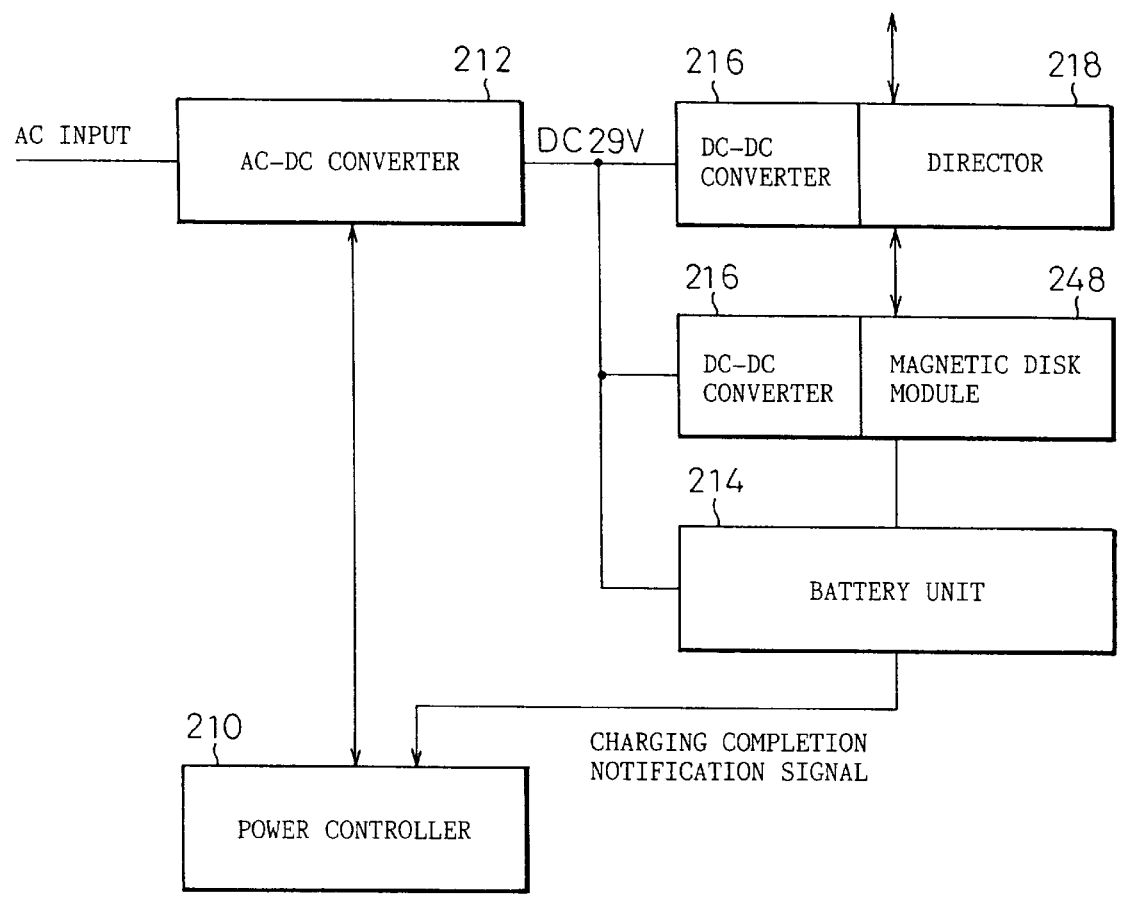
FIG. 17 is a structural view of an example of a conventional magnetic disk apparatus housing a battery unit.

FIG. 17 is a structural view of key portions of a magnetic disk apparatus housing a battery unit.

In FIG. 17, 212 is an AC-DC converter which functions as a power unit. This receives as input AC 100V and converts it, for example, to DC 29V. The power from the AC-DC converter 212 is supplied to a director 218, which functions as a magnetic disk control apparatus, and the magnetic disk module connected under the control of the director 218.

Further, the director 218 and the magnetic disk module 248 accommodate DC-DC converters 216 which produce the DC voltage required for the same. Several magnetic disk modules 248 are actually installed, but for the purpose of simplification of the explanation, only one is shown.

The power line from the AC-DC converter 212 has connected to it a battery unit 214. In the battery unit 214 is provided a circuit which detects when the charging is completed and outputs a charging completion notification signal when the charging current falls below a predetermined value.

The battery unit 214 is charged with DC 29V from the AC-DC converter 212. If a power failure occurs in the state where the charging of the unit has been completed, it is possible to guarantee the supply of power over a guaranteed back-up time $T_1$ determined by the battery capacity.

The power controller 210 receives instructions from a higher apparatus to control the input and cut-off of power. When a power failure is detected, further, the director 214 ends the I/O processing of the magnetic disk module 248 within the back-up time $T_1$ guaranteed by the battery unit 218, then stops the operation of the AC-DC converter 212 and the DC-DC converters 216 and cuts the power.

However, in a magnetic disk apparatus provided with such a power back-up function, there is the problem that if a power failure occurs in the state before the charging of the battery unit is completed, a mistaken charging completion notification signal is sent due to the power failure and the power back-up time is not guaranteed, yet back-up processing the same as at the time of the completion of the charging ends up being performed.

Figure 18:
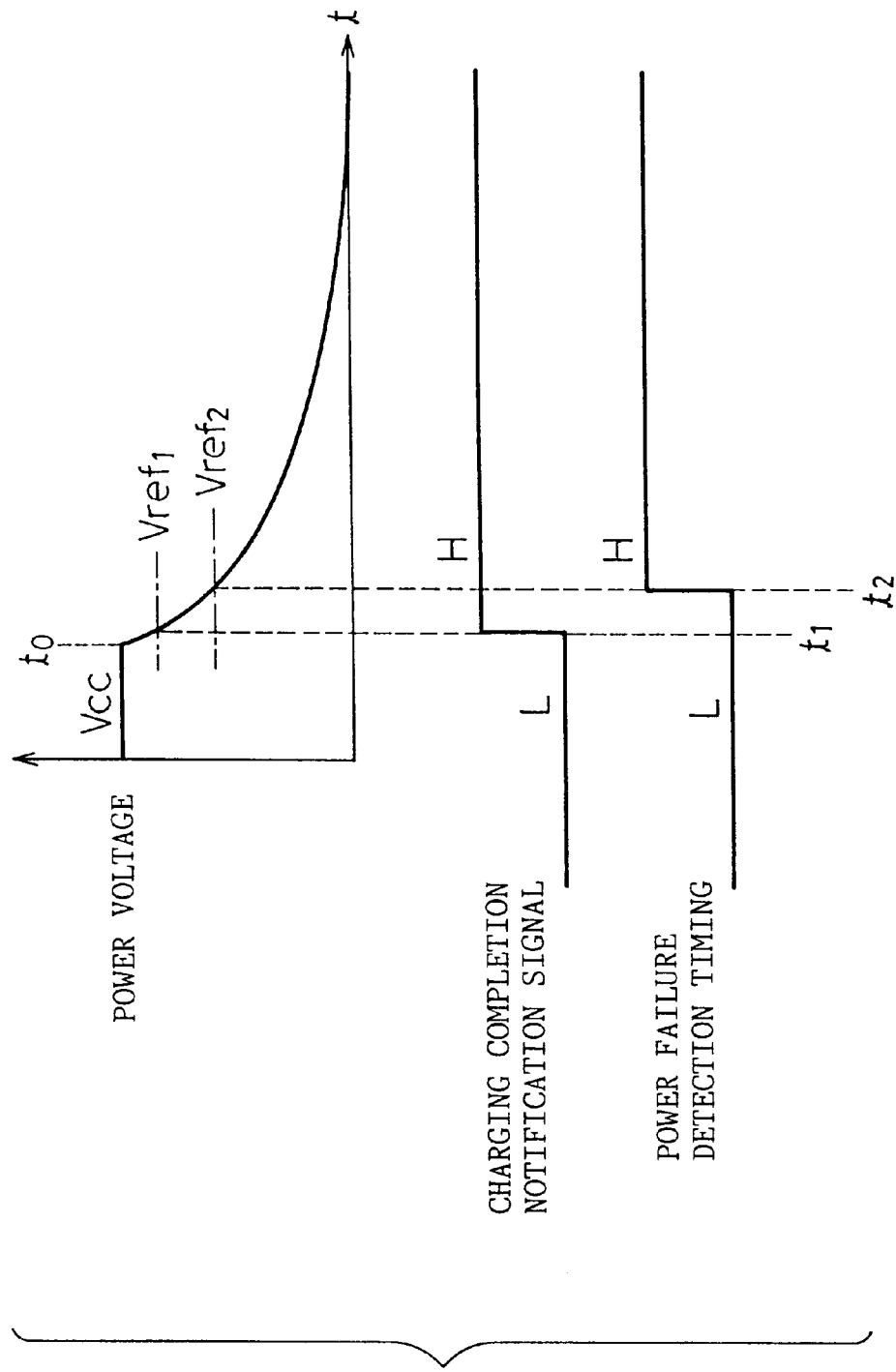
FIG. 18 is a timing chart of the charging completion notification signal issued mistakenly at the time of a power failure in the prior art.

FIG. 18 is an explanatory view of the problems in the prior art. These will be explained below in more detail referring to FIG. 18. If a power failure occurs at a time $t_0$ when the charging of the battery unit 214 is not completed and the charging completion signal is the L level, the power voltage Vcc starts to gradually fall. The completion of charging of the battery unit 212 is detected when the charging current falls below a predetermined value. When the power voltage Vcc falls to $Vref_1$ along with a power failure at the time $t_0$, the charging current also falls below a prescribed value, the completion of charging is mistakenly detected at the time $t_1$, and the charging completion notification signal to the power controller 210 is made the H level.

Next, at the time $t_2$, the power controller 210 detects a power failure by the power voltage Vcc falling below the reference voltage $Vref_2$.

If the power controller 210 detects a power failure at the time $t_2$, it reads in the charging completion notification signal obtained at that time and judges if the charging has been completed. In this case, the charging has actually not yet been completed, but since the charging completion notification signal is at the H level showing completion, it is judged that the charging has been completed, the director 218 is instructed to continue the normal I/O processing over the guaranteed back-up time $T_1$, then end the I/O processing for the power cut-off, a response is awaited, then the power is cut.

The battery unit 214, however, is insufficiently charged and the power voltage from the battery unit 214 falls below the operating level of the director 218 and the magnetic disk module 248 during the power back-up time $T_1$, so there is the problem that the subsystem stops and therefore the computer system is abnormally ended or data is destroyed.

The present invention was made in consideration of this problem in the prior art and has as its object to enable power to be suitably cut off without causing the system to abnormally end or data to be destroyed even if a power failure occurs before the completion of the charging of the battery.

Figure 8:
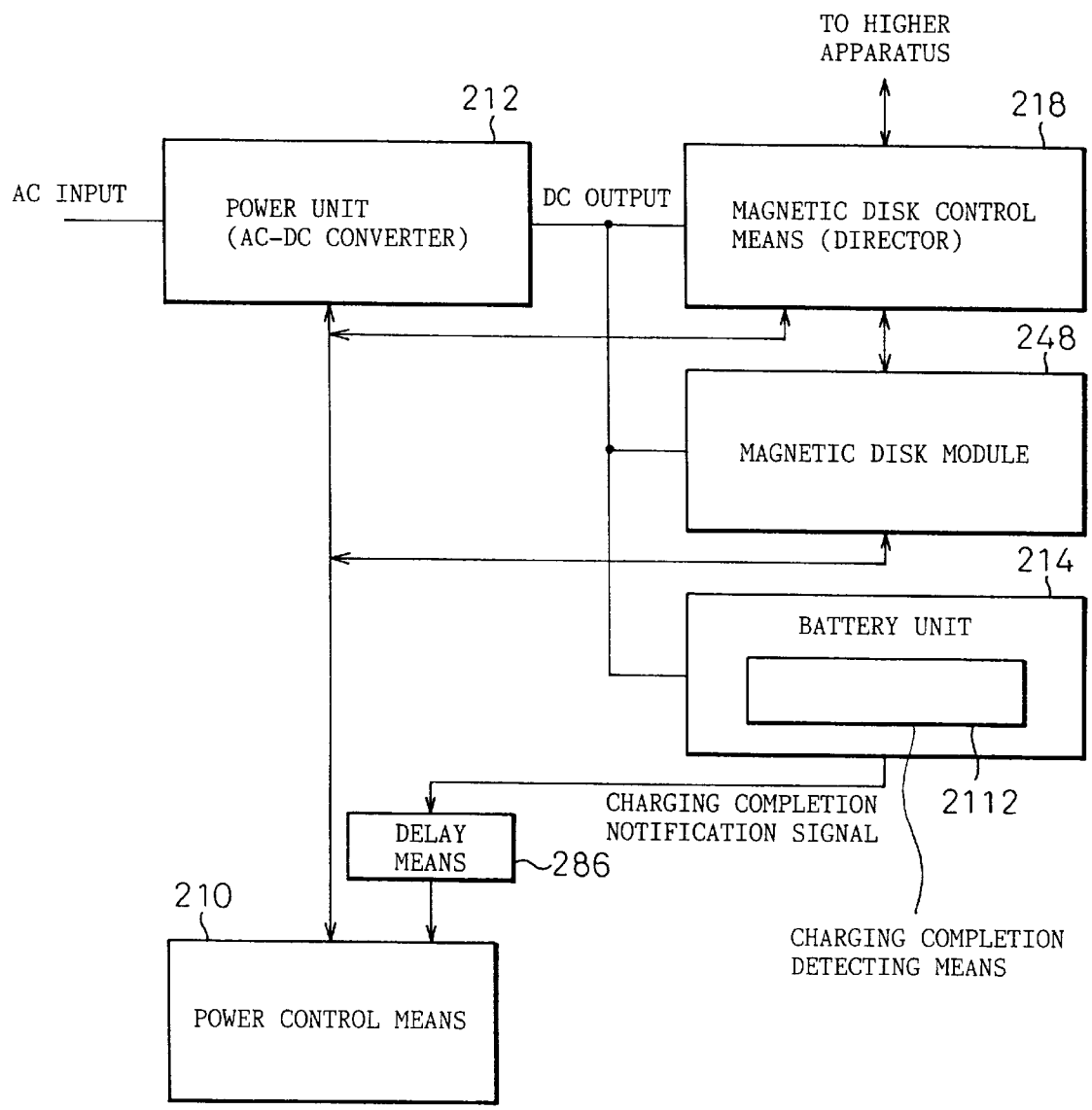
FIG. 8 is a basic structural view of a back-up for power failure according to the present invention.

FIG. 8 is a basic explanatory view of the back-up by the battery at the time of a power failure according to the present invention.

First, the magnetic disk apparatus to which the present invention is applied is provided with a magnetic disk module 248 connected under the control of a magnetic disk control apparatus (director) 218, a power unit (AC-DC converter) 212 for converting an input voltage from an external power supply to a predetermined DC voltage and then supplying the same to the magnetic disk module 248, a battery unit 214 for supplying a DC voltage the same as the power unit 212 to the disk module 248 at the time of a power failure, and a power control means (power controller 210) for controlling the input and cut-off of power to the power unit 212 and the magnetic disk module 248.

In this magnetic disk apparatus, in the present invention, first, the battery unit 214 is provided with a charging completion detecting means 2112 for judging if the charging of the built-in cells has been completed and outputting a charging completion notification signal to the power control means 210 when the charging current falls below a predetermined value. Further, the power control means 210 is provided with a charging completion invalidating means which invalidates a charging completion detection signal output from the charging completion detecting means at the time of detection of a power failure and enables judgement as to if charging has not yet been completed at a time of detection of a power failure when a charging completion notification signal is output while the charging current is falling due to a power failure which occurs before the completion of charging.

Further, provision is made of a delay means (counter) 268 for delaying the charging completion notification signal from the charging completion detecting means 2112 by a predetermined time and then supplying the same to the power control means 210. When a charging completion notification signal is output due to the fall of the charging current due to a power failure occurring before the completion of charging of the battery unit 214, the charging completion notification signal is made to be received after the time of detection of the power failure by the power control means 210 at the delay caused by the delaying means 286 and thus it is made possible to detect that the charging has not yet been completed at the time of detection of the power failure.

Further, instead of the delay means 2112, provision may be made in the power control means 210 of a charging completion judging means for reading in and holding the charging completion notification signal every predetermined period, reading out the charging completion detection signal detected a predetermined time before at the time of detection of a power failure, and thereby judging the completion of the charging.

Using this charging completion judging means as well, it is possible to judge if the charging has not yet been completed at the timing of detection of a power failure when a charging completion notification signal is output due to a fall in the charging current caused by a power failure before the completion of charging by the battery unit 214.

Here, the power control means 210, when judging that the charging has been completed at the timing of detection of a failure, instructs the disk control means 218 to disconnect the magnetic disk module 248 after a predetermined back-up time $T_1$ elapses and stops the supply of power by the power unit 212 when receiving a cut-off authorization response from the magnetic disk control means 218.

Further, when judging that the charging has not yet been completed at the time of detection of a power failure, it does not wait for the elapse of the predetermined back-up time $T_1$, but immediately instructs the disk control means 218 to disconnect the magnetic disk module 248 and stops the supply of power by the power unit 212 when receiving a cut-off authorization response from the magnetic disk control means 218.

Also, when not receiving a cut-off authorization response from the magnetic disk control means 218 even after the elapse of a predetermined time $T_2$ from when a request for cut-off is made, it stops the supply of power by the power unit 212 without receiving cut-off authorization.

According to a magnetic disk apparatus of the present invention provided with such a construction, even if a power failure occurs before the completion of charging of the battery unit 214, completion of charging is mistakenly detected due to the fall in the charging current accompanying the power failure, and a charging completion notification signal is output, this is sent to the power control means 210 after being delayed by a predetermined time by the delay means 286.

Therefore, even if a power failure is detected by the power control means 210 after the charging completion notification signal is sent, the charging completion notification signal still shows that the charging has not yet been completed at this time and therefore it is possible to judge that the charging has not yet been completed, which shows the actual charging state, at the time of detection of a power failure.

Accordingly, disconnection of the magnetic disk module 248 is instructed to the magnetic disk control means 218 immediately without continuing the normal I/O operation over a predetermined back-up time $T_1$. Therefore, receipt of a new I/O request by the magnetic disk module 248 is prohibited. When the I/O processing currently being performed or received ends, the disconnection is performed and cut-off authorization is notified to the power control means 210.

Based on this cut-off authorization response, the power control means 210 cuts the supply of power to the magnetic disk module 248 and stops the subsystem.

Therefore, even if a mistaken charging completion signal is sent due to a power failure, it is judged that the charging has not yet been completed, the I/O processing is immediately ended and the power cut, and therefore it is possible to reliably prevent an abnormal ending of the system and destruction of data at the time of a power failure.

FIG. 9 shows the power supply system and control system in the magnetic disk apparatus of the present invention shown in FIG. 4 and FIG. 5 taken out at the power controller 110-1 (210-1) side. For simplification of the explanation, only the AC-DC converter 212-1 (112-1), the DC-DC converter 216-5 (116-5), and the battery unit 214-5 (114-5) are taken out and shown.

In FIG. 9, a microprocessor 260 is provided in the power controller 210-1, which in turn is provided with, by program control, a first timer 275-1 which measures a back-up time $T_1$ during which a normal I/O processing is guaranteed at the time of a power failure and a second timer 275-2 for monitoring a disconnection processing time $T_2$ after the elapse of a back-up time $T_1$.

Connected to the internal bus 262 from the microprocessor 260 are a RAM 264, a ROM 266, an interface unit 268 to another power controller 210-2, a director interface unit 270 to the director 218-1, a panel interface unit 272 to a maintenance panel 224-1, a host interface unit 274 to a service processor of a host computer, a disk interface unit 276 to a magnetic disk module 248-1, a converter interface unit 278 to an AC-DC converter 212-1 and a DC-DC converter 216-5, and a battery interface unit 284 to a battery unit 214-5.

A charging control signal El and battery test signal $E_2$ are output from the battery interface unit 284 to the battery unit 214-5. Further, a charging completion notification signal $E_3$ and a battery abnormality notification signal $E_4$ are output from the battery unit 214-5.

Here, the charging completion notification signal $E_3$ from the battery unit 214-5 is input to the counter 286 used as the delay means. The count operation is started from the time of input. After a predetermined time, the delayed charging completion notification signal $E_{30}$ is output from the battery interface unit 284.

FIG. 10 is a circuit diagram showing an embodiment of the battery unit 214-5 of FIG. 9.

In FIG. 10, the positive and negative terminals 288-1 and 288-2 are connected to the power line from the AC-DC converter 212-1 and receive DC 29V. The input DC 29V is supplied through the charging current detection circuit 290, the stabilization circuit 292, the diode 294, and the breaker 296 to the battery 298, whereby the battery 298 is charged.

The stabilization circuit 292 holds the charging current to the battery 298 constant and restricts the rush current at the time of the start of the charging.

The charging current detection circuit 290 detects the charging current to the battery 298. More specifically, it detects the voltage corresponding to the charging current by passing the charging current through a resistor.

The detection signal of the charging current detection circuit 290 is given to a charging completion detection circuit 2112. This compares the detected voltage corresponding to the charging current with a predetermined reference voltage $Vref_1$ and, when the detected voltage falls below the reference voltage $Vref_1$, that is, when the charging current falls below a prescribed value, generates a charging completion detection output and outputs the charging completion notification signal $E_3$ from the interface circuit 2110.

In parallel with the serial circuits of the charging current detection circuit 290, the stabilization circuit 292, and the diode 294 is connected from the battery 298 side a circuit comprised of the charging control switch 2100 and diode 2102 connected in series. The charging control switch 2100 receives a discharge control signal $E_1$ for the interface circuit 2110 and turns on and connects the plus side of the battery 298 through the diode 2102 to the outside power line.

Therefore, if the discharge control switch 2100 is closed, even if the DC 29V from the AC-DC converter 212 is cut due to a power failure, the same DC 29V charged in the battery 298 is supplied through the breaker 296, discharge control switch 2100, and diode 2102 to the outside.

Further, a test switch 2104 and discharge resistors 2106 and 2108 are connected in series in parallel with the battery 298. The test switch 2104 is given a test signal $E_2$ through the interface circuit 2110 to turn the test switch 2104 on, whereby a discharge current flows from the battery 298 to the discharge resistors 2106 and 2108 and a discharge test of the battery 298 is performed. Further, at the time of a discharge test, the discharge control switch 2100 is turned off.

In a discharge test, if the battery 298 is abnormal, when a discharge current is passed to the discharge resistors 2106 and 2108 over a predetermined time, the voltage of the battery 298 falls considerably. The voltage of the battery 298 is input to the battery abnormality detection circuit 2114 as a divided voltage of the discharge resistors 2106 and 2108. The battery abnormality detection circuit 2114 detects that the battery is abnormal and outputs a battery abnormality notification signal $E_4$ when the detected voltage falls below a predetermined voltage at the time of a discharge test.

FIG. 11 is a timing chart showing the charging completion notification signal at the time when a power failure occurs before the completion of charging of the battery unit 214-5 in the power controller 210-1 and the timing of detection of a power failure in the power controller 210-1.

In FIG. 11, assuming that a power failure occurs in a state where the charging of the battery unit 214-5 has not been completed, that is, at a time $t_0$ where the charging completion notification signal $E_{30}$ obtained through the counter 286 is at the L level, in the battery unit 214-5 shown in FIG. 10, the input DC voltage falls due to the power failure in the middle of charging of the battery 298, so the charging current falls and the voltage detected by the charging current detection circuit 290 falls. When the detected voltage of the charging current falls below the reference voltage $Vref_1$, the charging completion detection circuit 2112 judges that the charging has been normally completed regardless of the fall of the detected voltage due to the power failure and outputs the charging completion notification signal $E_3$ through the interface circuit 2110.

However, the charging completion notification signal $E_3$ from the battery unit 214-5 is input to the counter 286. At the counter 286, this is delayed by exactly a predetermined time, for example, a predetermined time AT exceeding the time from when a power failure occurred at the time $t_0$ in FIG. 11 to the time $t_2$ where the power failure is detected by the power controller 210-1, then is input to the battery interface unit 284 of the power controller 210-1.

For this reason, even if, at the time $t_2$, a microprocessor 260 provided at the power controller 210-1 detects a power failure through the converter interface unit 278 when the DC output voltage of the AC-DC converter 212-1 falls below the reference voltage $Vref_2$, since the charging completion notification signal $E_{30}$ is at the L level, showing that the charging has not yet been completed, at the time of detection of the power failure, it is possible to judge that the charging of the battery unit 214-5 has not yet been completed.

When it is judged that the charging of the battery unit 214-5 has not yet been completed, this instructs the disconnection of the magnetic disk module to the director 218-1 immediately without waiting for the elapse of the back-up time $T_1$ guaranteed in the state of completion of charging. The director 218-1 prohibits the receipt of new I/O requests and disconnects the magnetic disk module awaiting the completion of the I/O processing already received, and sends back a cut-off authorization response. Receiving this response, the power controller 210-1 stops the operation of the AC-DC converter 212-1 and the DC-DC converter 216-5 and cuts the power of the director 218-1 and the magnetic disk module 248-1.

Further, in the embodiment of FIG. 9, the example was taken of the DC-DC converter 216-5 and the battery unit 214-5 of the magnetic disk module 248-1, but the same type of processing is performed for the other magnetic disk modules 248-2 to 248-3 under the control of the power controller 210-1 and the power is cut off for the director 218-1 as well.

Further, like with the power controller 210-1, the power controller 110-2 of the other system shown in FIG. 4 and FIG. 5 is exactly the same.

FIG. 12 is a flow chart showing the power control by the processor 260 provided at the power controller 210-1 shown in FIG. 9.

In FIG. 12, first, at step S1, if it is judged that there is an input command for the system power from a service processor or other higher apparatus, then at step S2 the count n is set to n=1 and the first unit among the four DC-DC converters provided in the four magnetic disk modules 248-1 to 248-4 is instructed to turn on. At step S4, it is judged if the count n has reached n=4. If less than 4, then at step 5, the count is incremented by 1 and the power on procedure of step S3 is repeated.

By this, the four DC-DC converters under the control of the power controller 210-1 are successively activated.

Next, at step S6, n is made 1, then at step S7, it is checked if the first battery unit designated by n=1 is mounted or not. If normally mounted, then at step S8, the first battery unit of n=1 set at step S6 is instructed to turn on. By this power-on instruction, a discharge control signal $E_1$ is sent to the corresponding battery unit, the discharge control switch 2100 shown in FIG. 10 is turned on, and the battery unit enters a dischargable state.

After this, the processing of step S10, step S7, and step S8 is repeated until the fourth battery unit is turned on at step S9.

Further, if the battery is not yet mounted at step S7, the routine proceeds to step S16, where an alarm processing is performed and, for example, the system is made to stop.

When the four battery units are finished being turned on by the processing up to step S9, at step S11, a timer determining the battery test period is activated. Next, at step S12, it is judged if the timer determining the battery test period has run out of time. If it has not yet run out of time, the power failure monitoring processing of step S14 is repeated until the time runs out. If it is judged at step S12 that the time has run out, the routine proceeds to step S13, where the battery test processing is performed.

In the battery test processing at step S13, at the same time the test switch 2104 provided at the battery unit of FIG. 10 is turned on, the discharge control switch 2100 is turned off, a discharge current is passed to the discharge resistors 2106 and 2108 from the battery 298 for a predetermined time, and the divided voltage of the discharge resistors 2106 and 2108 after the elapse of a predetermined time is judged by the battery abnormality detection circuit 2114. When it is below a predetermined voltage, it is judged that the battery 298 is abnormal, and a battery abnormality notification signal $E_4$ is sent from the interface circuit 2110 to the power controller 210-1.

The power failure monitoring processing at step S14 consists of the processing shown in the subroutine of FIG. 9.

Figure 13:
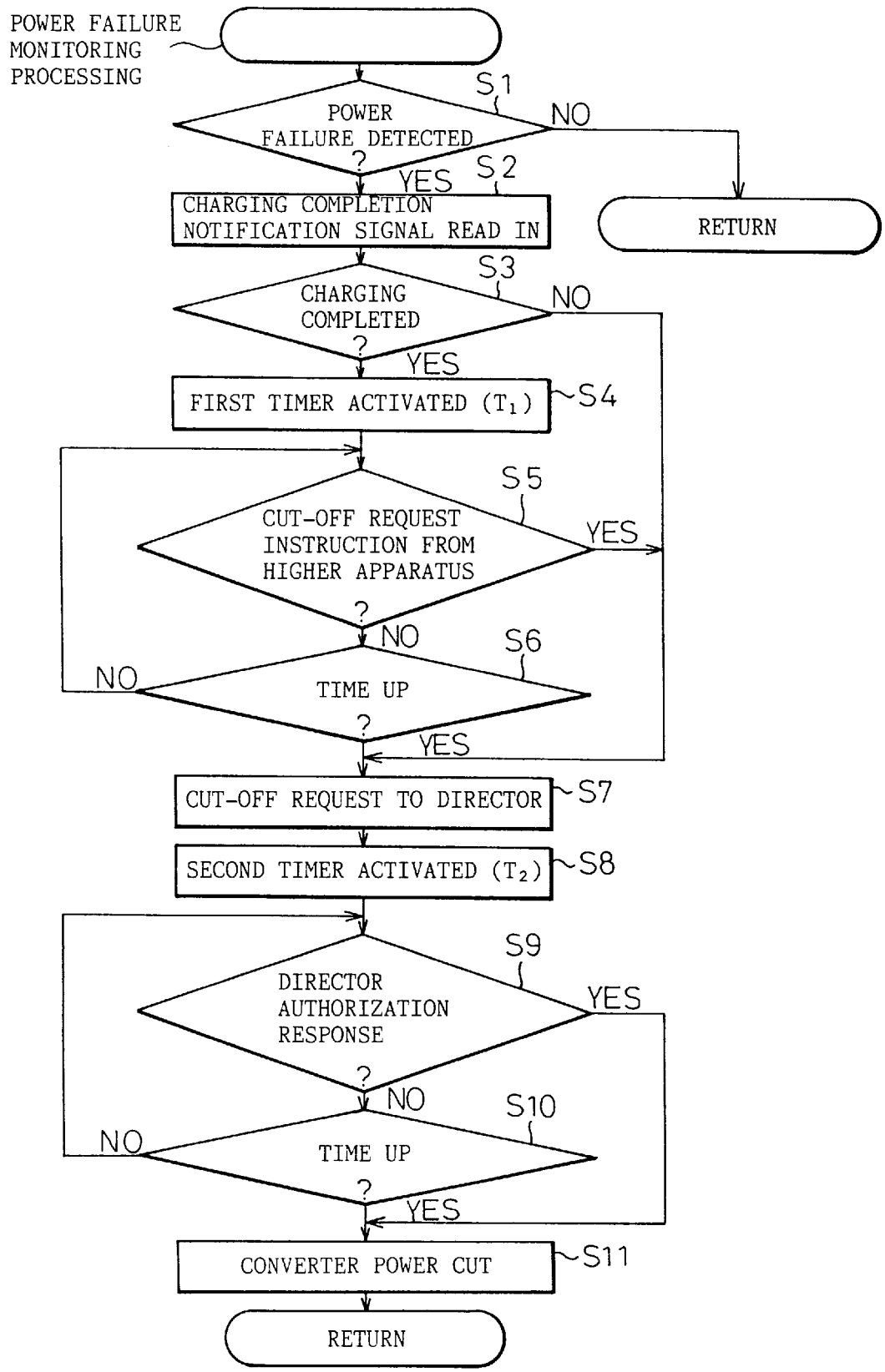
FIG. 13 is a flow chart having as a subroutine the power failure monitoring processing in FIG. 9.

In the flow chart of FIG. 13, first, at step S, when the power controller 210-1 detects a power failure, the routine proceeds to step S2, where the charging completion notification signal $E_{30}$ obtained from the counter 286 at this time is read. At step S3, the completion of charging is judged. If the charging is completed, the routine proceeds to step S4, where the first timer for counting the back-up time $T_1$ is activated.

Next, at step S5, it is checked if there was a cutoff request instruction from the higher apparatus, then at step S6, it is checked if the first timer has run out of time.

When a power failure has occurred even at the higher system, the higher system detects the power failure, the I/O request is continued to the subsystem for a predetermined time, then a request for cut-off is made, so in this case the routine proceeds to step S7 without waiting for the elapse of the back-up time $T_1$ and a request for cut-off is sent to the director 218-1.

Further, even without a cut-off request instruction from the higher apparatus, if it is judged that the time has run out due to the elapse of a back-up time $T_1$ due to activation of the first timer at step S6, the routine proceeds to step S7, where a cut-off request is made to the director 218-1. Next, at step S8, a second timer for monitoring the processing time $T_2$ for the cut-off request is activated.

The director 218-1, receiving the cut-off request, prohibits the receipt of a new I/O request and makes the magnetic disk module end the I/O processing currently being received. When the I/O processing of the magnetic disk module ends, the director 218-1 disconnects the magnetic disk module and creates a state where the power can be cut off, so cut-off authorization is sent back to the power controller 210-1.

When it is judged at step S9 that cut-off authorization from the director 218-1 has been sent back, the routine proceeds to step S11, where the operation of the AC-DC converter and DC-DC converter under its control is stopped and the power is cut off.

Further, when no cut-off authorization has been sent back by the director 218-1 at step S9, there is an abnormality in the magnetic disk module. In this case, at step S10, it is awaited until the set time $T_2$ of the second timer runs out, then the power is cut off at step S11.

Figure 14B:
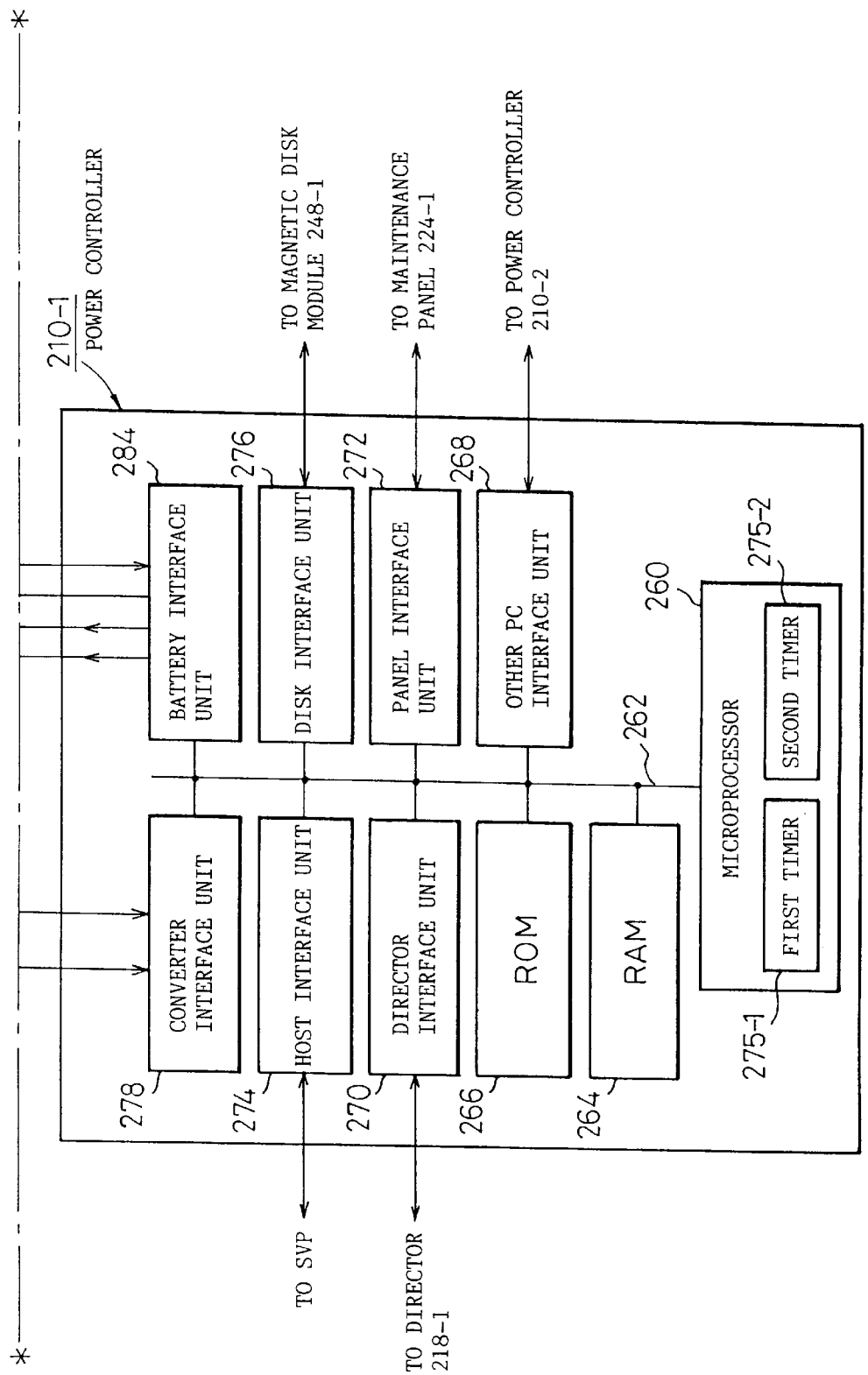
FIGS. 14A and B are a block diagram of a circuit of another example showing the power supply system of FIG. 8.

FIG. 14 is a structural view of another embodiment of the present invention. In the embodiment of FIG. 9, the charging completion notification signal $E_3$ from the battery unit 214-5 was delayed by passing it through a counter 286, but in the embodiment of FIG. 14, the counter 286 is eliminated and the microprocessor 260 checks the charging completion notification signal which was read in and held more than a predetermined time before and judges if the charging has been completed.

Figure 16:
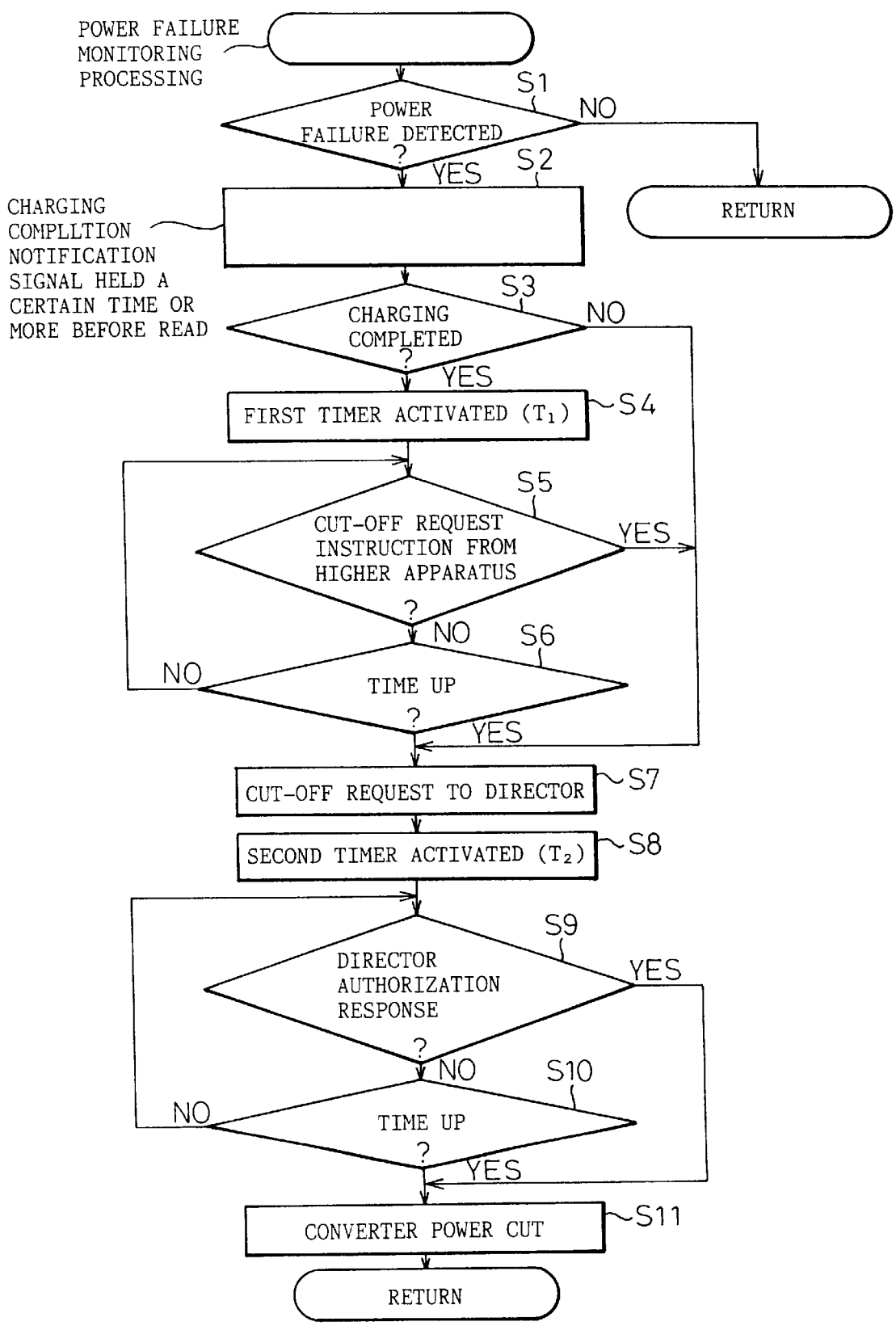
FIG. 16 is a flow chart showing the power control routine in FIG. 14.

That is, the microprocessor 260 of the power controller 210-1 reads in the charging completion notification signal $E_3$ from the battery unit 214-5 every predetermined period shown by the arrow in FIG. 16 and holds a plurality of periods worth-of the signal in the RAM 264.

If a power failure occurs at the time $t_0$ in this state, due to the fall of the power voltage Vcc caused by the power failure, the charging current from the battery unit 214-5 falls below a prescribed value. On the basis of this, the charging completion signal $E_3$ becomes the H level.

Next, when the power voltage Vcc falls below the reference voltage $Vref_2$, the power controller 210-1 detects that there has been a power failure. The charging completion notification signal $E_3$ at this time becomes the H level as shown by the timing of the arrow 2118 to show the completion of charging, but in the present invention, the charging completion notification signal $E_3$ detected a predetermined time before, for example, at the previous timing shown by the arrow 2116, is read out and judged, so the charging completion notification signal $E_3$ is at the L level and it is judged that the charging has not yet been completed.

FIG. 16 is a flow chart showing a subroutine of power failure monitoring processing by the microprocessor 260 provided at the power controller of FIG. 14. If a power failure is detected at step S1, then the charging completion notification signal held in the RAM 64 a predetermined time or more before is read at step S2 and it is judged at step S3 if the charging has been completed.

Figure 15:
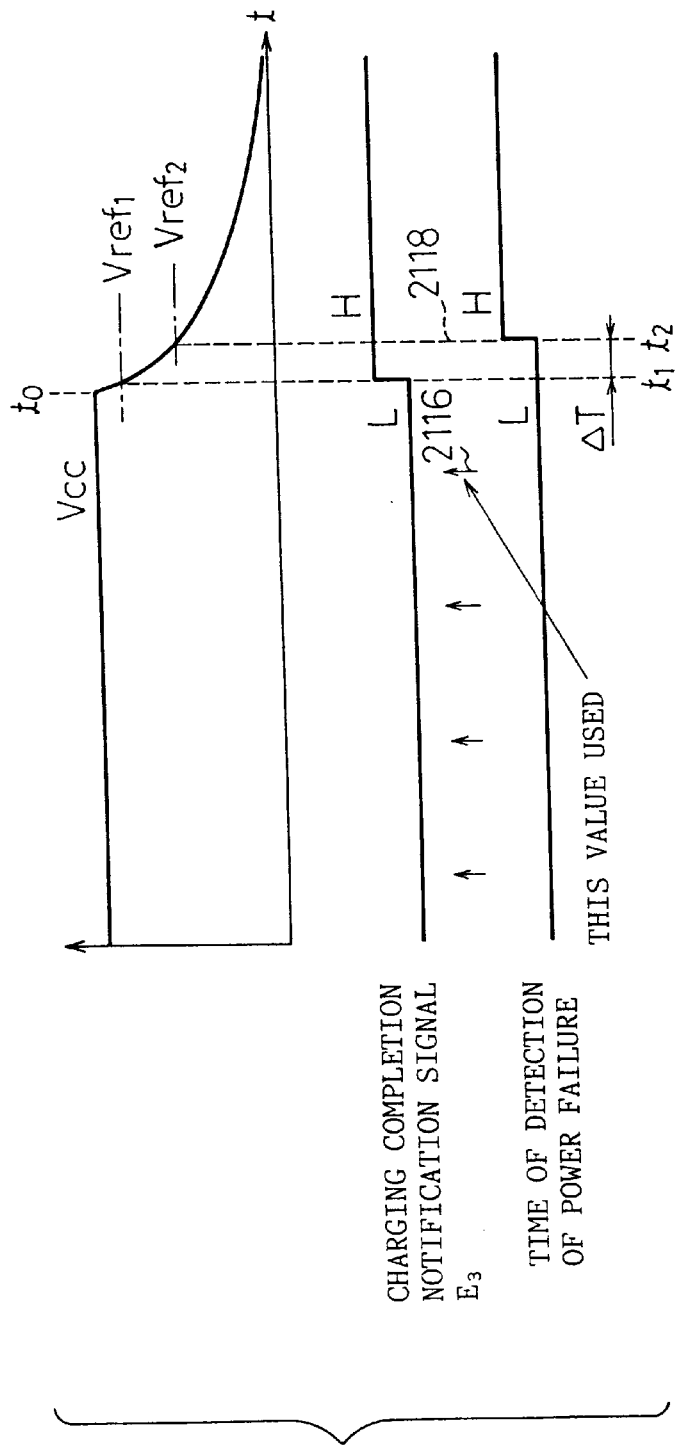
FIG. 15 is a timing chart showing the timing of judgement of the charging completion notification signal at the time of a power failure in FIG. 14.

Therefore, even if a charging completion notification signal is mistakenly sent out from the battery unit before a power failure is detected, as shown in FIG. 15, whether or not the charging has been completed is judged from the charging completion notification signal detected one period before, so it is judged that the charging has not yet been completed, the back-up time $T_1$ due to the activation of the first timer is not awaited, and the routine proceeds to step S7, where a cut-off request is immediately made to the director 281-1. A response of cut-off authorization is awaited from the director 218-1 and then the power is cut off.

As explained above, according to the back-up control for power failures according to the present invention, even if a charging completion signal is sent out from the battery unit mistakenly at the time of a power failure, it is possible to obtain a grasp of the state of charging of the battery unit accurately at the power controller side and back-up processing is performed commensurate with the battery charging state, so it is possible to reliably prevent abnormal ending of a system or destruction of data at the time of a power failure and to improve the reliability of the apparatus.

Next, an explanation will be made of the back-up control at the time of stopping the input of power according to the present invention.

Figure 22:
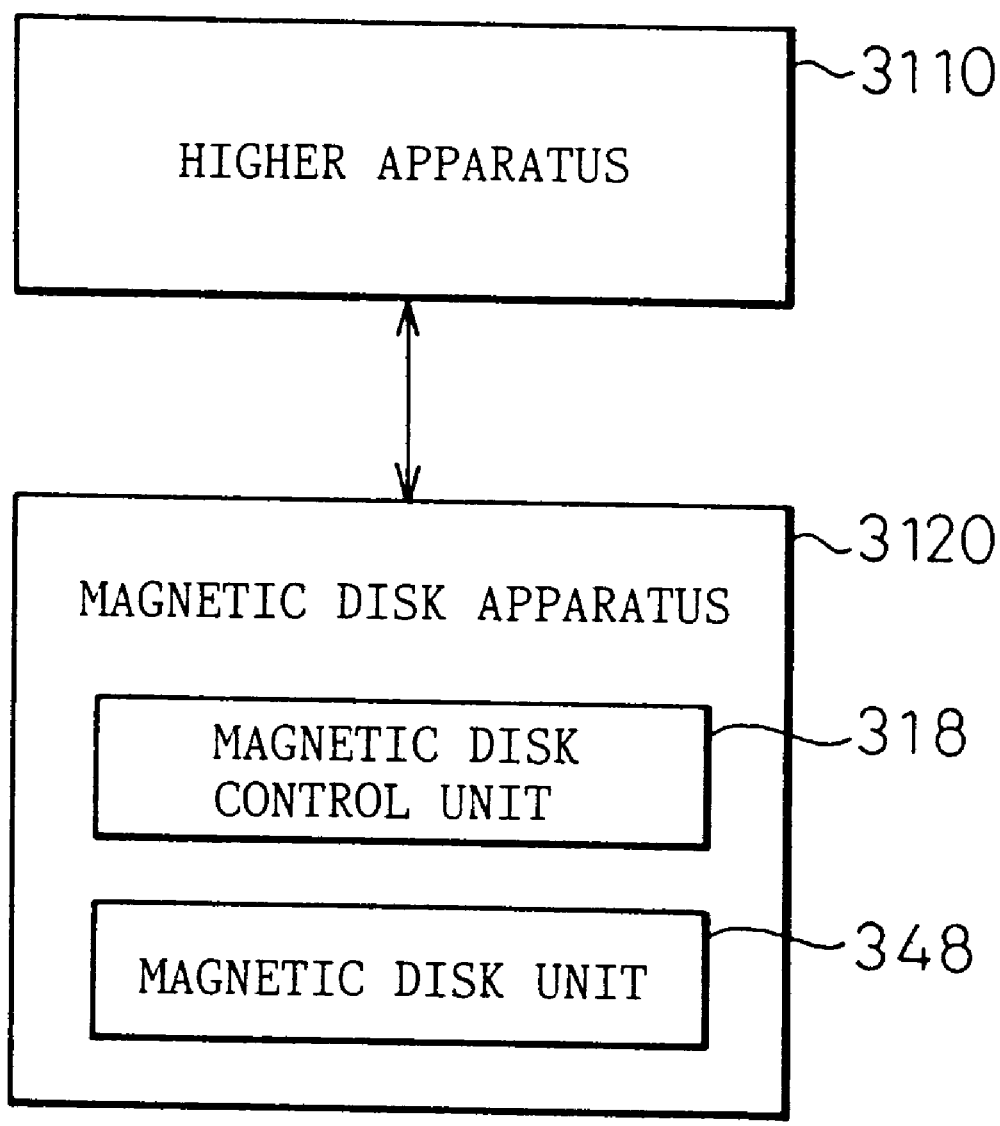
FIG. 22 is a basic structural view of a conventional magnetic disk apparatus.

FIG. 22 shows an outline of the conventional magnetic disk subsystem. A magnetic disk apparatus 3120 is provided at the higher apparatus 3110 such as a host computer. In the magnetic disk apparatus 3120 are provided a magnetic disk control unit 318 such as a director and a magnetic disk module 348. Usually, several magnetic disk modules 348 are connected to a path from the magnetic disk control unit 318.

Figure 23:
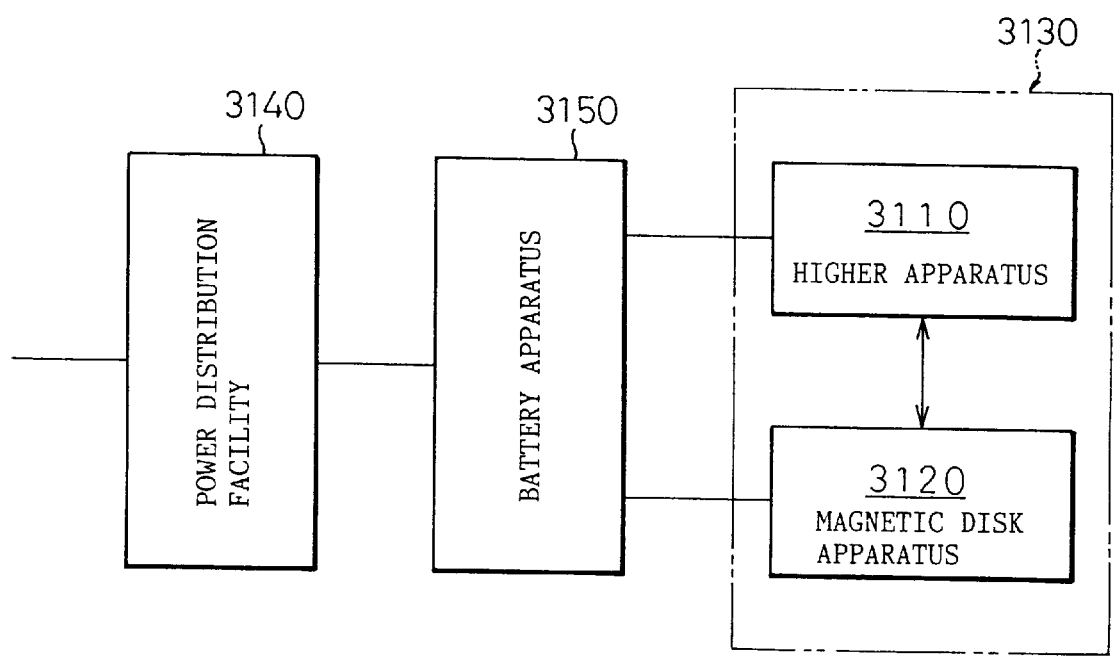
FIG. 23 is basic structural view of a conventional back-up control.

FIG. 23 is a structural view showing a conventional power back-up system. A large capacity battery apparatus 3150 is connected between a higher apparatus 3110 and magnetic disk apparatus 3120 provided in a computer center 3130 and a power distribution facility 3140 for inputting power. Even when the supply of power stops, it is possible to supply power from the battery apparatus 3150 to the system.

As mentioned earlier, in such a conventional back-up system, a large capacity battery apparatus is required independent from the apparatuses of the computer system, so extra installation space is required and there are also cost disadvantages in backing up an AC power supply.

Further, the battery apparatus and the apparatuses on the system side are independently constructed, so close interface between the two is difficult. As a result, it is not possible to obtain a back-up system with a good efficiency.

That is, it is difficult to confirm the state between the battery apparatus and the apparatuses on the system side, so the back-up operation is continued regardless of if the system is in a state not requiring back-up or the system operation is continued regardless of it the battery apparatus has reached the limit of its back-up.

To resolve these problems, it is necessary to have the magnetic disk apparatus itself incorporate a back-up battery and to execute the I/O operation even when the input of power to the apparatuses has stopped, but in performing the back-up operation, it is necessary to solve the following problems:

(1) To continue the back-up as much as possible from when the magnetic disk apparatus detects a power failure to when the processing at the higher apparatus side is completed and to prevent unnecessary consumption of the battery, it is necessary to quickly stop the backup operation at the time when the system operation ends.

(2) To continue a certain extent of the back-up operation when the magnetic disk apparatus alone detects a power failure and a power failure of more than the allowable value occurs, it is necessary to cause the I/O processing which has already been received by the magnetic disk apparatus from the higher apparatus to end and write the data being written on the magnetic disk until the end without suspending it midway.

(3) Even when the magnetic disk apparatus detects a power failure and then some sort of abnormality occurs at the magnetic disk apparatus side and I/O processing cannot be completed, when the back-up time exceeds an allowable value of the battery, it is necessary to forcibly stop the back-up operation to prevent excess battery consumption.

(4) When the magnetic disk apparatus detects a power failure and the input power is restored during the back-up operation, it is necessary to stop the back-up operation and continue the operation of the apparatus.

The present invention has as its object to enable suitable back-up control in the event of a suspension in the input of power when a battery unit is provided in the magnetic disk apparatus itself.

FIG. 19 is a basic explanatory view of the back-up control according to the present invention.

First, the present invention relates to a magnetic disk apparatus provided with a main power unit 300 provided with a power unit (AC-DC converter) 312 which receives as input external power and converts it to a predetermined DC voltage and a battery unit 314 which is charged by a DC voltage of the power unit 312 and outputs the same DC voltage at the time of a power failure, a magnetic disk module 348 which operates receiving the supply of power from the main power unit 300, a magnetic disk control unit (directory) 318 which receives the supply of power from the main power unit 300 and controls the magnetic disk module 348, and a power control unit (power controller) 310 which controls the input and cutoff of power from the main power unit 300 to the magnetic disk module 348 and magnetic disk control unit 318.

In the magnetic disk apparatus according to the present invention, the power control unit 310 is provided with a power failure detecting means 3102 for detecting the stopping of the input of external power, a first timer 3104 which activates at the time of detection of a power failure by the power failure detecting means 3102, monitors the stopping time of the input of power, and issues a timer output when this reaches a predetermined back-up time $T_1$, and a back-up control means 3100 for executing power cut-off processing of the magnetic disk module 348 and magnetic disk control unit 318 based on a cut-off instruction when a power cut-off instruction is received from a higher apparatus before the timer output of the first timer 3104 and executes a power cut-off processing of the magnetic disk module 348 and magnetic disk control unit 318 when obtaining the timer output in the case where no instruction for power cut-off is received from the higher apparatus.

Here, as the power cut-off processing of the magnetic disk module 348 and the magnetic disk control unit 318 by the back-up control unit 3100, a power cutoff control signal is output to the magnetic disk control apparatus 318 to make the I/O operation of the magnetic disk unit 348 end, then, when a cut-off authorization notification signal is received from the magnetic disk control unit 318 as a result of the end of the I/O operation, the power of the magnetic disk unit 348 and magnetic disk control unit 318 is cut.

More specifically, the power control unit 310 is provided with a second timer 3106 which is activated simultaneously with the output of the power cut-off control signal from the back-up control unit 3100 to the magnetic disk control unit 318, monitors the end of the I/O operation of the magnetic disk module 348, and issues a timer output when it reaches a predetermined time ($T_2$). The back-up control means 3100 cuts the power of the magnetic disk module 348 and the magnetic disk control unit 318 based on a notification of power cut-off authorization received from the magnetic disk control apparatus 318 before the timer output of the second timer 3106. When not receiving a notification of power cut-off authorization from the magnetic disk control apparatus 318, it cuts the power of the magnetic disk module 348 and the magnetic disk control unit 318 when obtaining the timer output of the second timer 348.

The back-up control means 3100, when detecting the restoration of the input of the power after detection of a power failure, stops the back-up operation by clearing the first timer 3104 and continues the operation of the apparatus.

Further, when detecting the restoration of the input of power after the activation of the second timer 3106, it clears the second timer 3106, prohibits the cut-off operation based on the notification of power cut-off authorization from the disk control unit 318, and continues the operation of the apparatus.

According to the magnetic disk apparatus of the present invention provided with this construction, the following actions (1) to (4) are obtained:

(1) The power control unit 310 of the magnetic disk apparatus starts the supply of internal power by the battery unit 314 when a suspension of the input of power is detected in the power failure detecting means 3102. Further, the magnetic disk control unit 318 and the magnetic disk module 348 continue the I/O operation with the higher apparatus.

The higher apparatus also continues the I/O processing while detecting power failures by some means or another. When the time of cessation of power reaches a predetermined value, it ends the I/O processing to be executed and instructs the magnetic disk apparatus through the power control interface to cut the power.

The power control unit 310 of the magnetic disk apparatus instructed to cut the power cuts the power to the magnetic disk control unit 318 and the magnetic disk module 348 and stops the back-up operation by the battery unit 314.

(2) When just the magnetic disk apparatus detects the cessation of the input of power and there is no instruction from the higher apparatus to cut the power, the power control unit 310 of the magnetic disk apparatus activates the first timer 3102 when a power failure is detected, monitors the back-up time, and requests a power cut-off to the magnetic disk control unit 318 at the time when the back-up time exceeds a certain time $T_1$.

The magnetic disk control unit 318, receiving the request for power cut-off, stops the receipt of new I/O processing from the higher apparatus, makes the I/O processing of the magnetic disk unit 348 received up to then end, and sends back to the power control unit 310 a power cut-off authorization.

The power control unit 310, receiving the power cut-off authorization, stops the supply of power to the magnetic disk control unit 318 and the magnetic disk module 348 and stops the back-up operation by the battery 314.

(3) The power control unit 310 had requested a power cut-off to the magnetic disk control apparatus 318, but when the I/O operation is not ended or power cut-off authorization cannot be received due to some abnormality of the magnetic disk module 348, the power control unit 310 monitors the response time by the second timer 3106 activated at the time a cut-off is requested and forcibly cuts the supply of power to the magnetic disk control unit 318 and the magnetic disk module 348 when a certain time $T_2$ from the issuance of the power cut-off request is exceeded.

(4) The power control unit 310 of the magnetic disk apparatus, during execution of the back-up operation by the battery unit 314, makes the operation of the apparatus continue by clearing the first timer 3104 and stopping its operation when restoration of the input of power is detected in the power failure detecting means 3102 before the power cut-off instruction from the higher apparatus or before the first timer exceeds a predetermined time $T_1$.

Figure 20B:
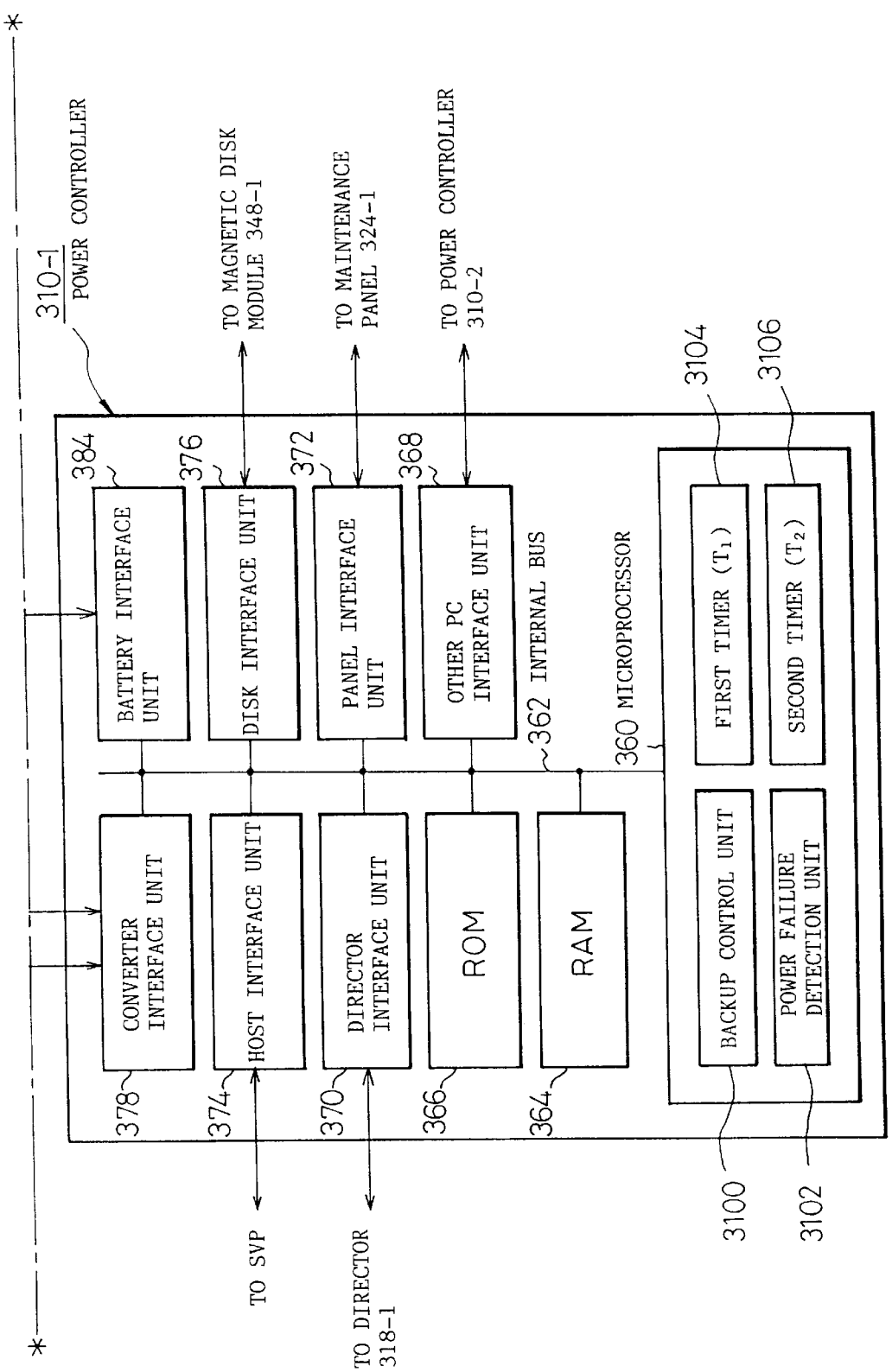
FIGS. 20A and B are a block diagram of a circuit of an example showing the power supply system in FIG. 19.

FIG. 20 is a structural view of an embodiment of the present invention, which shows together the AC-DC converter 312-1 controlled by the power controller 110-1 shown in FIG. 4 and FIG. 5 and the magnetic disk module 348-1 provided with the DC-DC converter 316-5 and disk enclosure 336-1.

In FIG. 20, the power controller 310-1, which serves as the power control means, is provided with a microprocessor 360. The microprocessor 360 is provided with a back-up control unit 3100, a power failure detection unit 3102, a first timer 3104, and a second timer 3106 realized by program control.

Connected to an internal bus 362 led out from the microprocessor 360 are a RAM 364, a ROM 366, an interface unit to the other power controller 310-2, a director interface unit 370 to a director 318-1 serving as the magnetic disk control unit, a panel interface unit 372 to the maintenance panel 324-1, a host interface unit 374 to a higher apparatus such as a service processor (SVP), a disk interface unit 376 to a magnetic disk module 348-1, a converter interface unit 378 to the AC-DC converter 312-1 and DC-DC converter 316-5, and a battery interface unit 384 to the battery unit 314-5.

Figure 21:
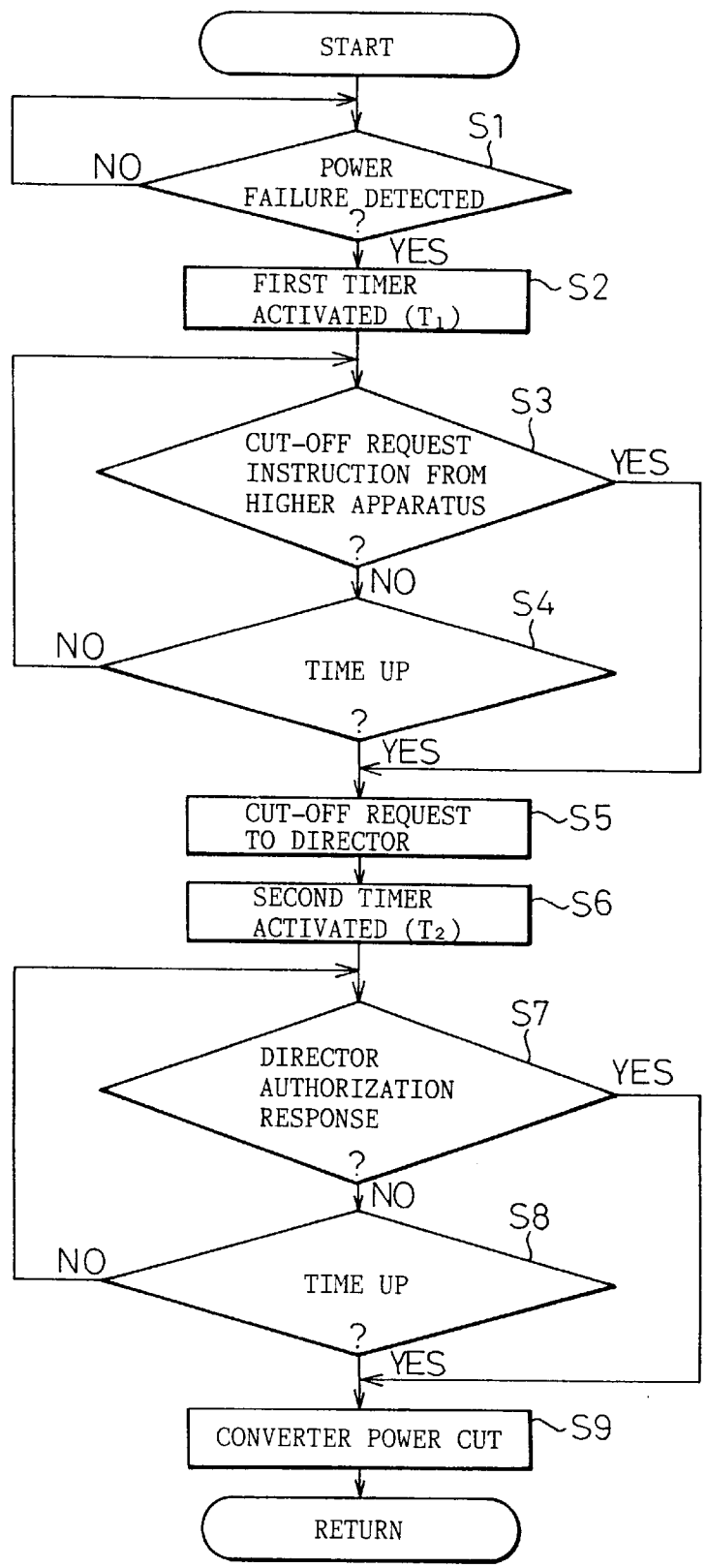
FIG. 21 is a flow chart showing the back-up control in FIG. 19.

The back-up control at the time of a power failure by the back-up control unit 3100, realized as a function of the microprocessor 360 of the power controller 310-1, is as shown in the flow chart of FIG. 21.

The back-up control of the present invention will be explained below in accordance with the flow chart of FIG. 21.

(1) When receiving power cut-off instruction from host apparatus

If the AC input to the magnetic disk apparatus of the present invention stops, when the power voltage taken in through the converter interface unit 378 falls to a prescribed voltage, a power failure is detected in the power failure detection unit 3102 provided in the microprocessor 360 as shown by step S1 in FIG. 21.

Here, when the AC input has stopped, the same DC 29V is output from the battery unit 314-5, which is in a charged state after receipt of DC 29V from the AC-DC converter 312-1 up to then, resulting in the back-up state.

If a power failure is detected at step S1, the first timer 3104 is activated at step S2 and it is monitored as to whether the time elapsed from the detection of the power failure reaches a predetermined back-up time $T_1$ guaranteed on the basis of the capacity of the back-up unit 314-5.

On the other hand, when a power failure occurs at the higher apparatus at the same time as a power failure of the magnetic disk apparatus, the higher apparatus as well detects a power failure by some means or another, continues the I/O processing, ends the I/O processing to be executed when the time of cessation of power reaches a predetermined time, and instructs the power controller 310-1 of the magnetic disk apparatus through the host interface unit 374 to cut the power.

The instruction from the higher apparatus requesting a power cut-off is judged at step S3 of FIG. 21. If a cut-off request is received, the back-up control unit 3100 of the processor 360 proceeds to step S5 where it sends out a power cut-off control signal to the director 318 to request a cut-off and simultaneously at step S6 activates the second timer 3106.

The director 318-1, receiving the power cut-off request from the power controller 310-1, stops the receipt of new I/O processing from the higher apparatus and makes the processing in the magnetic disk module 348-1 for the I/O processing which had been received up to then end. When a notification of completion is received from the magnetic disk module 348-1, a power cut-off authorization is sent back and notified to the back-up control unit 3100 of the processor 360 through the director interface unit 370 of the power controller 310-1.

The response of authorization from the director 318-1 is judged at step S7, then the routine proceeds to step S9, where the operation of the AC-DC converter 312-1 and the DC-DC converter 316-5 housed in the magnetic disk module 348-1 is stopped through the converter interface unit 378 and the supply of power is cut off.

(2) When power failure occurs in only magnetic disk apparatus

In this case, there is no instruction to cut off the power from the higher apparatus. Therefore, if a power failure is detected at step S1, the first timer 3104 is activated at step S2. When the fact that a predetermined back-up time $T_1$ has been reached and the time has run out is judged at step S4, the routine proceeds to step S5, where a request for a cut-off of power is made to the director 318-1, the receipt of new I/O processing from the higher apparatus is stopped, and the I/O processing in the magnetic disk module 348-1 which had been received up to then is simultaneously made to end.

Further, after the cut-off request to the director 318-1 at step S5, the second timer 3106 is activated at step S6.

If the I/O processing at the director 318-1 side is normally completed, a power cut-off authorization response is given to the power controller 310 from the director 318-1. When this authorization response is judged at step S7, the operation of the AC-DC converter 312-1 and the DC-DC converter 316-5 is stopped and the power is cut off at step S9.

(3) When a request for cut-off of power is made from the power controller 310 to the director 318-1, but due to some abnormality the I/O operation is not completed or a power cut-off authorization response cannot be made A request for cut-off of power is made to the director 318-1 at step S5 at both of the above (1) and (2), but if the I/O operation is not completed or if a power cut-off authorization response cannot be made even if the I/O operation is completed due to some abnormality at the director 318-1 or the magnetic disk module 348-1, then the second timer 3106 activated at step S6 monitors the authorization response time with respect to the request for power cut-off made to the director 318-1. If it is judged at step S8 that a predetermined time $T_2$ has been reached and the time has run out, then the routine proceeds to step S9 even without a cut-off authorization response from the director 318-1, the operation of the converters is stopped, and the power is cut off.

(4) When input of power is restored after a power failure

In the power controller 310 of the magnetic disk apparatus, when restoration of the input of power is detected by the power failure detection unit 3102 during the back-up operation shown in the above (1) or (2) due to detection of a power failure and before receipt of a instruction for a request for power cut-off or before the first timer 3104 activated by the detection of a power failure reaches the predetermined back-up time $T_1$, the first timer is cleared and the operation is stopped so as to forcibly suspend the back-up control by the back-up control unit 3100 and make the magnetic disk apparatus continue to operate.

Further, when restoration of input of power is detected by the power failure detection unit 3102 after a cut-off request is made to the director 318-1 at step S5 and the second timer 3106 is activated at step S6 and before a response giving permission for power cut-off is received from the director 318-1 or before the second timer 3104 reaches a predetermined time $T_2$, the second timer 3106 is cleared and the operation is stopped. Also, the operation of the converters is not stopped, but the operation of the apparatus is made to continue even if a response giving permission for power cut-off is received from the director 318-1 after that.

This processing for stopping the back-up operation based on the detection of restoration of power is executed forcibly by interruption processing with respect to the flow chart of FIG. 21.

The embodiment of FIG. 20 shows as an example of the control load the AC-DC converter 312-1, the DC-DC converter 316-5, and the battery unit 314-5, but in actuality, the same back-up control is performed with respect to all units shown in FIG. 4 under the control of the power controller 310-1. The same applies to the power controller 310-2 side.

Further, in the embodiment of FIG. 20, the power failure detection unit 3102, the first timer 3104, and the second timer 3106 are realized by program control of the microprocessor 360, but it is also possible to connect specialized firmware to the internal bus 362 of the microprocessor 360.

As explained above, according to the back-up control of the present invention, provision is made of a battery unit inside the magnetic disk apparatus, so a large capacity battery apparatus serving the computer system as a whole becomes unnecessary, the installation space can be tremendously reduced, and the cost of the battery can be held to the minimum necessary.

Further, the internal operation of the magnetic disk apparatus and the system operation are guaranteed as much as possible during power failures and, simultaneously, battery deterioration is prevented by holding down the back-up time, thereby realizing an efficient back-up of power.

Next, an explanation will be made of the method of activation of the magnetic disk system according to the present invention. Before explaining the present invention, however, the conventional system and its problems will be explained.

In the past, the method of activation used for holding down the rush current in a magnetic disk subsystem mounting a plurality of magnetic disk modules was to activate the modules successively one by one, but this mean a longer start-up time until the completion of activation. Therefore, there is also a method of dividing the magnetic disk modules into groups of several units and successively activating the groups.

Figure 30:
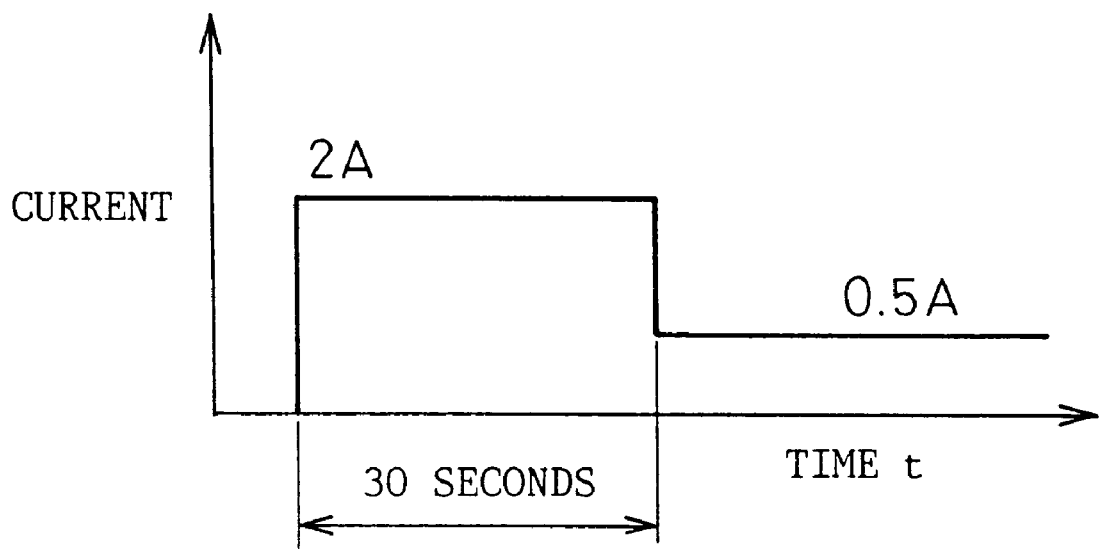
FIG. 30 is an explanatory view of the activation time and changes in current per unit of a magnetic disk module.

Assume now that there are 16 magnetic disk modules mounted and, as shown in FIG. 30, the disk activation current per unit is 2 A, a 30-second activation time is required, and the steady current after completion of activation is 0.5 A.

Figure 31:
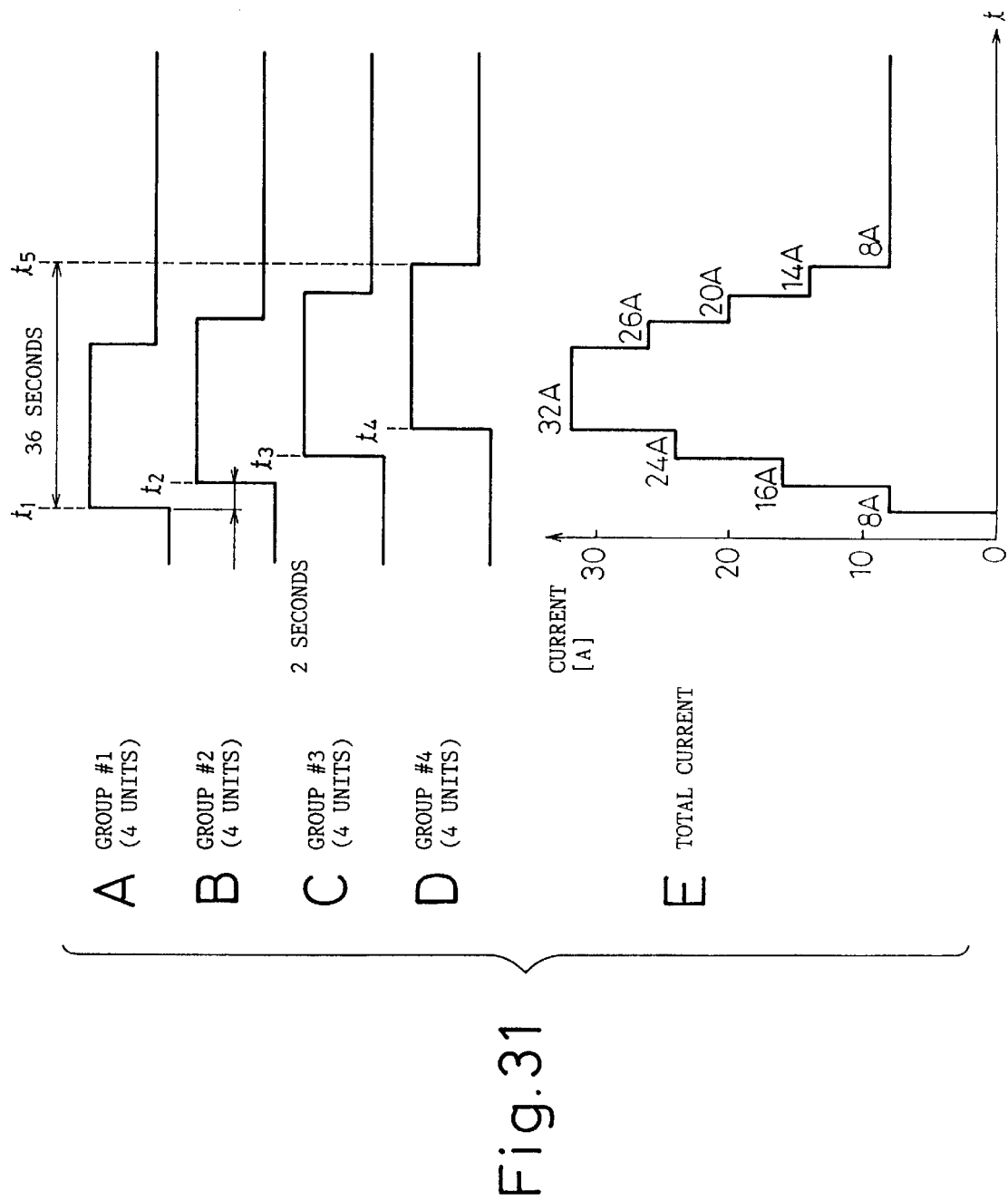
FIG. 31 is a timing chart of an example of conventional activation control.

FIG. 31 is a time chart showing the conventional method of activation by grouping and the total current.

First, the 16 magnetic disk modules are divided into groups #1 to #4 of four units each. After the four units of the first group #1 are activated, the succeeding groups #2 to #4 are activated successively each time a predetermined time $\Delta T$, $\Delta T=2$ seconds, where the rush current becomes maximum immediately after activation, elapses.

In this case, the time for completion of activation is a short 36 seconds, but the maximum value of the total current becomes a large 32 A.

Figure 32:
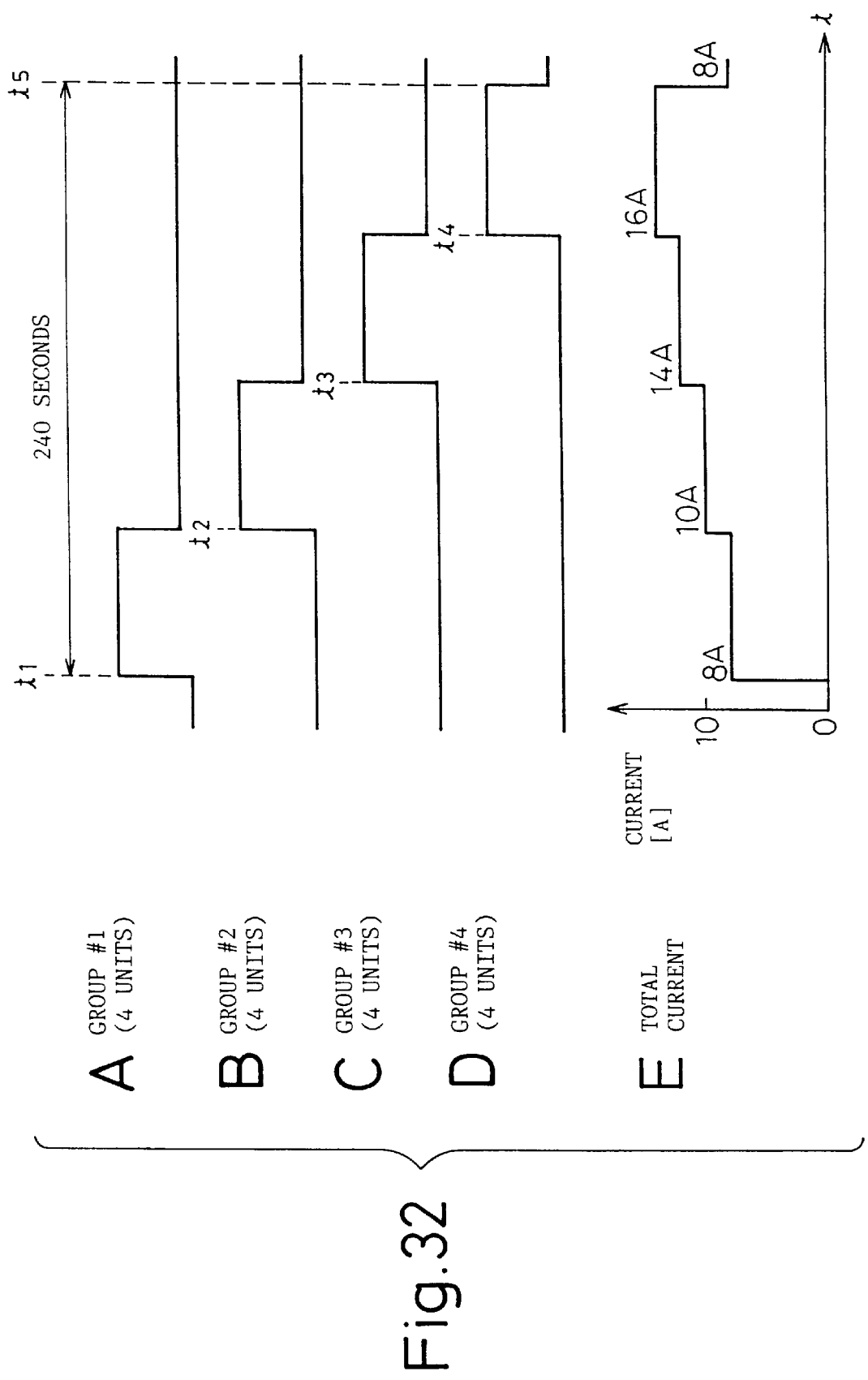
FIG. 32 is a timing chart of another example of conventional activation control.

When desiring to lower the rush current further in the method of activation of FIG. 31, as shown in FIG. 32, it is sufficient to successively activate groups #1 to #4 while shifting the activation time 30 seconds. In this case, the time for completion of activation becomes a long 240 seconds, but the maximum value of the rush current can be held to half, that is, 16 A.

In such a conventional method of activation of the magnetic disk apparatus, however, there are the conflicting problems that if the activation time is shortened, the maximum value of the rush current becomes larger and it is not possible to reduce the power capacity, while if activating the units so as to hold down the power capacity, the start-up time becomes longer.

The present invention has as its object the control of activation to enable the rush current to be held down and at the same time the start-up time to be shortened.

FIG. 24 is an explanatory view of the method of activation according to the present invention.

Figure 24A:
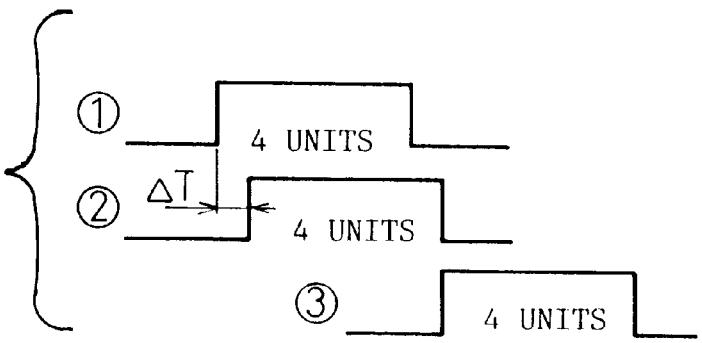
FIG. 24 is an explanatory view of the principle of activation control of a magnetic disk apparatus according to the present invention.

First, the present invention, as shown in FIG. 24(A), is characterized by, when inputting power to activate a plurality of magnetic disk modules, dividing the plurality of magnetic disk modules into a plurality of groups of the same number of units and activating them successively while changing the time interval for each group.

Here, the groups are successively activated while shifted by at least exactly the time ($\Delta T$) during which the maximum rush current flows directly after activation. Further, as shown in FIG. 24(A), processing is repeated so that, first, two groups are successively activated and shifted by exactly the time ($\Delta T$) during which the rush current flows directly after activation, then the following groups are successively activated so as not to overlap with the activation of the second activated group.

Figure 24B:
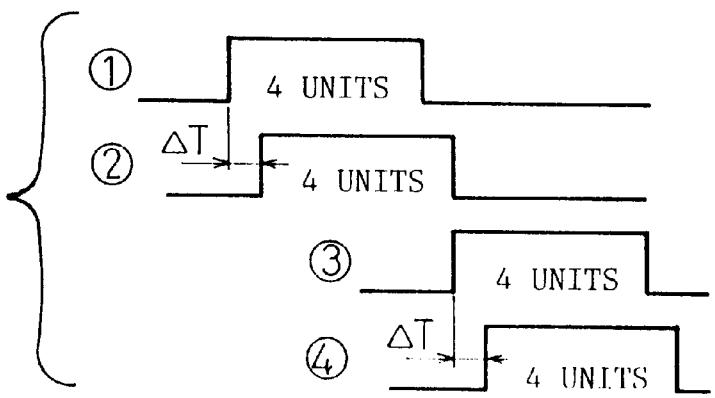

Also, as shown in FIG. 24(B), processing may also be repeated so that the first two groups are successively activated and shifted by a time ($\Delta T$) during which a rush current flows directly after activation and then the next two groups are similarly successively activated after the completion of activation of the second activated group.

Figure 24C:
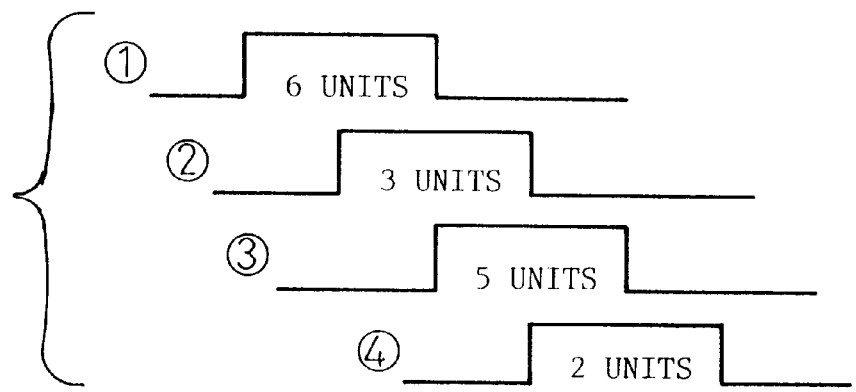
Figure 24D:
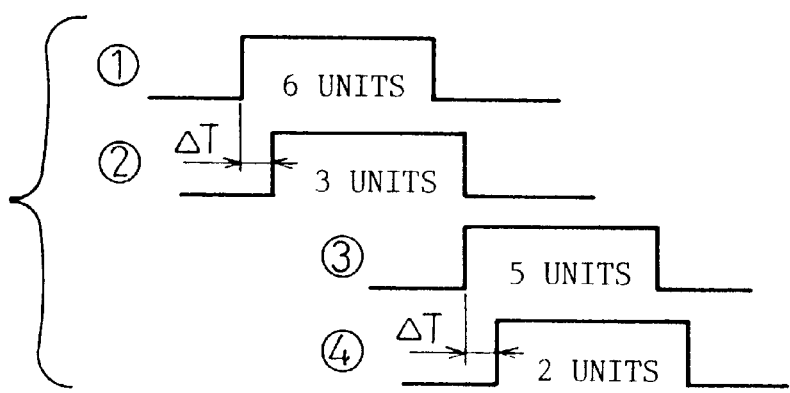

Further, the method of activation of the present invention, as shown in FIG. 24(C), divides the plurality of magnetic disk modules into a plurality of groups of different numbers of units and activates them successively shifted by a predetermined time interval in the order of the groups having the larger numbers of units.

In this case, the groups are activated and shifted successively by about half of the activation time each.

Further, the present invention is characterized by dividing a plurality of magnetic disk modules into a plurality of groups of different numbers of units and successively activating the groups while changing the time intervals of activation.

In this cases as well, the groups are successively activated and shifted by at least a time ($\Delta T$) during which the rush current flows directly after activation. Further, processing is repeated so that two groups are successively activated and shifted by a time ($\Delta T$) during which the rush current flows directly after activation, then the next two groups are similarly activated after the activation of the second activated group is completed.

According to this method of activation of a magnetic disk apparatus of the present invention making use of such a routine, it is possible to hold down the maximum value of the rush current during activation by changing the intervals of activation among the groups and thereby keeping the power capacity smaller.

Further, by changing the number of units in each group, it is possible to shorten the activation time without causing a great increase in the rush current.

Also, by changing the intervals of activation among the groups and changing the number of units in each group, it is possible to hold down the maximum value of the rush current and simultaneously shorten the activation time.

Figure 25:
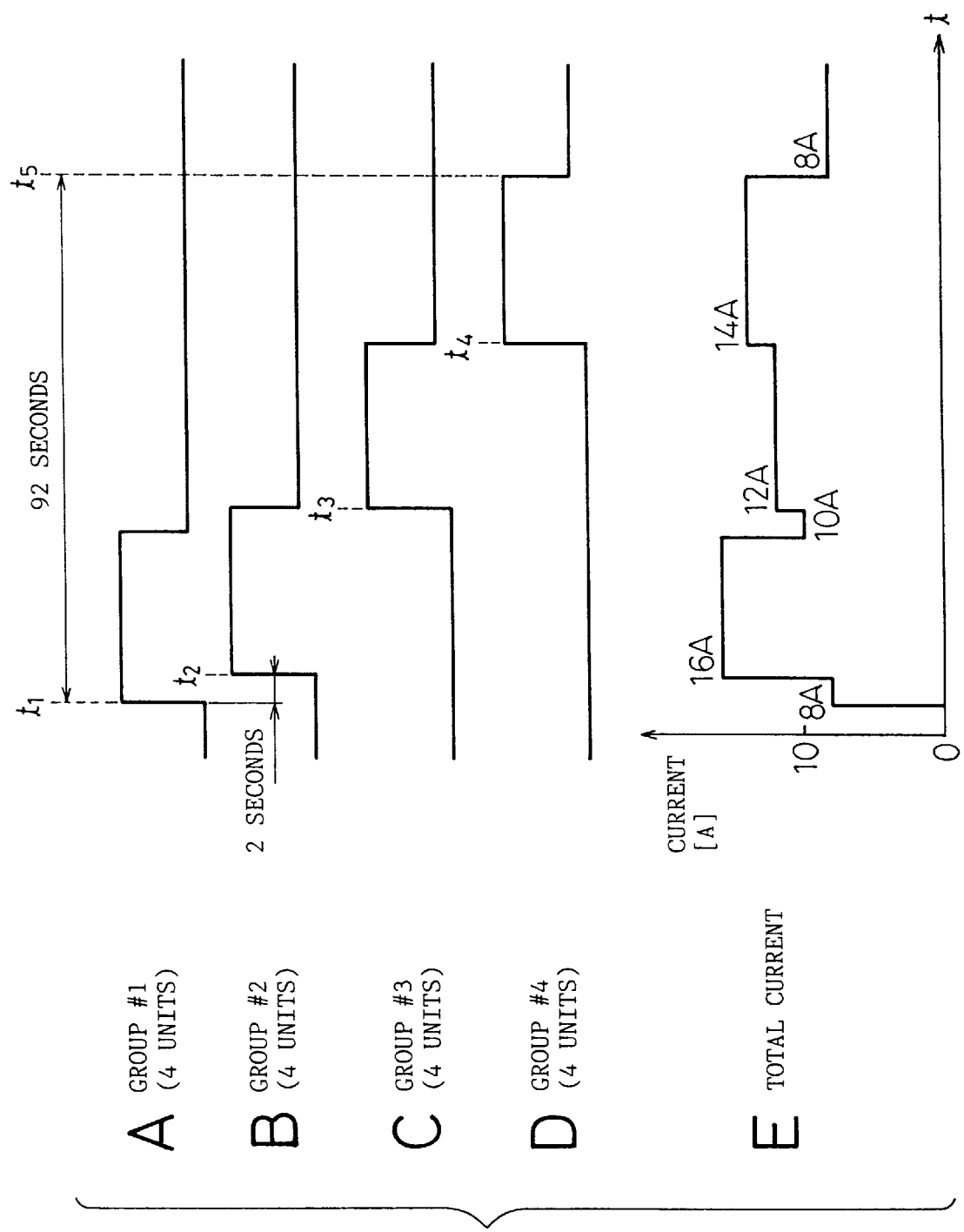
FIG. 25 is a timing chart of an embodiment of activation control according to FIG. 24.

FIG. 25 is a time chart showing the method of activation of an embodiment of the present invention. In this embodiment, 16 magnetic disk modules are divided into four groups of groups #1 to #4, which are successively activated while changing the time intervals among the groups.

In FIG. 25, first, the first group #1 is activated at the time $t_1$. By this, a total current of 8 A is produced. Next, the four units of the group #2 are activated at the time $t_2$, which is after the elapse of a certain time $\Delta T=2$ seconds during which a rush current flows directly after activation. In this state, eight units are in the activated state, so the total current is increased to 16 A.

When the activation time of 30 seconds has elapsed from the first activation time $t_1$, the activation of the four units of the group #1 is ended and the current becomes the steady current 2 A of the fourth unit. When added with the group #2, the total falls to 10 A.

Next, at the time $t_3$ when the group #2 has finished being activated after the elapse of the activation time of 30 seconds, the four units of the next group #3 are activated. At this time $t_3$, the completion of activation and the activation of the groups #2 and #3 come simultaneously, so the activation current 8 A of the group #3 is added to the steady current 4 A of the total eight units of the groups #1 and #2 to give a total current of 12 A.

At the time $t_4$ when the group #3 finishes being activated after the elapse of 30 seconds, the next group #4 is activated, At the time $t_4$, the activation current 8 A of the four units of the group #4 which are newly activated is added to the steady current 6 A of the 12 units of the groups #1 to #3 to give a total current of 14 A. When the activation of the group #4 finally ends at the time $t_5$, the total current falls to 8 A, the total of the steady currents of the 16 units.

In the method of activation of FIG. 25, the activation time from the time $t_1$ to the time $t_5$ is 92 seconds and the maximum value of the total current during the activation is 16 A. This 16 A is half of the maximum value of 32 A of the activation current in the conventional method shown in FIG. 32. On the other hand, the activation time is a long 92 seconds compared with the 36 seconds, but this 92 seconds is less than half of the 240 seconds of the conventional method in the case of a maximum current of 16 A shown in FIG. 32.

Figure 26:
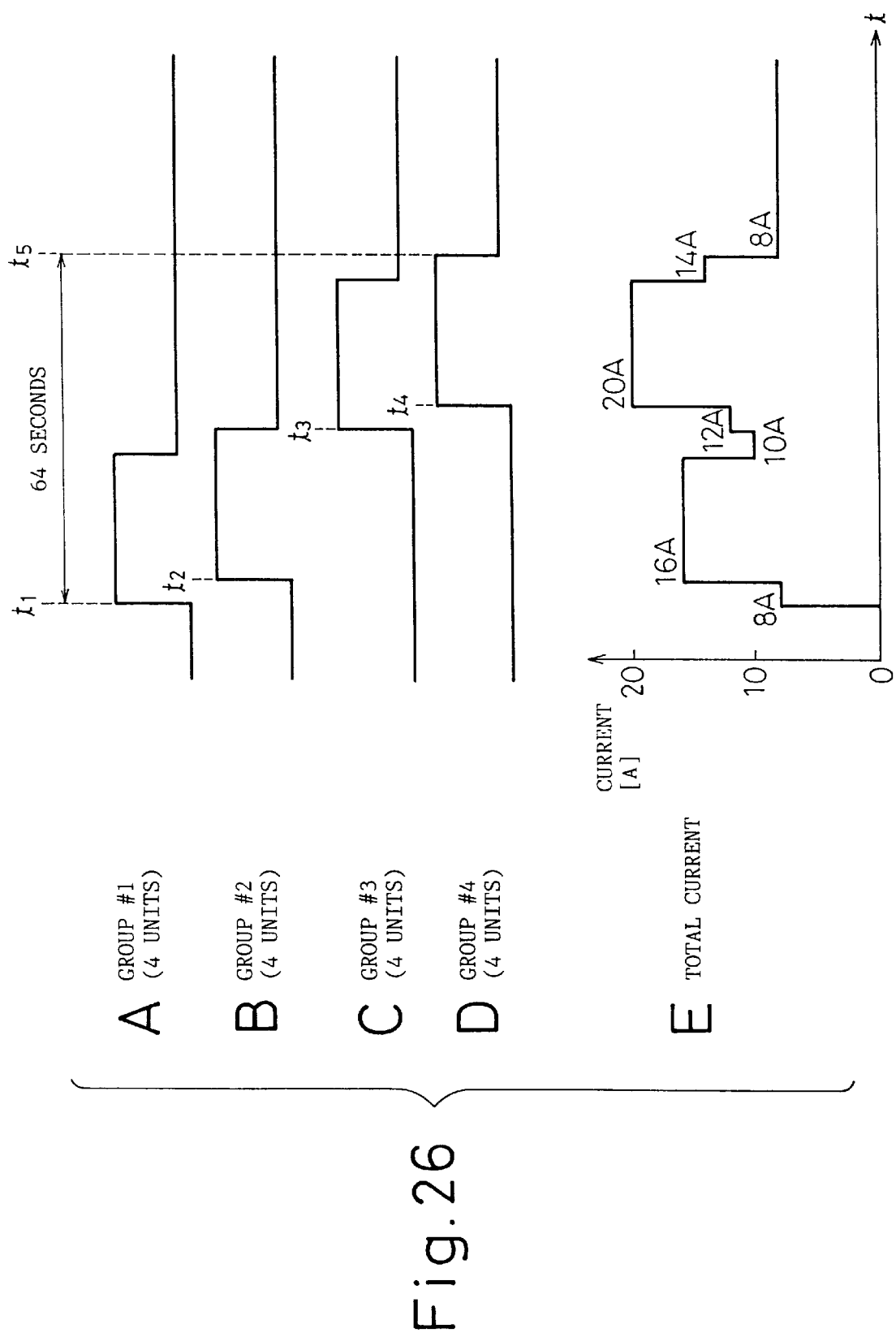
FIG. 26 is a timing chart of another embodiment of activation control of FIG. 24.

FIG. 26 is a time chart showing another embodiment of the present invention and is a modification of the embodiment of FIG. 25.

That is, in the embodiment of FIG. 25, the groups #1 and #2 are activated shifted by $\Delta T=2$ seconds, then the groups #3 and #4 are activated so as not to overlap with the activation of the group #2, but in the embodiment of FIG. 26, the groups #3 and #4 are also activated in the same way as with the first groups #1 and #2 separated by $\Delta T=2$ seconds.

In the embodiment of FIG. 26, the maximum value of the total current becomes a larger 20 A, but the activation time can be shortened to 64 seconds, two-thirds the previous time.

Figure 27:
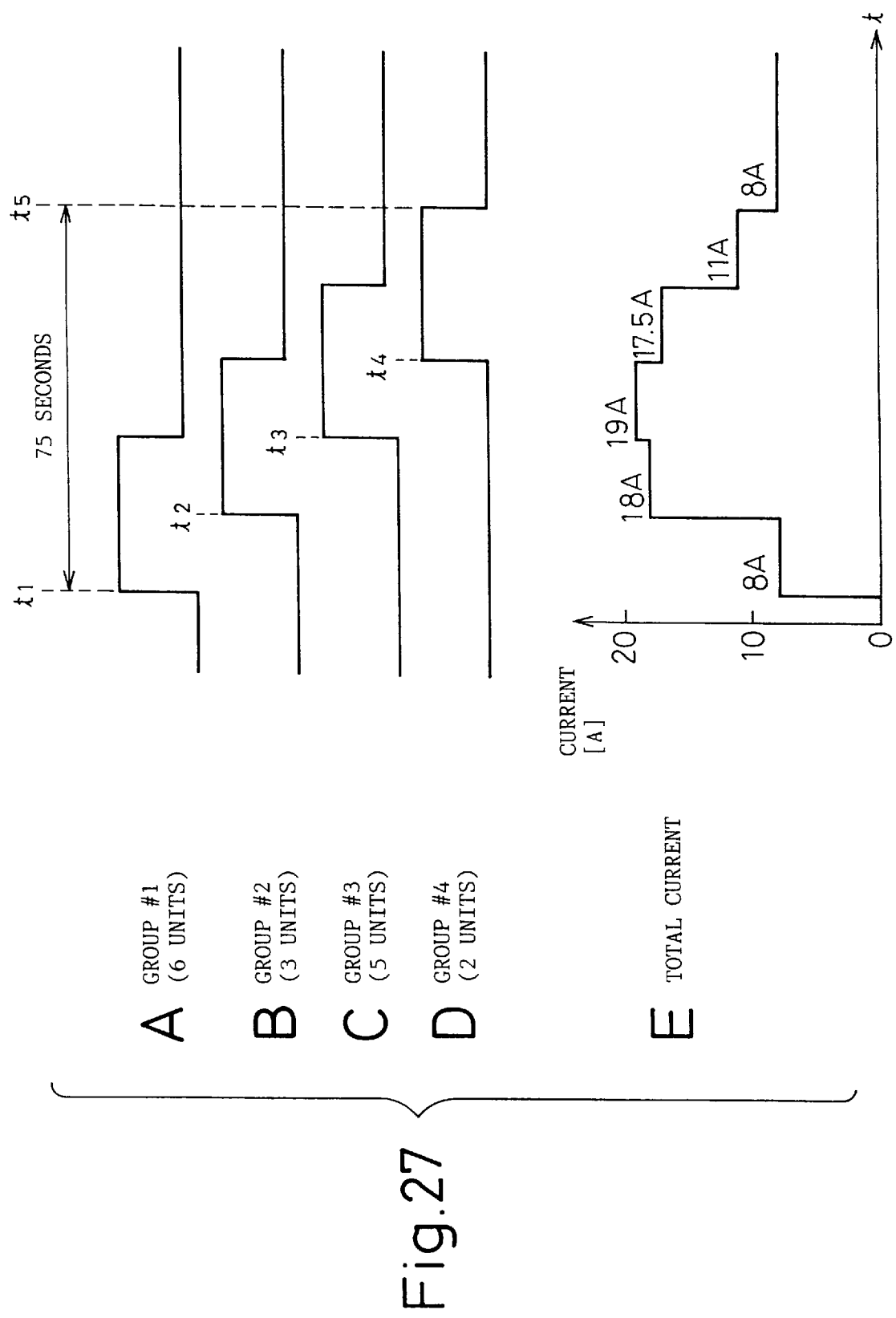
FIG. 27 is a timing chart of another embodiment of activation control according to FIG. 24.

FIG. 27 is a timing chart showing still another embodiment. In this embodiment, 16 magnetic disk modules are divided into a group #1 of six units, a group #2 of three units, a group #3 of five units, and a group #4 of two units, so that each group has a different number of units, then the groups are successively activated at predetermined intervals shifted by 15 seconds, half of the 30 second activation time of each group, in the order of the groups with the larger numbers of units.

In the embodiment shown in FIG. 27, the maximum value of the rush current during activation is 19 A. Further, the activation time from the time $t_1$ to $t_5$ is just 75 seconds. This embodiment is more effective in terms of the activation time compared with the embodiment of FIG. 25. Also, the maximum value of the rush current can be reduced compared with the embodiment of FIG. 26.

Figure 28:
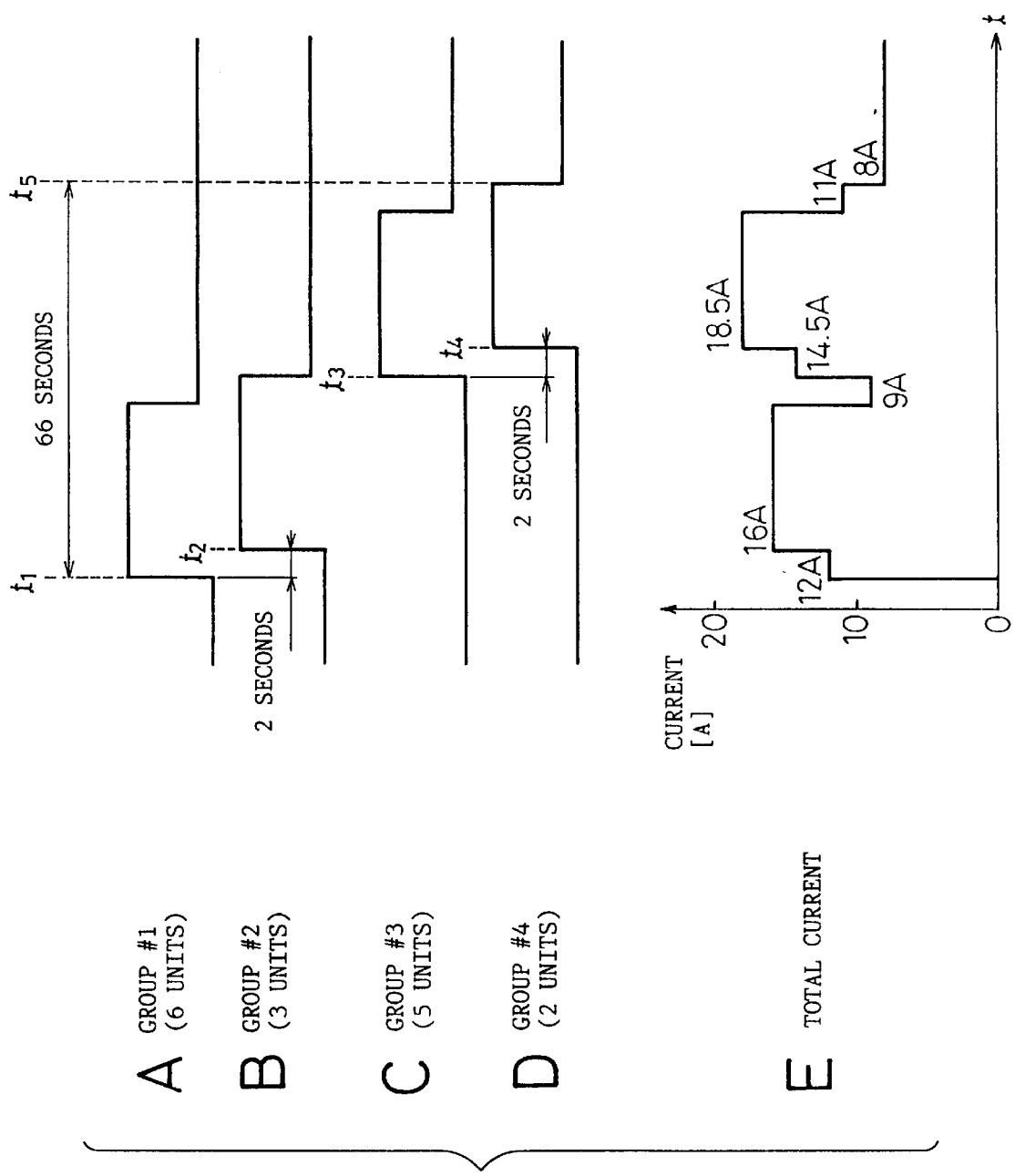
FIG. 28 is a timing chart of another embodiment of the method of activation according to FIG. 24.

FIG. 28 is a time chart showing still another embodiment. This embodiment is a combination of the embodiment of FIG. 25 and the embodiment of FIG. 27.

That is, 16 magnetic disk modules are divided into four groups, with the number of units in the groups #1, #2, #3, and #4 being made six, three, five, and two. Further, the groups #1 and #2 are activated shifted by $\Delta T=2$ seconds. When the activation of the group #2 is ended, the groups #3 and #4 are similarly activated and shifted by $\Delta T=2$ seconds.

In the embodiment of FIG. 28, the maximum value of the rush current becomes 18.5 A, while the time becomes the 66 seconds from the time $t_1$ to $t_5$. Accordingly, it will be understood that this embodiment of FIG. 28 is more advantageous in terms of the maximum value of the rush current and the activation time compared with the embodiments of FIG. 25 to FIG. 27.

Figure 29B:
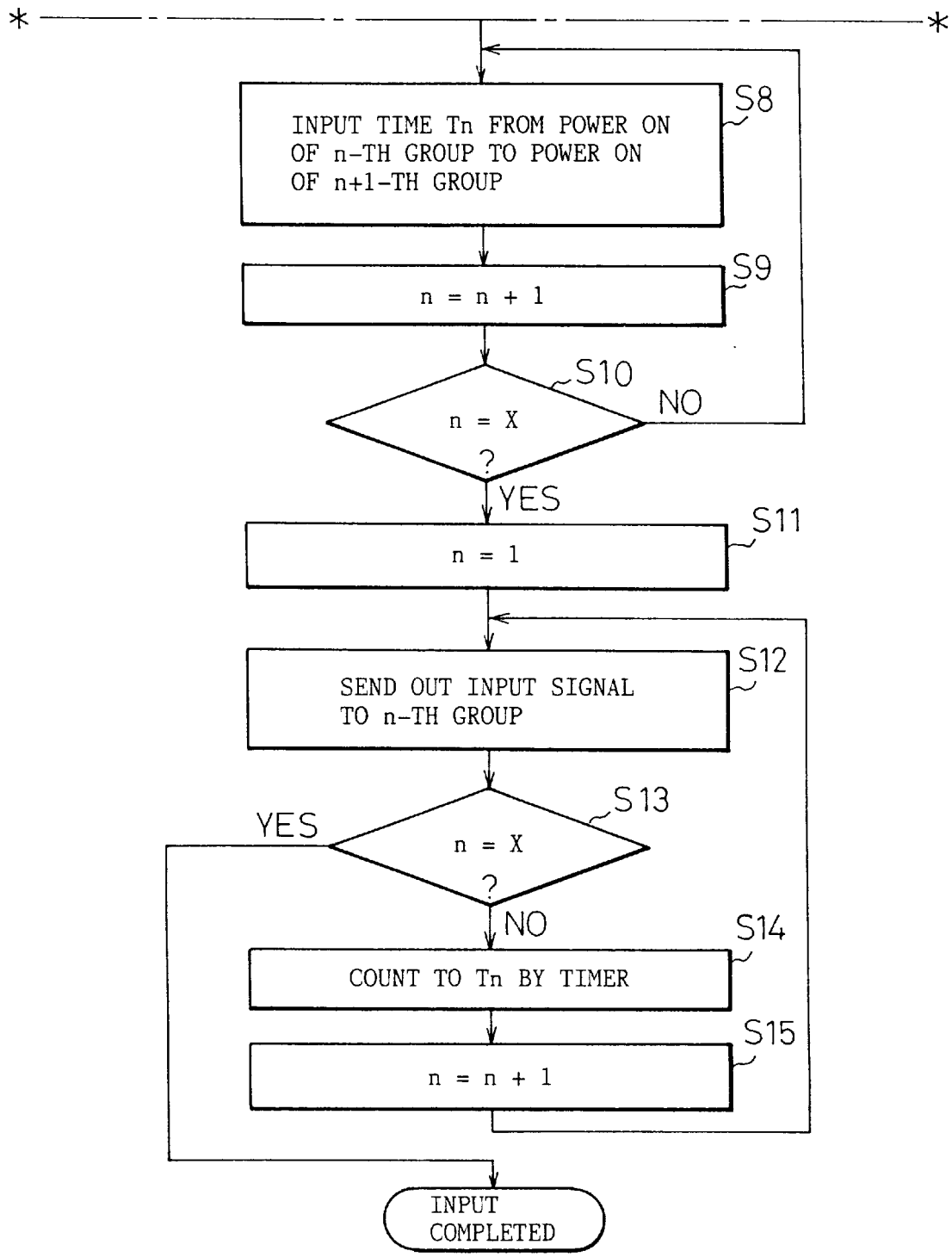
FIGS. 29A and B are a flow chart of activation control of FIG. 24.

FIG. 29 is a flow chart for the realization of the control of activation of the present inventions shown in FIG. 25 to FIG. 28 and performed by the power controllers 110-1 and 110-2.

In FIG. 29, when an instruction for input of power to the magnetic disk modules is received from a higher apparatus by a power controller, the routine proceeds to step S2, where the number X of groups of the magnetic disk modules is input. For example, X=4 for four groups is input for the number X of groups. Next, the routine proceeds to step S3, where the count n showing the group number is set to n=1. The processing of steps S4 to S6 is then performed to input the number of the magnetic disk modules allocated to the individual groups.

That is, at step S4, the number of magnetic disk modules included in the first group set by n=1 is input. At step S5, the count n is incremented by 1. At step S6, it is judged if the value of the count n has reached the number X of groups. The processing of steps S4 to S6 is repeated until the set number X of groups is reached. For example, in the case of X=4 groups, $A_1$ units are input for the first group, $A_2$ units for the second group, $A_3$ for the third group, and $A_4$ for the fourth group.

Next, at step S7, the count n is set to n=1, then the time intervals for the groups is input at steps S8 to S10.

That is, at step S8, the time Tn from the n-th group set by the value of the count n at that time to the next n+1-th group is input. At step S9, the count n is incremented by 1. The processing of step S8 is repeated until the count n reaches the group number X at step S10. By this, for example, the time $T_1$ is input for the first group, the time $T_2$ for the second group, the time $T_3$ for the third group, and the time $T_4$ for the fourth group.

When the number of units in each group and the time intervals finish being input, the routine proceeds to step S11, where the count n is once again set to n=1. The activation processing is then performed at steps S12 to S15.

That is, at step S12, a power input signal is sent to the n-th group designated by the count n at that time. At step S13, it is judged if the count n matches with the group number X. If not matching, then the timer counts until the time Tn previously input at step S14. When the count ends, the routine proceeds to step S15, where the count n is incremented by 1, then the power is input to the next group once again at step S12. When the power is finished being input to all the groups, the count n matches with the group number X at step S13 and the input is ended.

The number of the magnetic disk modules per group and the time intervals Tn of input for each group, input at steps S4 and S8 of the flow chart of FIG. 29, are prepared as table data in a RAM, for example, on the basis of the embodiments of FIG. 25 to FIG. 28. This table data can be input for the control of activation when controlling the input of power.

The above-mentioned embodiment took as an example the case of control of the activation of 16 magnetic disk modules divided into four groups, but the number of the magnetic disk modules and the number of the groups can be suitably determined in accordance with need.

Also, the time $\Delta T$ during which the peak value of the rush current occurs and the 30 second activation time are suitably set in accordance with the magnetic disk modules and are not limited to those in the embodiments of the present invention.

As explained above, according to the method of activation of the magnetic disk apparatus according to the present invention, when a plurality of magnetic disk modules are divided into groups which are controlled in activation, by changing the interval of activation among the groups or by changing the number of units included in the groups, it is possible to hold down the maximum value of the rush current during the activation and at the same time to shorten the start-up time from the start of activation to its end as much as possible.

Next, an explanation will be given of the monitoring of power according to the present invention. Before explaining the present invention, however, an explanation will be given of the conventional monitoring system.

Figure 40:
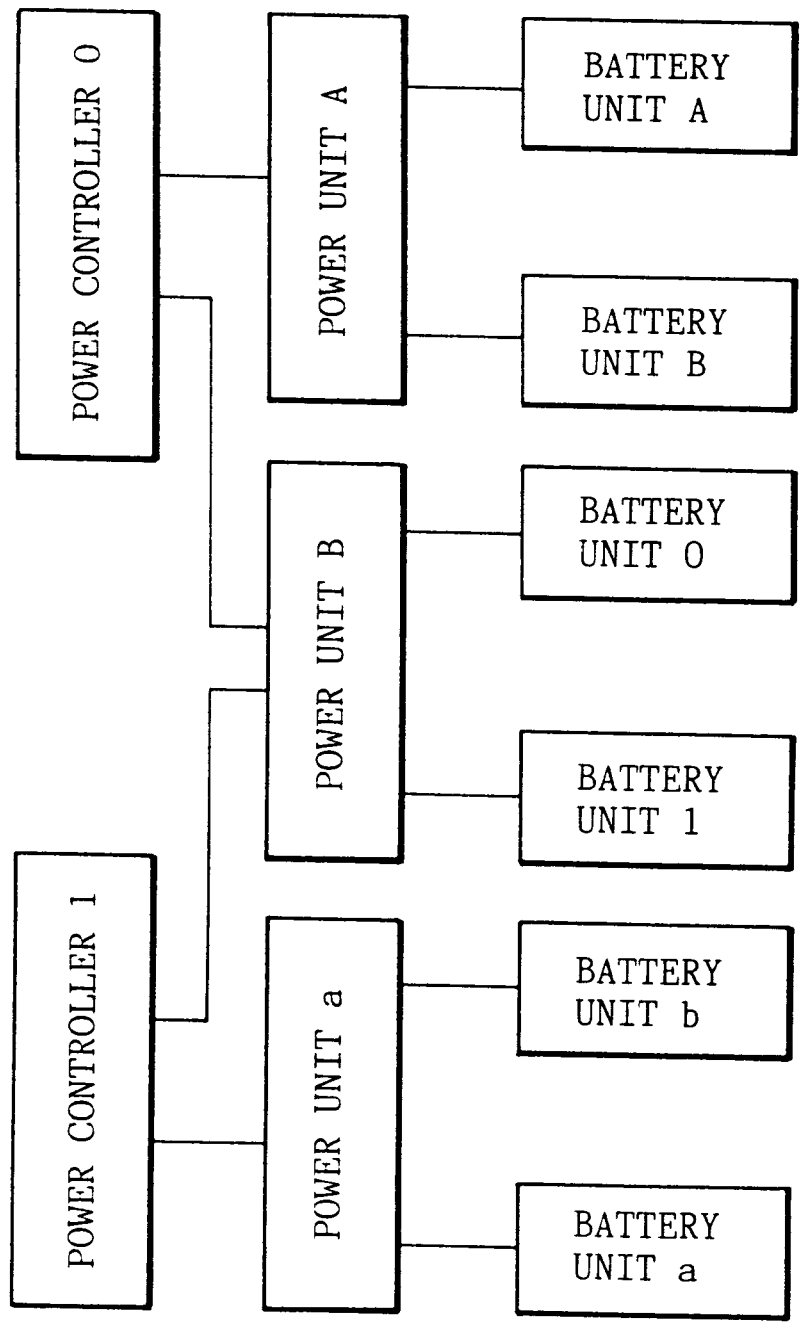
FIG. 40 is a basic structural view of the power unit of the magnetic disk apparatus.

FIG. 40 is a structural view of main power units of a magnetic disk apparatus. That is, it is a structural view of the main power units of two systems having common batteries. In the figure, the power controllers 1 and 2 are power control apparatuses. The power units A, B, and a are individual power units. The battery units A, B, 0, 1, a, and b are batteries ancillary to these power units.

As shown in the figure, the batteries 0 and 1 are batteries common to the power controllers 0 and 1. In this construction, the batteries are monitored for incorporation into the system (magnetic disk apparatus).

Figure 41:
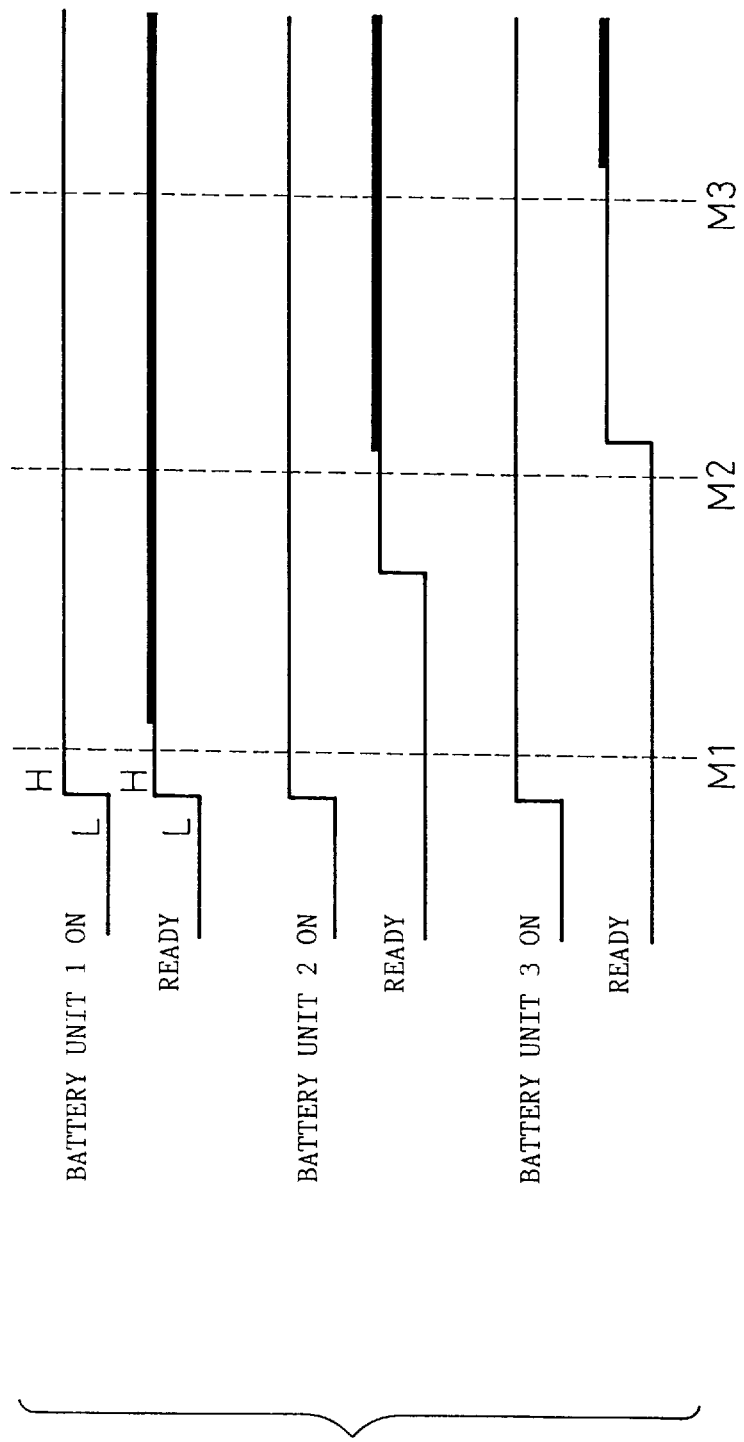
FIG. 41 is a timing chart of the conventional battery monitoring and system incorporation.

FIG. 41 is a timing chart of the conventional monitoring and incorporation of batteries. In the figure, M1, M2, and M3 show battery monitoring times. The ready signals of the batteries show that the batteries can be used and have started up in a state enabling incorporation into the system ("H" in the figure). Further, the bold lines over the ready signals show the state of the batteries incorporated into the system.

As shown in the figure, in the prior art, the battery monitoring times M1 to M3 are constant. At the monitoring time M1, the battery 1 starts up. At the monitoring time M2, the battery 1 is already incorporated in the system and the battery 2 is in a state able to be incorporated. The ready signal of the battery 3 has not yet risen (was "L" in the figure), so the battery is not in a state able to provide back-up.

When a patrol is performed, the battery is incorporated into the system in accordance with its state at the monitoring time. For example, even if the battery 3 is in a state able to provide back-up right after the monitoring time M2, as shown by the bold line, it is not incorporated into the system until the monitoring time M3. Note that the monitoring time M1 means the patrol directly after the input of power., However, in the above-mentioned conventional system, the battery function was tested by consuming the battery power actually concerned. Accordingly, there was the problem that a common battery would be simultaneously be monitored from two systems (that is, the power controllers 0 and 1 of FIG. 40) and, if that monitoring were continued for a certain time, the battery itself would end up being ruined or reduced to a state where it could not provide back-up.

Further, a predetermined time is needed until a battery can be charged from a state unable to provide back-up to a state able to provide the same. This charging time differs depending on the battery. Therefore, to judge if a battery can provide back-up by monitoring, it is necessary to confirm that the battery is normal. With the monitoring at predetermined intervals like M1, M2, and M3 in FIG. 41, the problem arises that the time before a battery can be started to be used in the apparatus (that is, incorporation into the system shown by the bold line) ends up being delayed.

The present invention has as its object the quick incorporation of a battery into a system by provision of monitoring times at suitable times and control of the competition from two systems.

The present invention provides a common power monitoring apparatus in a system having power units and a batteries ancillary to the same for each of a plurality of systems, for example, two systems, and having power units and batteries common with the other systems, wherein provision is made of a patrol control means PC for giving a signal indicating a battery monitoring operation is in progress and priority order to the monitoring of the batteries among a power controller 0 of one system and a power controller 1 of another system and when monitoring the battery function accompanying a common power supply and incorporating the same into the system, the simultaneous monitoring of a battery and the timing of incorporation of the battery into the system are controlled.

Here, the power control apparatus monitors the ready state of a battery at suitable times. If it detects that the battery is in a ready state enabling back-up, then it immediately starts the monitoring operation of that battery. If the battery functions suitably, it incorporates the battery into the system.

Further, the power control apparatus, when its own apparatus is doing the monitoring, sends a master signal MAS indicating that to the patrol control means. The patrol control means sends to the power control apparatus on the side not receiving the master signal an other-system patrol signal (O-TEST) showing that the other system is engaged in a battery monitoring operation.

In the present invention, by providing a signal which enables judgement that a battery monitoring operation is in progress at both systems, it is possible to prevent simultaneous operation of the monitoring function between two systems. Further, the charging completion signal is continuously checked for the battery in a state unable to perform back-up so as to perform the monitoring function and enable detection of the state where back-up is possible earlier.

Figure 33:
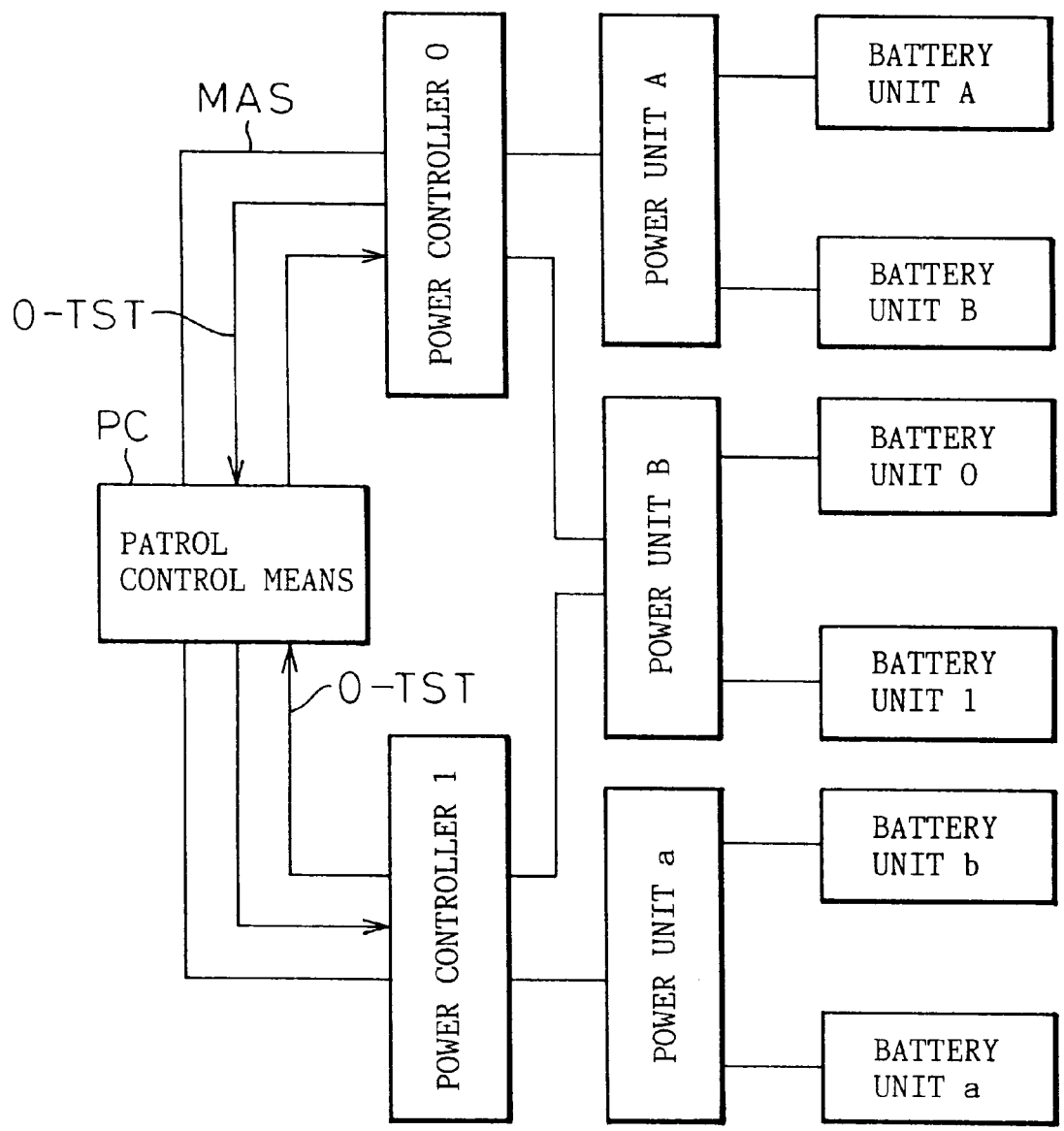
FIG. 33 is a basic structural view of monitoring of power according to the present invention.

FIG. 33 is a basic structural view of the monitoring of a battery by the present invention and shows the construction of the power apparatuses of two systems having batteries. As shown in the figure, the batteries 0 and 1 are batteries common to the power controllers 0 and 1. Further, in the present invention, a patrol control means PC is provided for controlling the timing of monitoring of the common battery units 0 and 1 between the power controllers 0 and 1. MAS is a master signal, which in this example shows that the power controller 0 side is engaged in a patrol of the common batteries. O-TEST is an other-system patrol signal. When this signal is at the high level, it indicates that the other system is engaged in a patrol. These signals are all input from the power controllers 0 and 1 to the patrol control means PC. The patrol control means, as mentioned later, controls the starting time of the patrol and instructs the start of the patrol to one based on the priority right.

Figure 34:
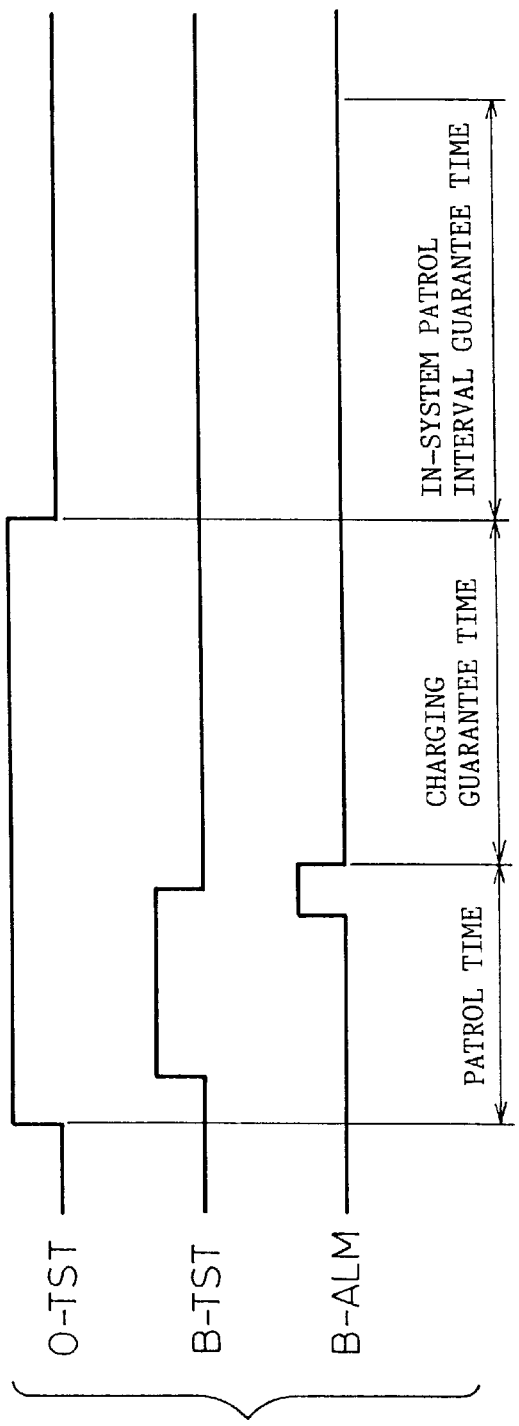
FIG. 34 is a timing chart of battery patrol in FIG. 33.

FIG. 34 is a view explaining the signal timing of a battery patrol. As mentioned earlier, O-TEST is a signal showing that the other system is performing a patrol, while B-TEST is a signal instructing a patrol of a battery. By controlling the other signal patrol signal O-TEST by a patrol control means PC in this way, it is possible to suppress the patrol of the other systems and possible to prevent consecutive patrols of a common battery. Note that B-ALM is a battery alarm signal, which, as illustrated, shows the limit of a battery patrol time. When the battery patrol time has elapsed, this is the charging guarantee time. This time may be up to the period during which the other system patrol signal O-TEST is at the high level. That is, the period during which the other-system patrol signal O-TEST is at the high level starts from when the patrol from one system is suppressed. Accordingly, when the period during which the other-system patrol signal O-TEST is at the high level passes, it is possible to use this as the time for guaranteeing the patrol interval in the system.

Figure 35:
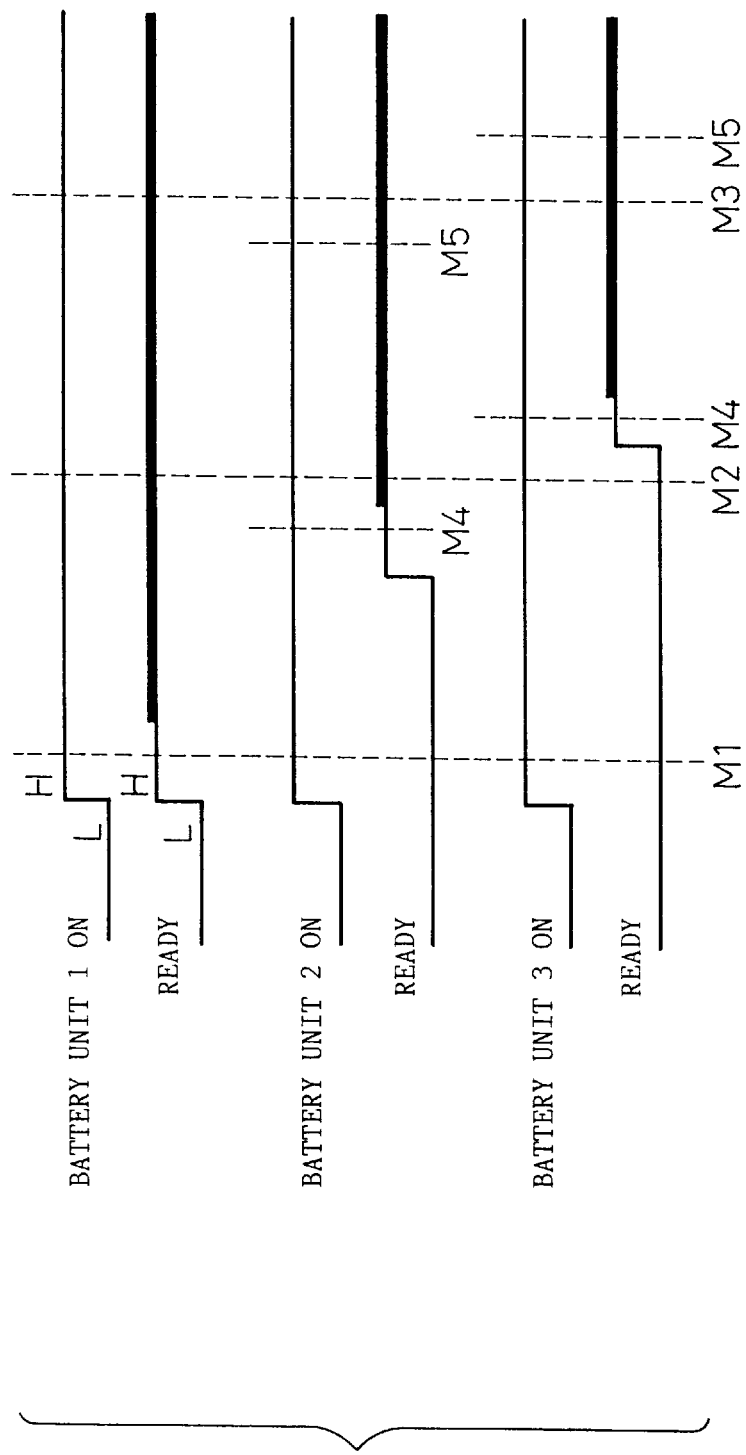
FIG. 35 is a timing chart of battery monitoring and system incorporation in FIG. 33.

FIG. 35 is a timing chart of the monitoring and incorporation of the battery of the present invention. In the same way as in FIG. 41, M1, M2, . . . are monitoring times. The bold lines on the top of the ready signals indicate a state incorporated into the system. Further, the "L" of the ready signal indicates a state where backup is not possible (that is, charging is in progress), while "H" indicates a state where back-up is possible. At the monitoring time M1, a patrol is performed and only the battery BTU is incorporated into the system, then, in the present invention, rather than perform a patrol at predetermined time intervals as in the past, just the ready signals of the batteries BTU-2 and BTU-3 are successively monitored.

That is, if it is detected that the ready signal is ON ("H"), as shown by the monitoring time M4, the patrol of the battery 2 is immediately executed. If in a state where back-up is possible, as shown by the bold line, this is immediately incorporated into the system. Similarly, if it is detected that the ready signal is "H" for the battery 3, then as shown by the monitoring time M4, the patrol is immediately executed. If the battery is in a state enabling use for back-up, as shown by the bold line, it is immediately incorporated into the system. Note that the monitoring time M1 is just after the power is turned on, the monitoring time M2 is a certain time after the monitoring time M1, and the monitoring time M3 is a certain time after the monitoring time M2. Further, the monitoring time M4 is the time just after the "h" of the ready signal is detected, while the monitoring time M5 is a predetermined time from the monitoring time M4. In this way, in the present invention, by successively executing just the ready signals and detecting if the ready signals are ON, the battery patrols are immediately performed, so it is possible to quickly incorporate the batteries into the system.

Figure 36:
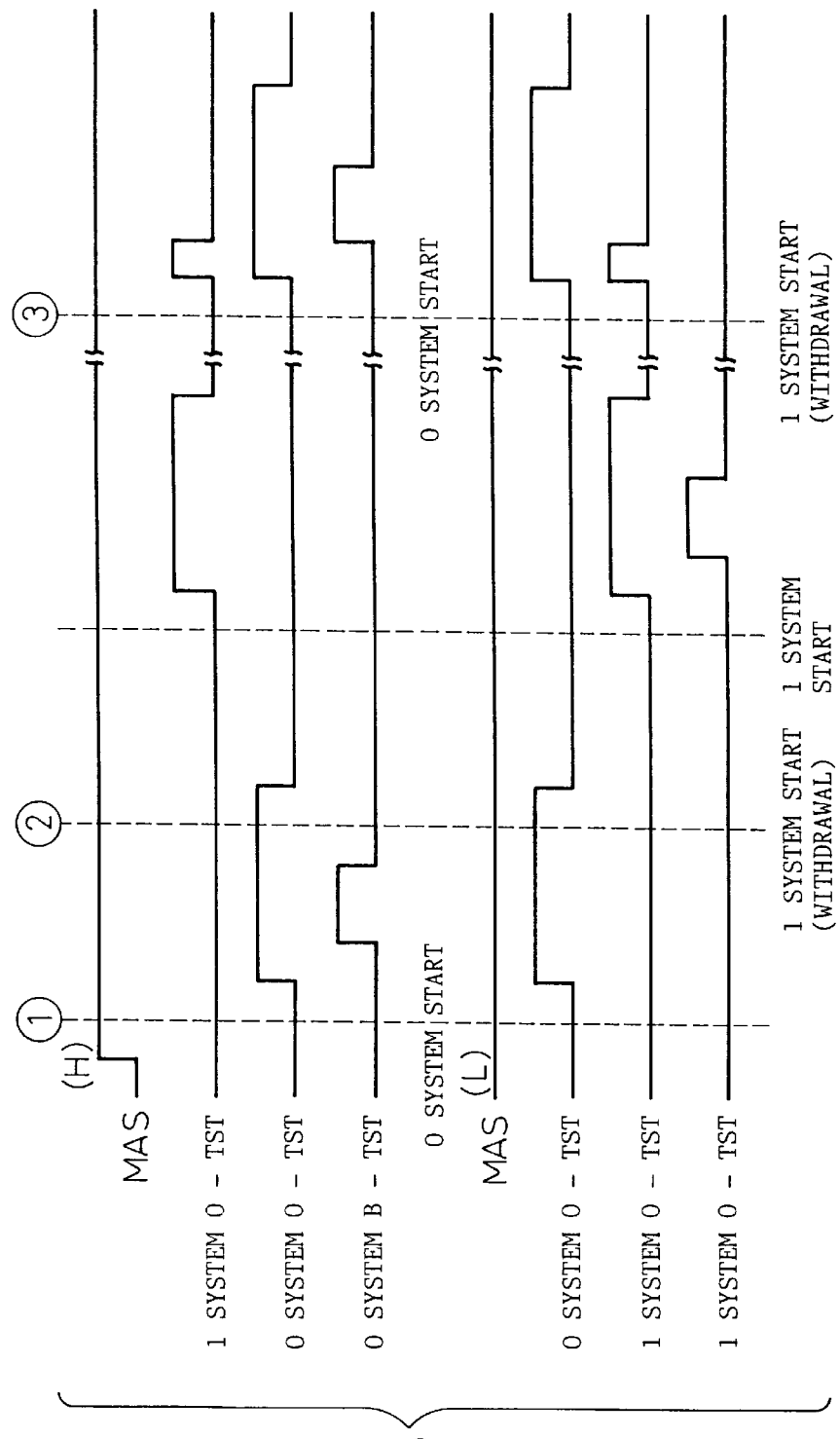
FIG. 36 is a timing chart of the battery patrol at the time of competition in FIG. 33.

FIG. 36 is a signal timing chart of a battery patrol at the time of competition according to the present invention. In the figure, there is shown the method of patrol control in two systems. As mentioned earlier, MAS is a master signal. When it is ON, that is, at the high level (H), it indicates to perform a patrol. O-TEST is an other-system patrol signal. When this signal is at the high level, it indicates that a patrol is to be performed. B-TEST is a battery patrol instruction signal. When at a high level, it indicates that a battery patrol is being performed.

When the 0 system and the 1 system are not identical in timing, as shown by the time [1], a certain sequence is followed, but when they try to start a patrol simultaneously, as shown by the time [3], or when one tries to start a patrol when the other system is already engaged in it, as shown by the time [2], control is exercised as follows. This control is performed by the power controllers 0 and 1.

When starting a patrol, first, it is detected if the other-system patrol signal O-TEST is "high" or "low" to confirm that the other system is not engaged in a patrol. If the other-system patrol signal O-TEST is ON and the other system is already engaged in a patrol, the time until the other system ends it is set and the time of start of the patrol is shifted. This is shown by the "withdrawal" in the figure.

On the other hand, when both systems try to start the patrol simultaneously, the system with a lower order of priority turns off the other-system patrol signal O-TEST, that is, makes it low, while the system with the priority right waits until the other-system patrol signal O-TEST is turned off, then starts the patrol.

Figure 37:
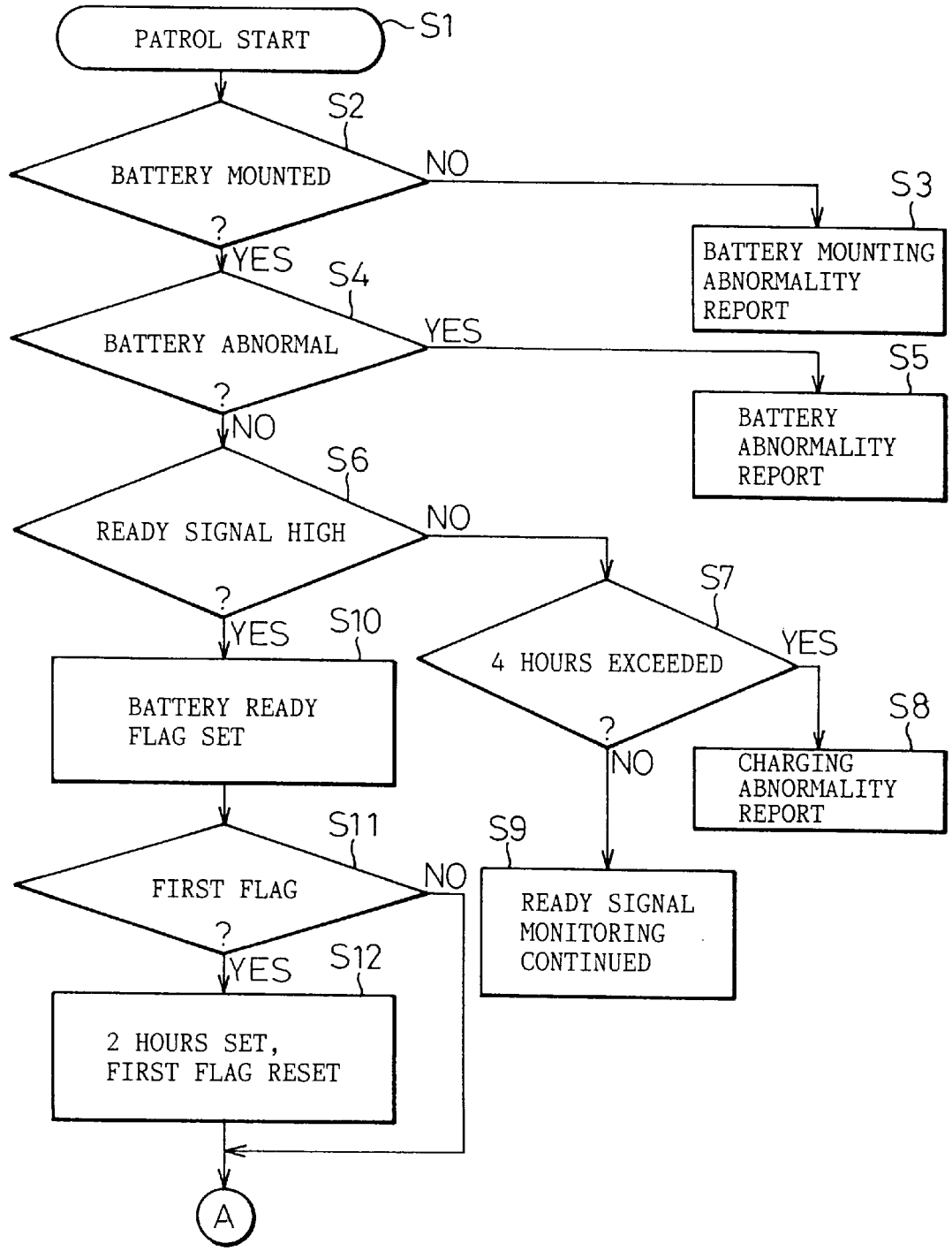
FIG. 37 is a flow chart (1) of the processing routine in FIG. 33.
Figure 38:
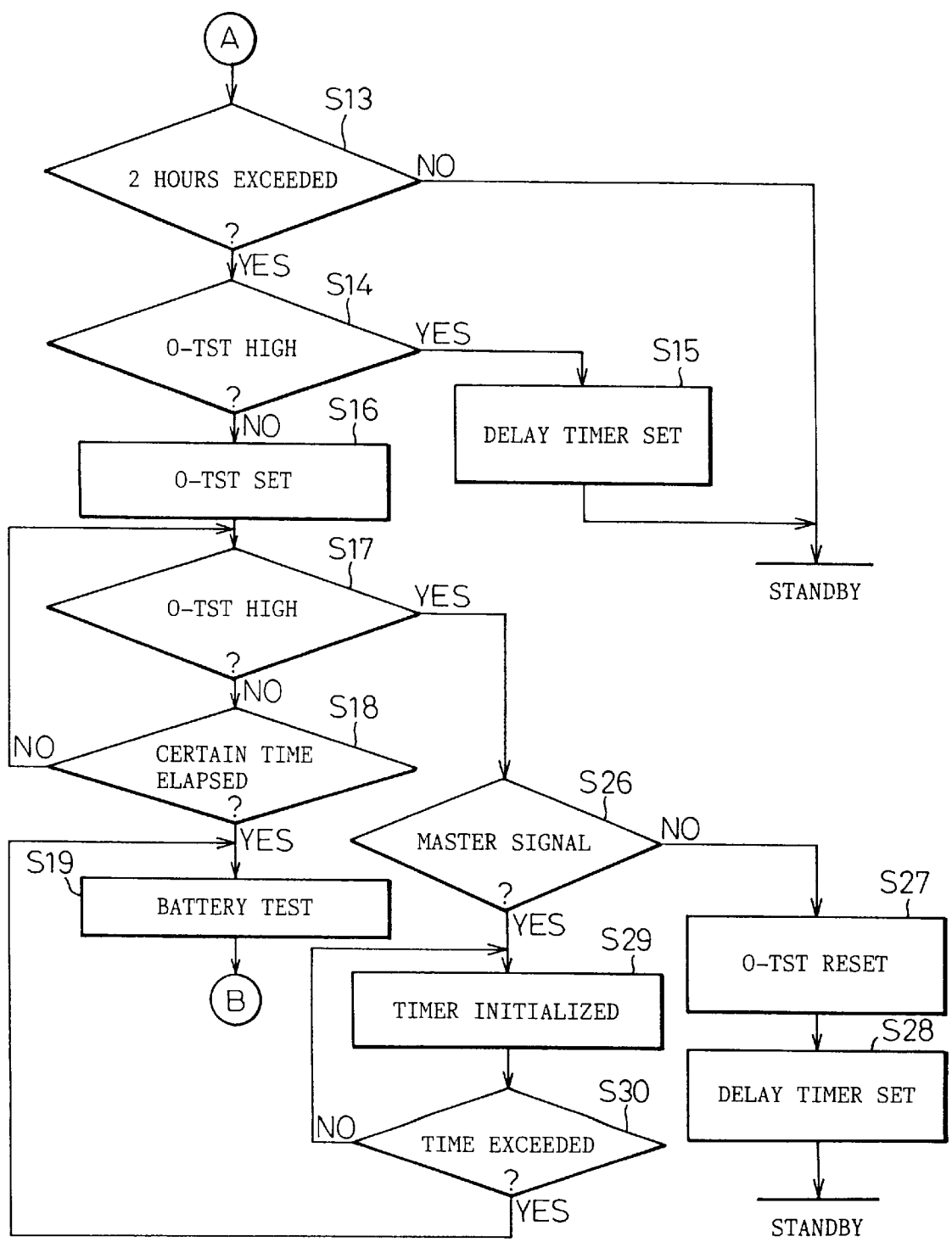
FIG. 38 is a flow chart (2) of the processing routine in FIG. 33.
Figure 39:
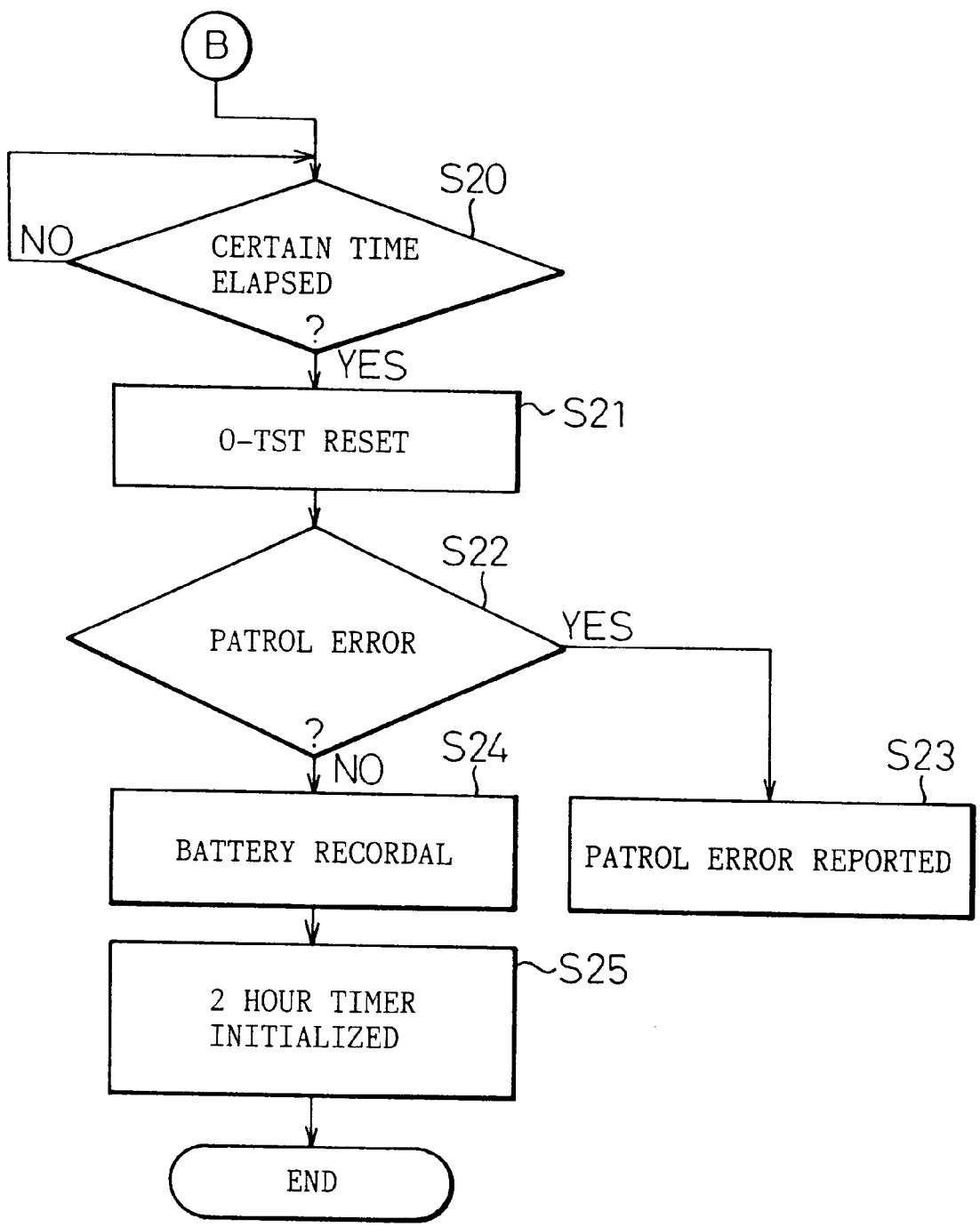
FIG. 39 is a flow chart (3) of the processing routine in FIG. 33.

FIG. 37 to FIG. 39 are flow charts of the processing routine of the power monitoring apparatus of the present invention. If the start of the battery patrol is instructed (S1), first, it is judged if a battery is mounted (S2). If not mounted, improper mounting is reported (S3). If mounted, then it is judged if the battery itself is abnormal (S4). If abnormal, a battery abnormality is reported (S5). Next, it is judged if the ready signal of the battery is high (1) or low (0) (S6). If low, then it is judged if four hours have been exceeded (S7). If exceeded, then a charging abnormality is reported (S8). If four hours have not been exceeded, then the monitoring of the ready signal is continued (S9).

At step S6, if the ready signal is high, the battery ready flag is set (S11). It is judged if it is the initial flag or not (S1). Two hours are set and the initial flag is reset (S12). Next, it is judged if two hours have been exceeded (S13). If not exceeded, this is awaited. If exceeded, it is judged if the other-system patrol signal O-TEST is high or not (S14). If exceeded, the delay timer is set (S15) and this is awaited.

If the O-TEST is not high, this is set (S16) and it is judged once again if O-TEST is high (S17). If not high, it is judged if a certain time has elapsed (S18).

If a certain time has elapsed at step 18, the battery test is performed (S19) and it is judged if another time has elapsed (S20). If it has elapsed, the O-TEST is reset (S21) and it is judged if there is an error in the patrol (S22). If there is an error, the patrol error is reported (S23), while if there is no error, the battery is recorded (S24) and the two-hour timer is initialized (S25), whereby the routine ends.

On the other hand, if O-TEST is high at step S17, the master signal is judged (S26). If there is no master signal, O-TEST is reset (S27), the delay timer is set (S28), the system waits. If there is a master signal, the timer is initialized (S29) and it is judged if a certain time has elapsed (S30). If that time has elapsed, the battery test is performed (S19).

As explained above, according to the monitoring of the power by the present invention, in a battery patrol, it is possible to prevent simultaneous control of a common battery by one system and another system and therefore to prevent poor judgement due to mistaken operation of the battery and prevent a shift to a state where back-up is not possible due to abnormal consumption caused by consecutive patrols.

Next, an explanation will be made of the control of switching of power according to the present invention. Before explaining the present invention, however, an explanation will be made of the conventional construction.

Figure 45:
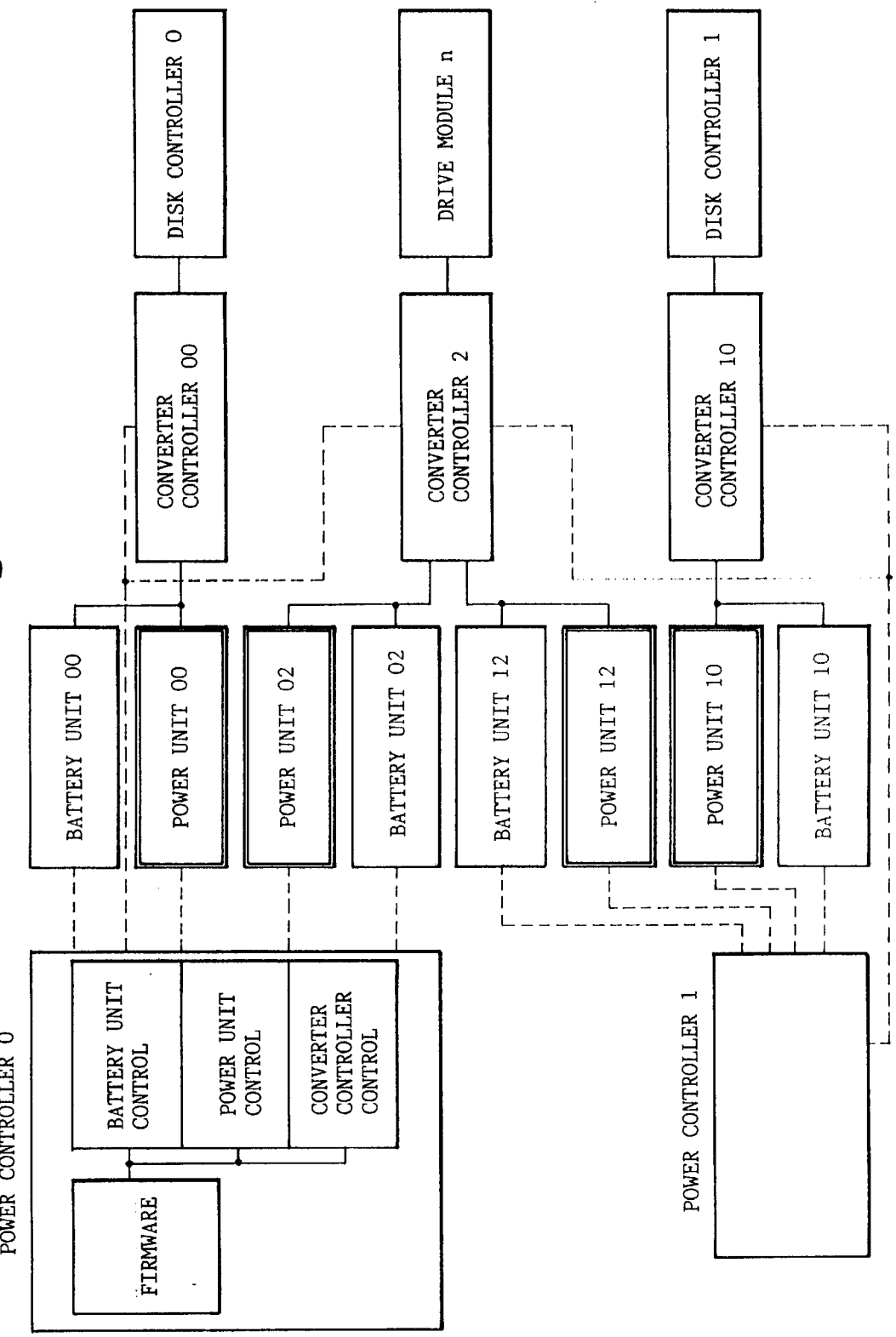
FIG. 45 is a structural view of conventional power cut-off control.

FIG. 45 is a structural view of the conventional power apparatuses of two systems having common batteries.

The power controller 0 is provided with battery units, power units, and converter controllers controlled by firmware. The power controller 1 has the same configuration.

In such a configuration, the conventional sequence of power control had been as follows: When there was an ON instruction for the power of the power controller 0 side, that is, the 0 system, the power controller 0 instructed the input of power, based on a sequence predetermined by firmware, in the sequence of the power unit 00→02→ converter controller 00→02→ battery unit 00→02 by instructions to the battery unit control circuit, the power unit control circuit, and the power controller. On the other hand, the same was performed for the power controller 1 side, that is, the 1 system as the 0 system. The power controller 1 instructed the input of power in the sequence of the power unit 10→12→ converter controller 10→02→ battery unit 10→12. Therefore, the converter controller 02 requires a circuit construction enabling control from the power control apparatuses of both the 0 and 1 systems, resulting in a circuit construction different from that of the converter controllers 00 and 10 of just the 0 system or just the 1 system.

In the above-mentioned conventional structure, as mentioned earlier, the converter controller 2 had a circuit construction enabling control from power controllers of two systems. This ended up being a complicated circuit structure different from those of the power controllers 00 and 10 of just the 0 system or the 1 system. Since common designs could not be used, there were limits as to the common use of components and this led to higher costs.

Also, when the battery unit 02 of the 0 system was normal, but the battery unit 12 of the 1 system was abnormal, even if a short power failure occurred, for example, the 1 system would not be judged as being able to be backed up due to the abnormality of the battery unit 12 and despite the battery unit 02 being normal, the power to the 1 system would be turned off, resulting in operation of only the single system of the power controller 0.

Further, as shown in the figure, when backing up apparatuses having a common power supply, the practice had been to connect a battery to each system. Therefore, there were two batteries at the common portion (in the figure, the battery units 02 and 12) and therefore there was the problem of a larger mounting space required.

Further, when there are common batteries, due to providing two systems of power control, the battery tests are performed simultaneously when the power is turned on. This leads to detection of the batteries as defective, causes more than necessary battery consumption, and speeds the battery deterioration.

The present invention has as its object the common use of power supplies and batteries, providing one each instead of one for each system, and the provision of a cross control circuit between two power control apparatuses for switching the connection between these and the power supply and battery so as to reduce the number of power supplies and batteries and thereby achieve common use and reduction of components and also the prevention of competition in battery tests by the provision of an address setting circuit for setting which battery test to perform.

The present invention provides a power apparatus in a magnetic disk apparatus having a power unit and battery unit ancillary to the power unit for each of a plurality of systems, for example, two systems, and having a power unit and ancillary battery unit common with other systems, wherein provision is made of a cross-control means X for cross controlling the connection to the common power supply and battery between a power controller 0 of one system and a power controller 1 of another system and provision is made of an address setting means AD for setting an address showing one's own apparatus in each of the power control apparatuses, the common power unit and ancillary battery unit being commonly used for the two systems by switching the cross control means X on the basis of the address of a selected one of the systems.

Further, by setting the address of one's own system by the address setting circuit, the battery test and monitoring are made to be performed from only one system.

The present invention provides a cross control circuit X between the power control apparatuses of the two systems, whereby control of the power unit 02 and the battery unit 02 is made possible in common from the power controllers 0 and 1. By this, it is sufficient to provide a single battery, converter controller, power supply, etc. to the system with a power supply subject to common control and thus reduce the number of components and make common use of the same. Further, by providing the two systems with an address setting means, the starting times of the battery tests are changed so as to prevent battery tests being performed simultaneously from two systems.

Figure 42:
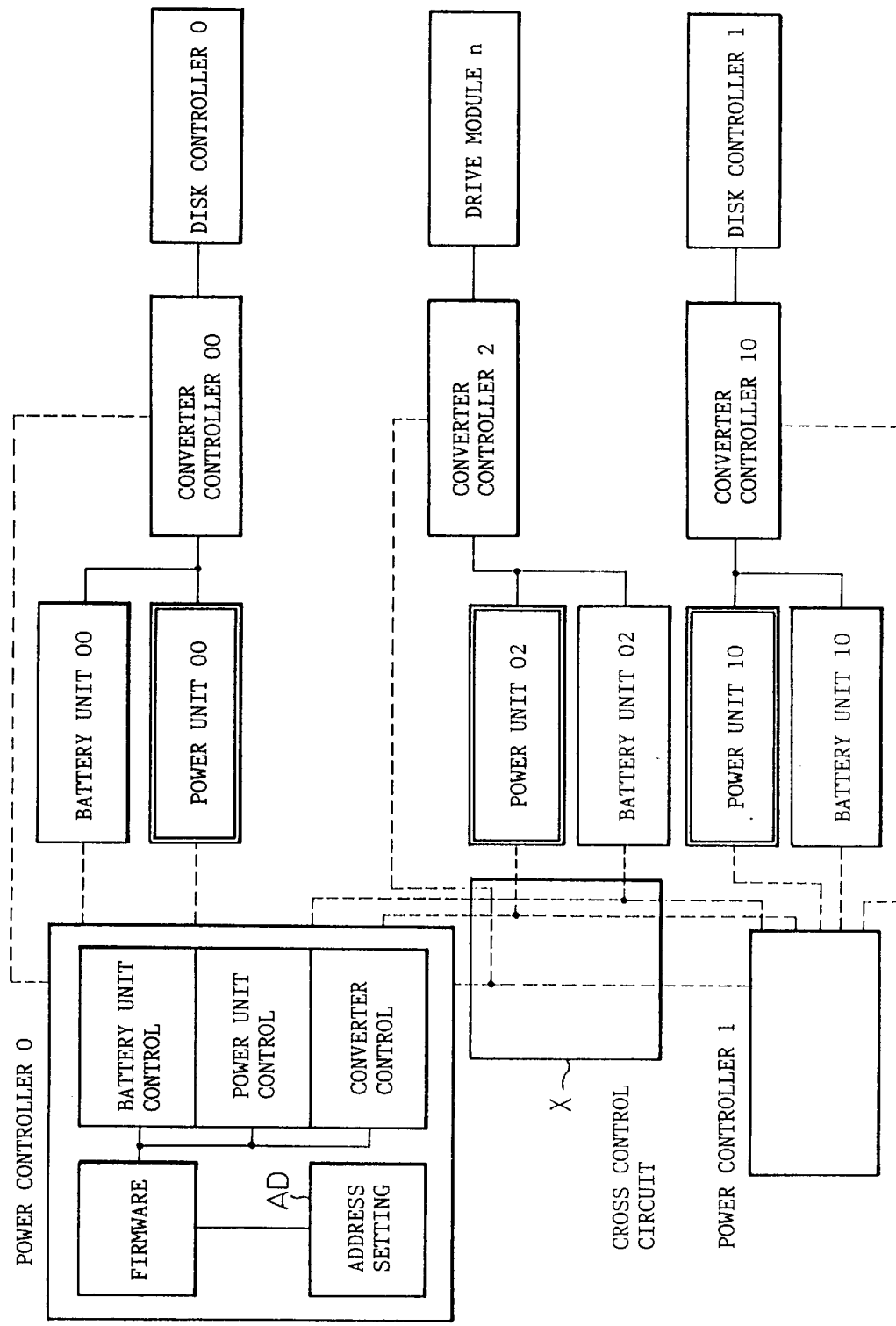
FIG. 42 is a basic structural view of power cutoff control according to the present invention.

FIG. 42 is a structural view of the principle of control of switching of power according to the present invention.

The power controller 0 is provided with a battery unit, controlled by firmware, a power unit, and a converter controller. Further, it is provided with an address setting circuit AD for controlling the simultaneous battery tests from two systems. The power controller 1 has a similar construction.

Further, separate provision is made of a cross control circuit X for switching the connection between the power control circuits of the two systems and a common power supply.

As clear from the above construction, while the power units 02 and 12 and the battery units 02 and 12 were required in the conventional construction, in the present invention, common use is made of the single power unit 02 and the single battery unit 02. To enable such a construction, control is performed through the cross control circuit X connected to the power controller 0 and 1.

Further, by the power-on instruction from one of the power controllers 0 or 1, the power unit 02 and the battery unit 02 are instructed to turn the power on. Further, by issuing the power-off instruction from both of the power controllers 0 and 1, the power unit 02 and the battery unit 02 are instructed to turn off. Further, the state of the battery unit 02 can be grasped from both of the power controllers 0 and 1 and through the cross control circuit.

Figure 43:
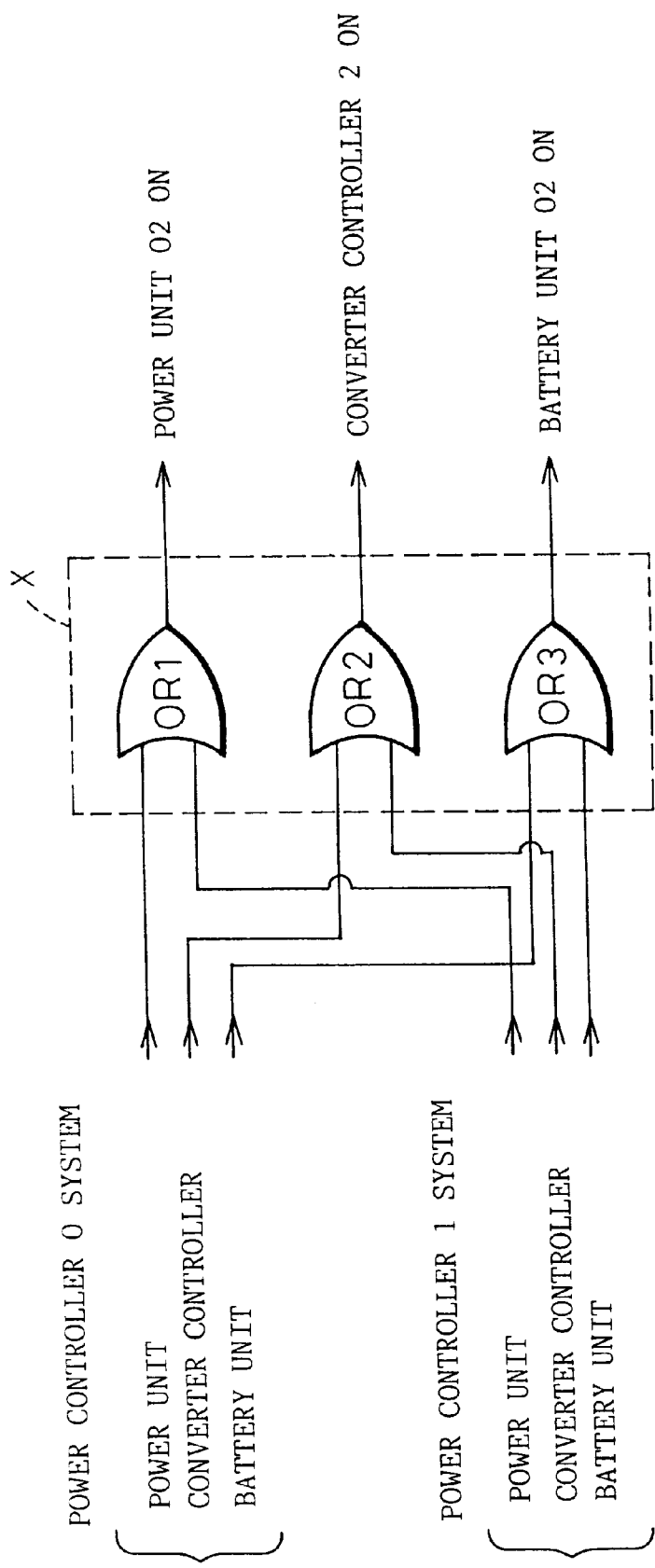
FIG. 43 is a circuit diagram of an embodiment of a cross control circuit of the structure of FIG. 42.

By such a construction, the control of the power unit, converter controller, and battery unit become completely the same, making use of common designs and common components possible FIG. 43 is a structural view of an embodiment of a cross control circuit shown in FIG. 42. As shown in the figure, the cross control circuit X is comprised of three OR gates OR1, OR2, and OR3. Signals of two systems are input to the OR gates. Therefore, if one of the inputs is on, an ON signal is output. For example, if the battery unit 02 receives an ON instruction from one of the power controller systems 0 or 1, the battery unit 02 is turned on. The rest of the construction is the same, so will not be explained.

Figure 44:
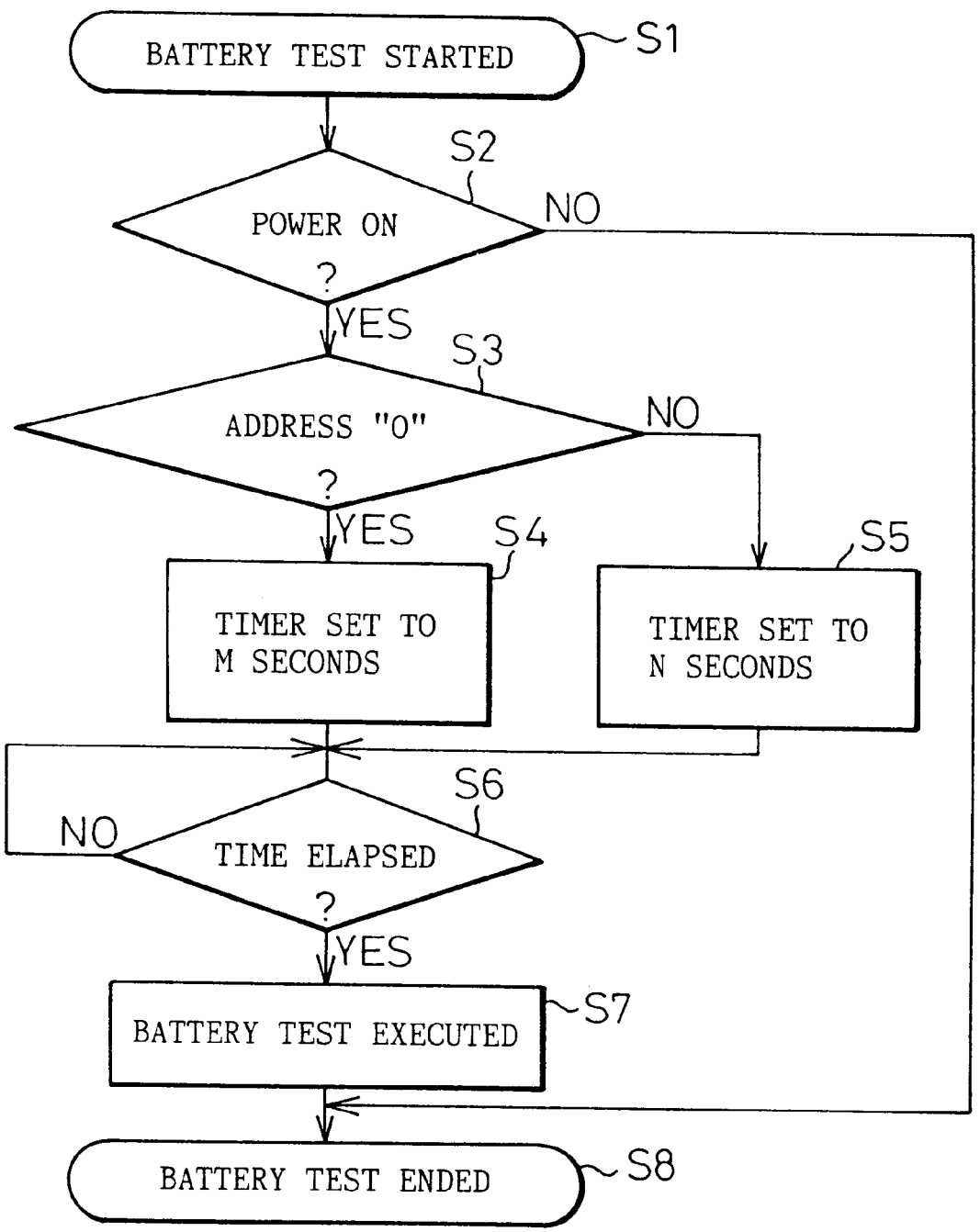
FIG. 44 is a flow chart of the start of a battery test in FIG. 42.

FIG. 44 is a flow chart of the start of the battery test of the present invention and shows in particular a flow chart for setting a timer value. When there is competition in the battery tests when the power is on, an address is given to each of the power controllers 0 and 1, the addresses are read into firmware, and the timer is initialized so that the times for the start of the battery tests are made different for the power controllers 0 and 1, thereby preventing competition.

In FIG. 44, if the start of a battery test is instructed (S1), it is judged if the power is on or not (S2). Further, it is judged if the address is for the power controller 0 or 1 (S3). If for the power controller 0, the timer is set to M seconds (S4). If the power controller 1, the timer is set to N seconds (S5). Next, for each of the M seconds of the power controller 0 system and the N seconds of the power controller 1 system, it is judged if the timer has exceeded the set time (S6). if it has not exceeded it, the battery test is performed (S7) and the predetermined test ended (S8). Here, M<<N.

As explained above, according to the power cut-off control according to the present invention, by enabling cross control of the battery, it is possible to reduce the number of batteries installed per system and to reduce the size of the system construction and, further, possible to make use of common designs for the power unit. Also, it is possible to avoid simultaneous operation of the battery tests, so the battery life is improved and the common components appear the same from all systems, so it is possible to obtain a correct grasp of the state of the system batteries and to remarkably improve the reliability at the time of back-up.

Next, an explanation will be given of the analysis of the causes of power cut-offs according to the present invention. Before explaining the present invention, however, an explanation will be given of the conventional construction and its problems.

Figure 48:
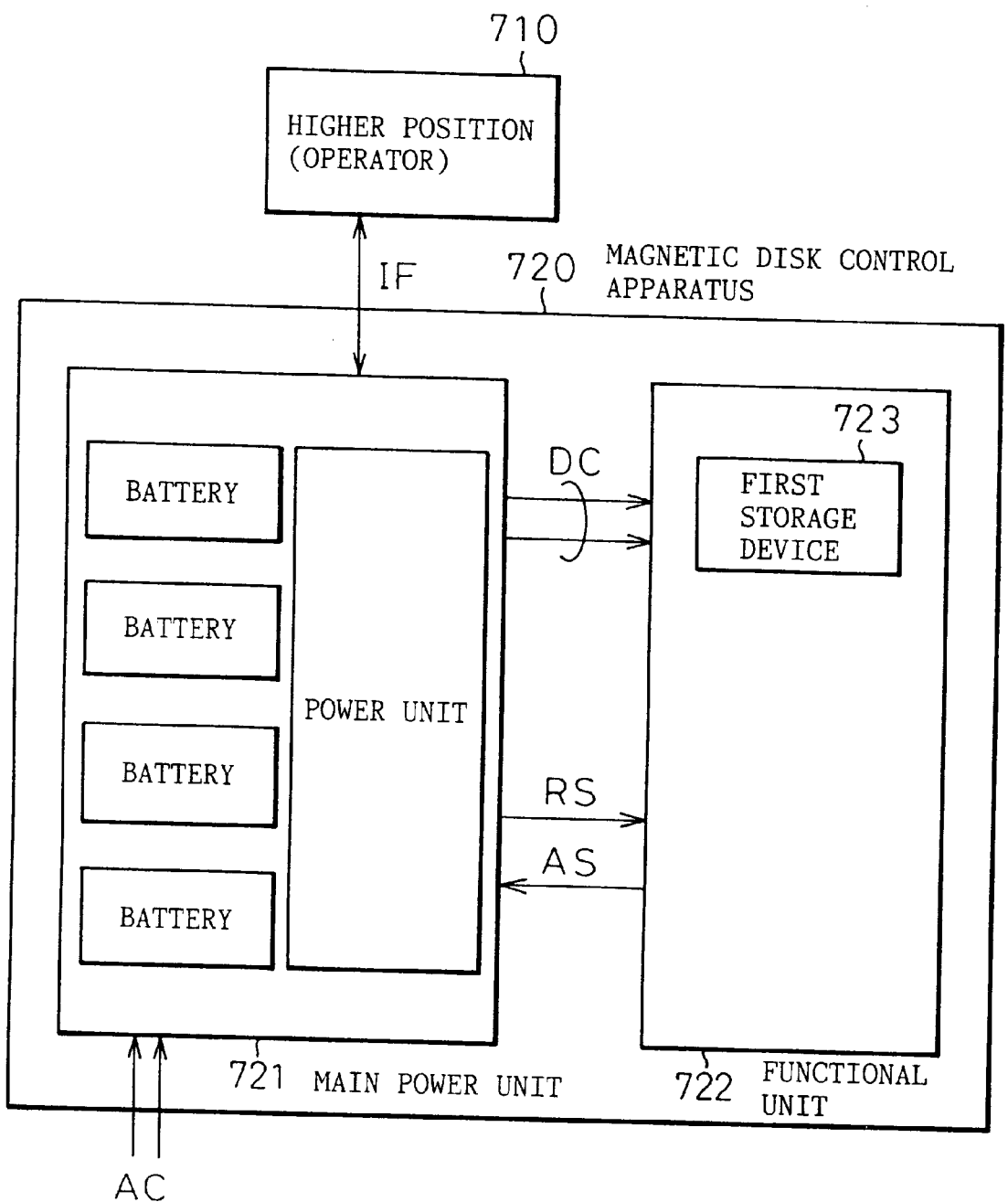
FIG. 48 is a basic structural view of the conventional analysis of causes of power cut-off.
Figure 49:
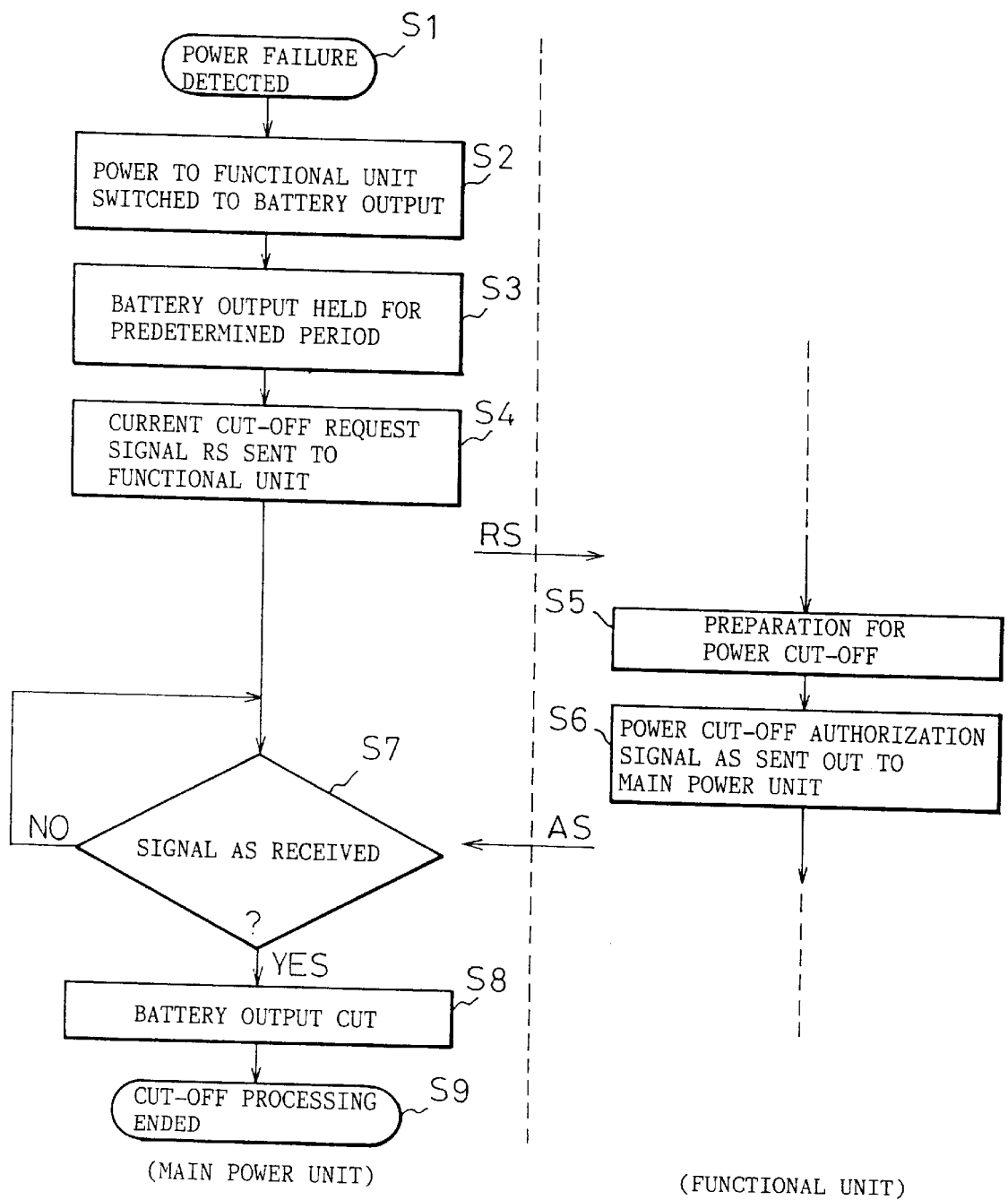
FIG. 49 is a flow chart of the processing for power cut-off in FIG. 48.

FIG. 48 is a basic structural view of the conventional supply of power and control of cut-off. FIG. 49 is a flow chart of the power cut-off control system in the construction of FIG. 48. In FIG. 48, the magnetic disk control apparatus 720 is divided schematically into a main power unit 721 and a functional unit 722 for simplification of the explanation. Accordingly, the power unit and the battery units are included in the main power unit 721 of the construction of FIG. 48. The rest of the construction is included in the functional unit 722. The first storage device 723 is a storage device for recording the history of occurrence of breakdowns such as stoppages of operation of the system. Note that IF is a power control interface between a higher apparatus 710 and the magnetic disk control apparatus 720, AC is AC power, and DC is DC power. Further, while explained in FIG. 49, RS is a power cutoff request signal sent from the power unit 721, and AS is a power cut-off authorization signal sent from the functional unit 722.

In FIG. 49, when the main power unit 721 receives an instruction for detection of a power failure or cut-off of power from the higher apparatus 710, such as a host computer, or by operation by an operator through a power control interface IF (S1), first, the main power unit 721 switches the power supply to the functional unit 722 from the power unit to the batteries (S2), then the main power unit 721 holds the battery output for a predetermined period (S3). That is, the construction enables the power of the system to be maintained for a predetermined period during a power failure by use of the back-up batteries. Next, the main power unit 721 sends out to the functional unit 722 a power cut-off request signal RS notifying it that it wishes to cut off the power.

The functional unit 722, when receiving this power cut-off request signal RS, performs predetermined processing for cutting off the power, such as preparations for the power cut-off (S5). Further, when the predetermined processing ends, it sends a power cutoff authorization signal AS to the main power unit 721 (S6) to notify the main power unit 721 that it is all right to cut off the power.

The main power unit 721, when receiving this power cut-off authorization signal AS, first judges if the power cut-off authorization signal AS has been received (S7). If this signal AS has been received, it performs the processing for cutting off the power (S8), whereafter the power cut-off processing ends. Further, if the signal AS has not yet been received from the functional unit 722 at step S7, the judgement of this step is repeated.

In this way, if the main power unit 721 detects a power failure, it switches to the battery for the power supply. When a predetermined time elapses, it automatically cuts off the batteries by the same routine as when it receives a normal power cut-off instruction. Further, at the time of the next input of power, it charges the used batteries to prepare for the next power failure.

However, the first storage device in the conventional construction only recorded the history of the occurrence of breakdowns, such as stoppages of the system operation, as mentioned earlier, and did not record the history of the state of use of the power, such as power cut-offs. Therefore, there were the following problems:

[1] When the power was cut off due to a power failure, it was not possible to notify the higher apparatus or the operator for what reason the power was cut off.

[2] When a battery is in the charging state at the time of the next input of power, it is not possible to determine why it is in the charging state.

[3] The time when a battery has deteriorated cannot be estimated. Therefore, the time for replacement of the battery cannot be determined.

The present invention has as its object to enable the easy analysis of the causes of power cut-off.

Figure 46:
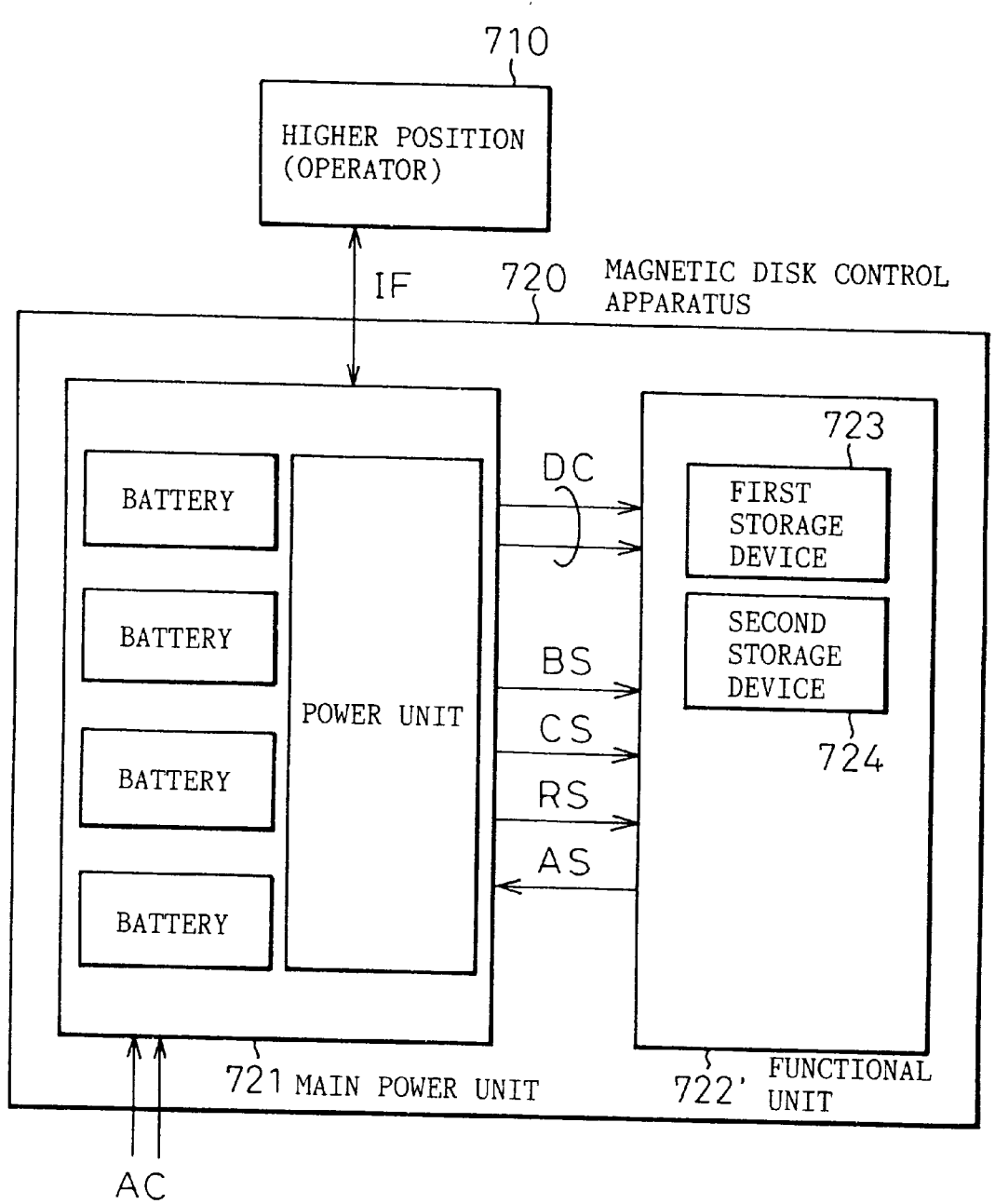
FIG. 46 is a basic structural view of the analysis of the causes of power cut-off according to the present invention.

FIG. 46 is a structural view of the principle of the analysis of the causes of power cut-off according to the present invention.

According to the present invention, there is provided a power cut-off control apparatus in a file control system comprised by a higher apparatus, a magnetic disk apparatus, and a magnetic disk control apparatus provided between the same, wherein a main power unit 721 is provided with a power unit for supplying power to the drive modules and battery units for backing up the power during a power failure, while a functional unit 722' is provided with a first storage device 723 for recording the history of the power, such as the occurrence of breakdowns, and also a second storage device 724 for obtaining a log of the state of use of the power, the main power unit sends to the functional unit at the time the power to the system is cut off a back-up signal BS indicating that the back-up batteries have been used due to a power failure and an automatic cut-off signal CS indicating that the power has been automatically cut off due to the elapse of the maximum discharge time after switching to the batteries, next, a power cut-off request signal RS is sent from the main power unit to the functional unit, the functional unit, when receiving the power cut-off request signal, performs the predetermined processing, including preparations for power cut-off, then sends a power cutoff authorization signal AS to the main power unit, and the second storage device of the functional unit logs the back-up signal and the automatic cut-off signal when receiving the power cut-off request signal, and the state of use of the power, such as the previous cut-off of power, is judged at the time of the next input of power by referring to the second storage device.

Here, the automatic cut-off signal CS can be set to a high level when giving notification that the power has been automatically cut off after the elapse of the maximum discharge time of the batteries and to a low level when forcibly cutting off the power before the elapse of the maximum discharge time.

Further, the second storage device can use part of the memory area of the first storage device. Also, the first and second storage devices can use hard disks.

In the present invention, the back-up signal notifying that the batteries are being used due to a power failure and the automatic cut-off signal notifying that the power was automatically cut off since a predetermined time (maximum discharge time of batteries) elapsed after switching to the batteries are sent to the functional unit before sending out a power cut-off request signal. The functional unit is provided with a second storage means for recording the state of use of the power. These signals are logged in the second storage means. Therefore, by referring to the second storage means before the next input of power, it is possible to easily analyze the state of use of the power and the causes of power cut-off. Note that the second storage means need not be separately provided, but can be comprised using a part of the memory area of the first storage means and also can be comprised using a hard disk.

Figure 47:
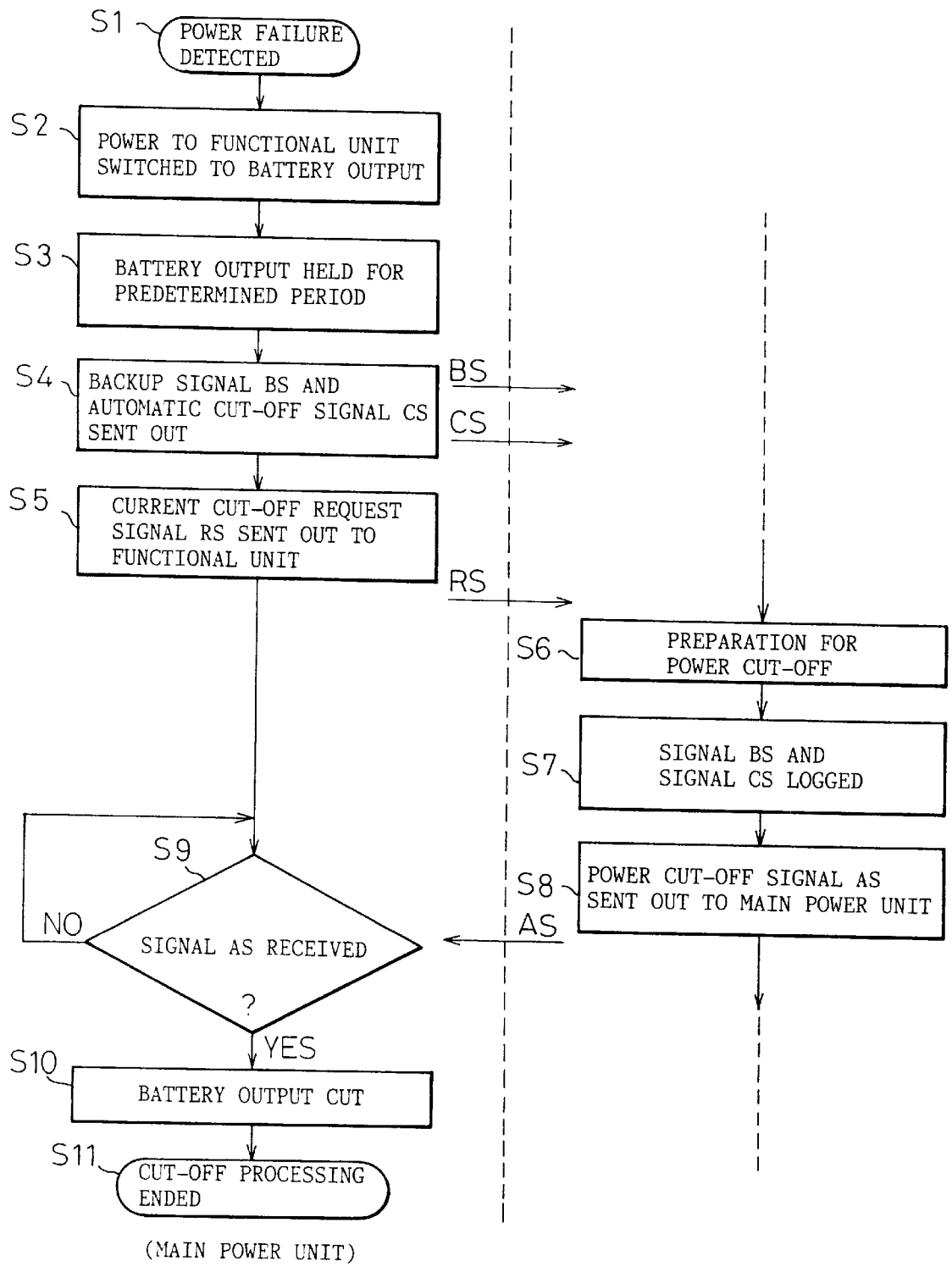
FIG. 47 is a flow chart of processing of power cut-off in FIG. 46.

FIG. 47 is a flow chart of the processing routine of the construction of FIG. 46. In the figure, constituent elements the same as those in FIG. 46 are given the same reference numerals. In the present invention, the functional unit 722' is provided with a second storage device 724 for recording the history of the state of use of the power, such as power stoppages. Note that BS is the battery back-up signal from the main power unit 721 and CS is the automatic cut-off signal from the main power unit 721.

In FIG. 47, in the same way as mentioned above, when the main power unit 721 receives an instruction for detection of a power failure or cut-off of power from a higher apparatus 710, such as a host computer, or by operation by an operator through a power control interface IF (S1), first, the main power unit 721 switches the power supply to the functional unit 722' from the power unit to the batteries (S2), then the main power unit 721 holds the battery output for a predetermined period (S3). That is, the construction enables the power of the system to be maintained for a predetermined period during a power failure by use of the back-up batteries. Next, the main power unit 721 sends out to the functional unit 722' a back-up signal BS notifying it that the batteries are being used due to a power failure and an automatic cut-off signal CS notifying it that it is desired to cut off the power automatically since the maximum discharge time of the batteries has been reached. The main power unit 721 also sends next a power cut-off request signal RS to the functional unit 722'.

The functional unit 722', when receiving the power cut-off request signal RS, performs predetermined processing such as preparation for a power cut-off (S6), then logs (stores) the back-up signal BS and the automatic cut-off signal CS in the second storage device 724. When the logging in the second storage device 724 has been finished, it sends to the main power unit 721 a power cut-off authorization signal AS (S8). The main power unit 721 judges if a power cut-off authorization signal AS has been received and if the signal AS has been received, cuts off the battery output used up to then (S10) and ends the power cut-off processing (S11). Note that, as mentioned above, by making the automatic cut-off signal CS the high level when automatically cutting off the power due to the elapse of the maximum discharge time of the batteries and by making the automatic cut-off signal CS the low level when forcibly cutting off the power during the use of the batteries, it is possible to store the data in the second storage device 724 in both cases.

As explained above, in the present invention, provision is made of a back-up signal, automatic cut-off signal, and a second storage means for logging these signals. By referring to the second storage means later, there are the following effects:

[1] It is learned if a battery has been used at the time of power cut-off.

[2] It is possible to judge if the power unit has been automatically cut off due to a power failure.

[3] When a battery is in a charging state at the time of input of power, it is learned if this charging is due to the use of the battery due to a previous power cut-off or is due to self-charging due to deterioration, which can serve as a guide for battery replacement.

[4] By investigating the frequency of maximum discharge of a battery, it is possible to estimate the deterioration of the battery, which can be used as a guide for its replacement.

Next, an explanation will be made of a power maintenance display means according to the present invention. Before explaining the present invention, however, an explanation will be made of the basic construction of the system.

Figure 52:
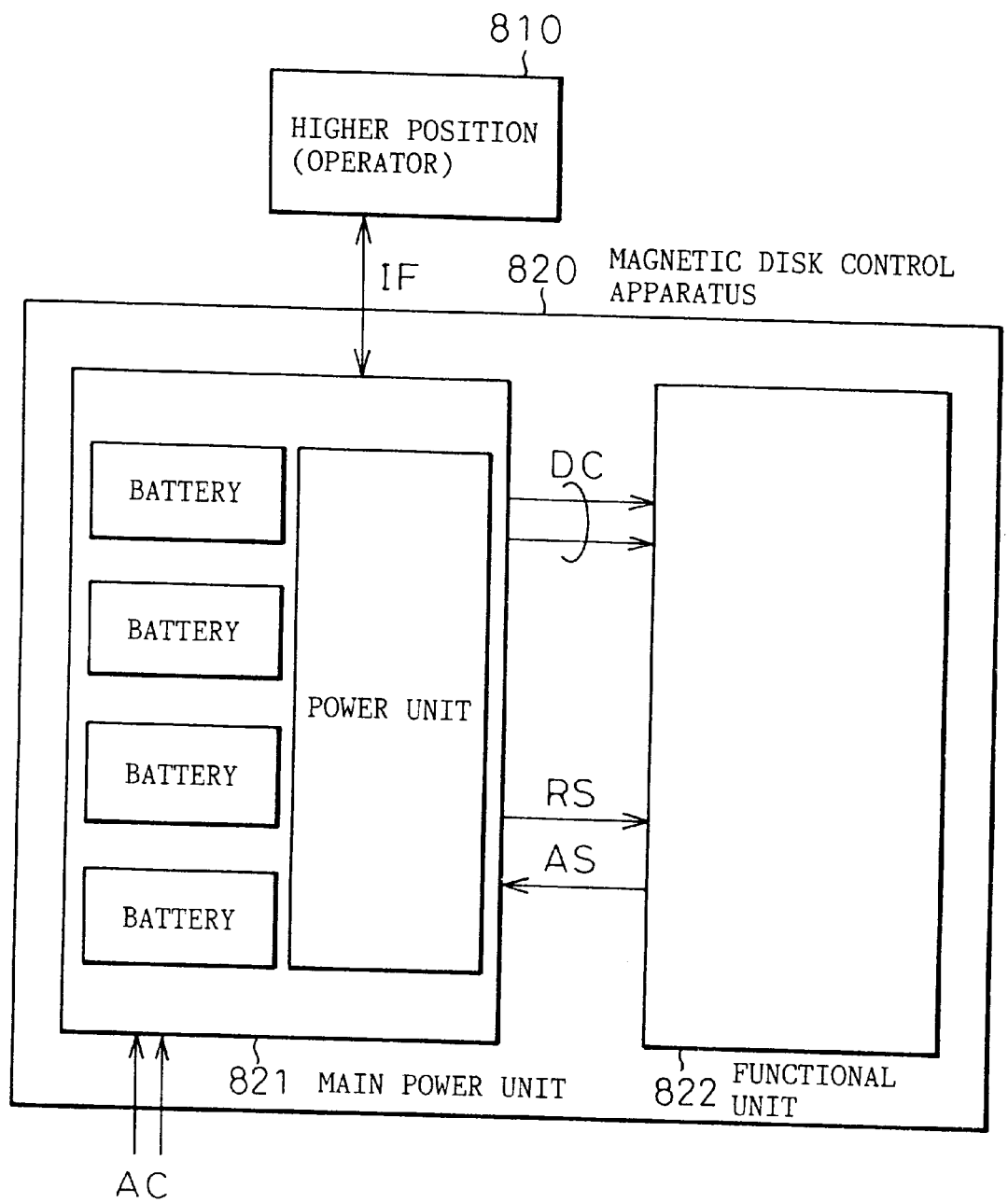
FIG. 52 is a basic structural view of a magnetic disk control apparatus.

FIG. 52 is a basic structural view of a file control system, in particular, a structural view of key portions of a magnetic disk control apparatus. As mentioned earlier, the magnetic disk control apparatus is basically comprised of a main power unit 821 and a functional unit 822. The main power unit 821 is comprised of a power unit for converting AC voltage to DC voltage and supplying the same to the functional unit and battery units for providing back-up during power failures. Further, the functional unit 822 is mainly comprised of drive modules, not shown. In the figure, IF is a power control interface between the higher apparatus 810 and a power unit 821, RS is a power cut-off request signal sent out from the main power unit to the functional unit when the batteries are being used, and AS is a power cut-off authorization signal sent from the functional unit to the main power unit.

As explained below, in such a file control system, when starting up the system, usually power is input or cut off to or from all the units at one time from the higher apparatus or an operator from a remote location. On the other hand, during maintenance and inspection of the system, it is supposed to be possible to cut off the power for individual units.

Figure 53:
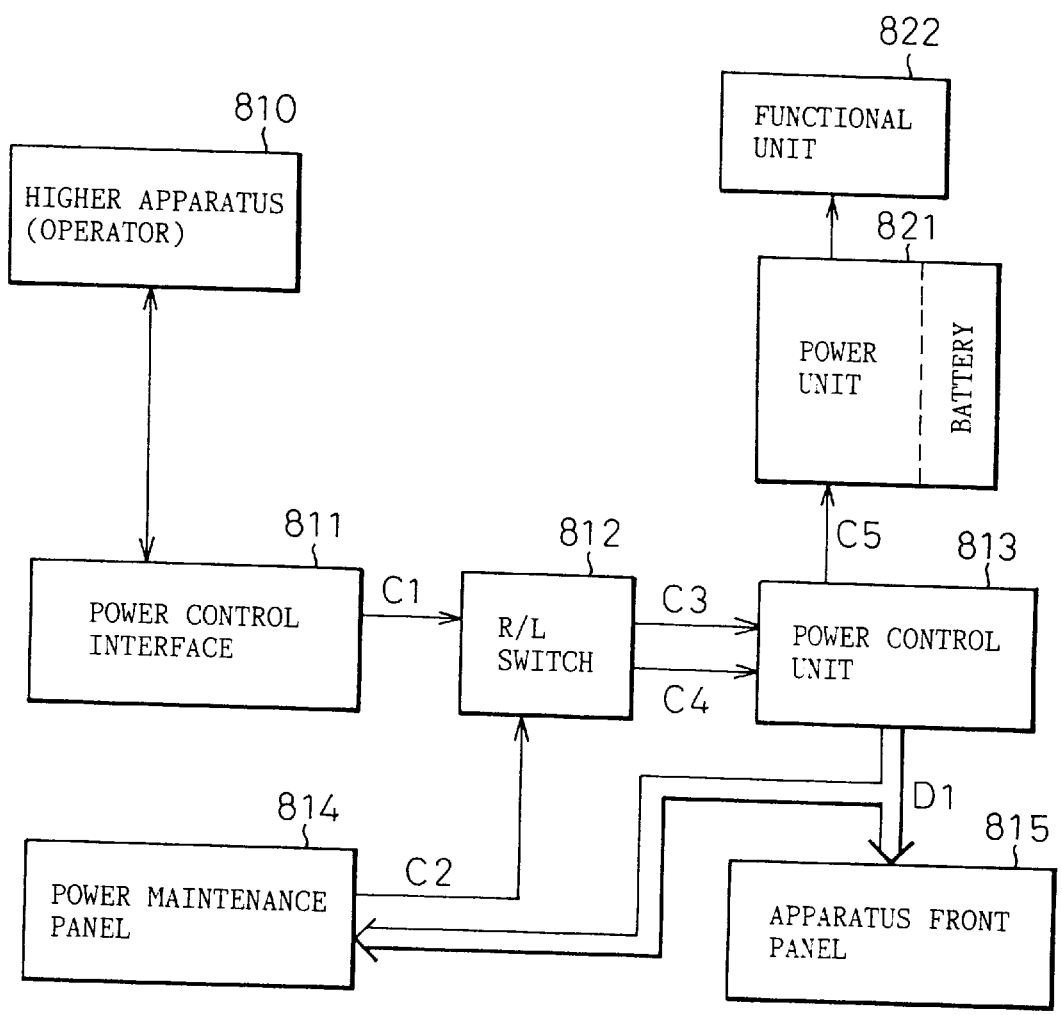
FIG. 53 is a basic structural view of the area around a power supply in FIG. 52.

FIG. 53 is a structural view of key portions of the area around the power supply in the system of FIG. 52. In the figure, 811, as mentioned earlier, is the power control interface between the higher apparatus 810 and the power unit, 812 is an R/L switch for switching between REMOTE and LOCAL, 813 is a power control unit for inputting and cutting off power, 814 is a power maintenance panel with various switches, and 815 is an apparatus front panel with various switches for the system.

In the figure, C1 is a power-on signal from the power control interface 811, and C2 is a power-on signal from the power maintenance panel. C3 is an R/L signal from the R/L switch 812, and C4 is a power-on signal. The signals C3 and C4 are input to the power control unit 813, while the power input instruction signal C5 is sent to the power unit 821. As a result, the main power unit 821 can supply power to the functional unit 822. Note that D1 is a data bus for data sent out from the power control unit 13 to the panels 14 and 15.

In this case, when instructing the input of power from a higher apparatus, the R/L switch 812 must be at the "REMOTE" side. On the other hand, when instructing the input of power for individual units, the R/L switch 812 must be at the "LOCAL" side.

Figure 54:
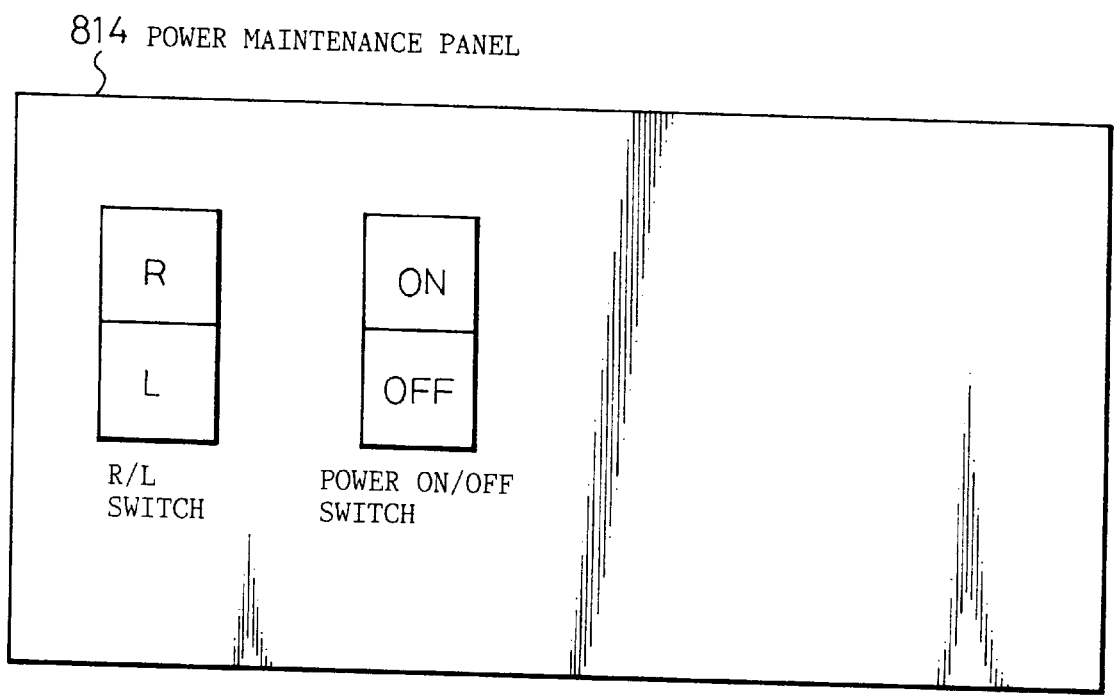
FIG. 54 is a basic structural view of a conventional power maintenance display panel.

FIG. 54 is a structural view of key portions of a conventional power maintenance panel. As shown in the figure, this is provided with an R/L switch for switching between "REMOTE" and "LOCAL" and an on/off switch for inputting and cutting off power. Usually, the R/L switch is at the "REMOTE" side to enable remote input of power to all units all at once. At the time of individual maintenance and inspection of units, the R/L switch is switched to the "LOCAL" side to enable individual cut-off of power.

Figure 55:
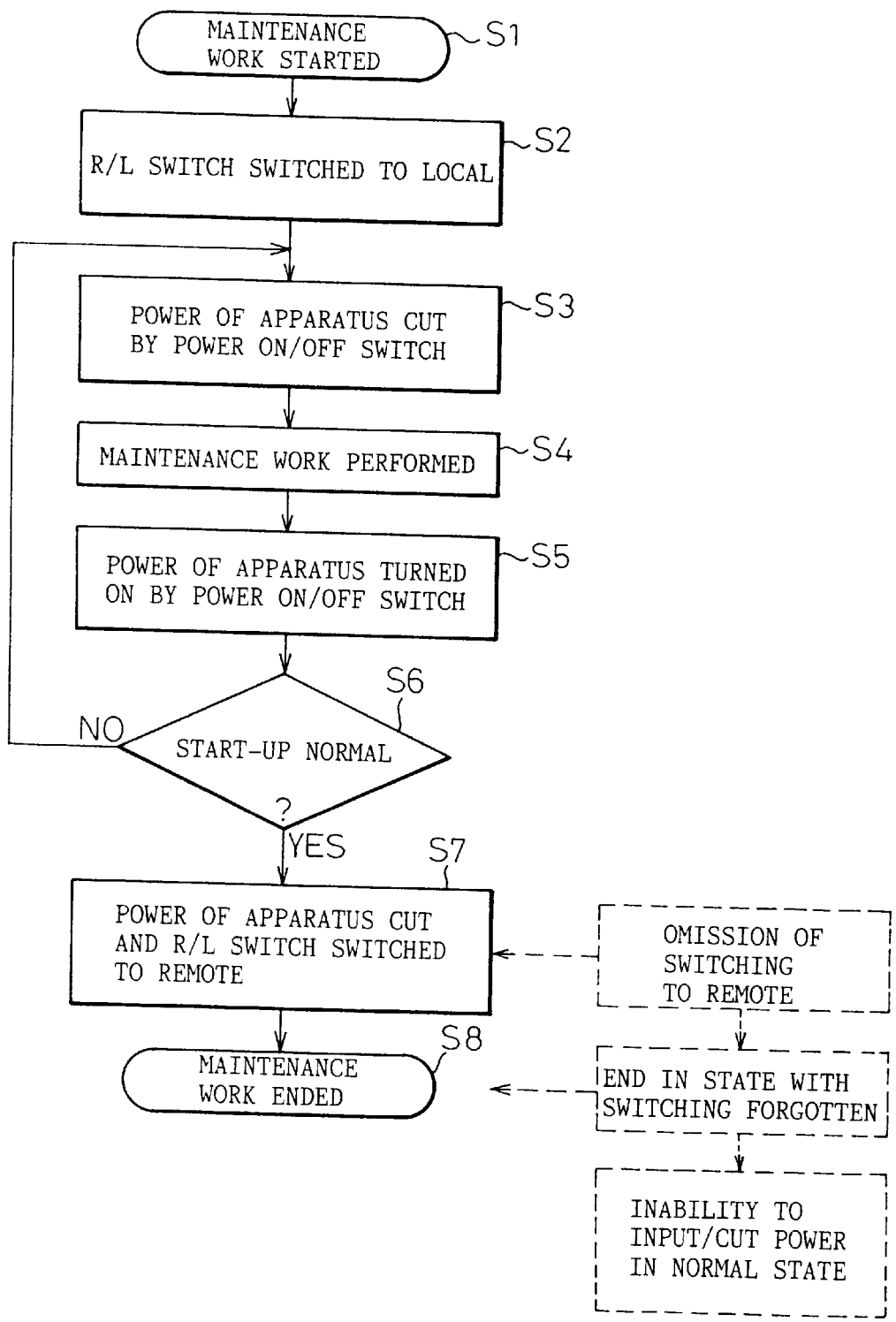
FIG. 55 is a flow chart of the processing of maintenance work in FIG. 54.

FIG. 55 is a flow chart of a conventional maintenance routine. As mentioned earlier, the power is normally input to and cut off from apparatus by the higher apparatus 810 through a power control interface 811. That is, the R/L switch 812 is supposed to be at the "REMOTE" side and the power input or cut off by the power on/off switch. Therefore, the operator can input and cut off the power of the apparatus from a remote location.

On the other hand, when starting the maintenance work on the apparatus (S1), the maintenance worker switches the R/L switch to the "LOCAL" side once (S2) and uses the power on/off switch to cut off the power (S3). This is to prevent the power from being input to the apparatus mistakenly from a remote location during the maintenance work. The worker performs the maintenance work (S4) and when the predetermined maintenance work is finished, uses the power on/off switch to input power to the apparatus (S5) and judges if the apparatus starts up normally (S6). When operating normally, he then cuts off the power to the apparatus and switches the R/L switch to the "REMOTE" side to restore the apparatus to its normal state, which completes the maintenance work (S8).

When finishing the maintenance work such as at the above-mentioned step S8, the maintenance worker is supposed to switch the R/L switch to the "REMOTE" side. However, the maintenance worker sometimes forgets this procedure, in which case he ends the maintenance work leaving the R/L switch at the "LOCAL" side. Accordingly, since the R/L switch is not at the "REMOTE" side, when next trying to input power from a remote location, the power cannot be input to that apparatus.

The present invention has as its object to enable the reliable prevention of omission of switching of the R/L switch at the time of the end of the maintenance work.

Figure 50:
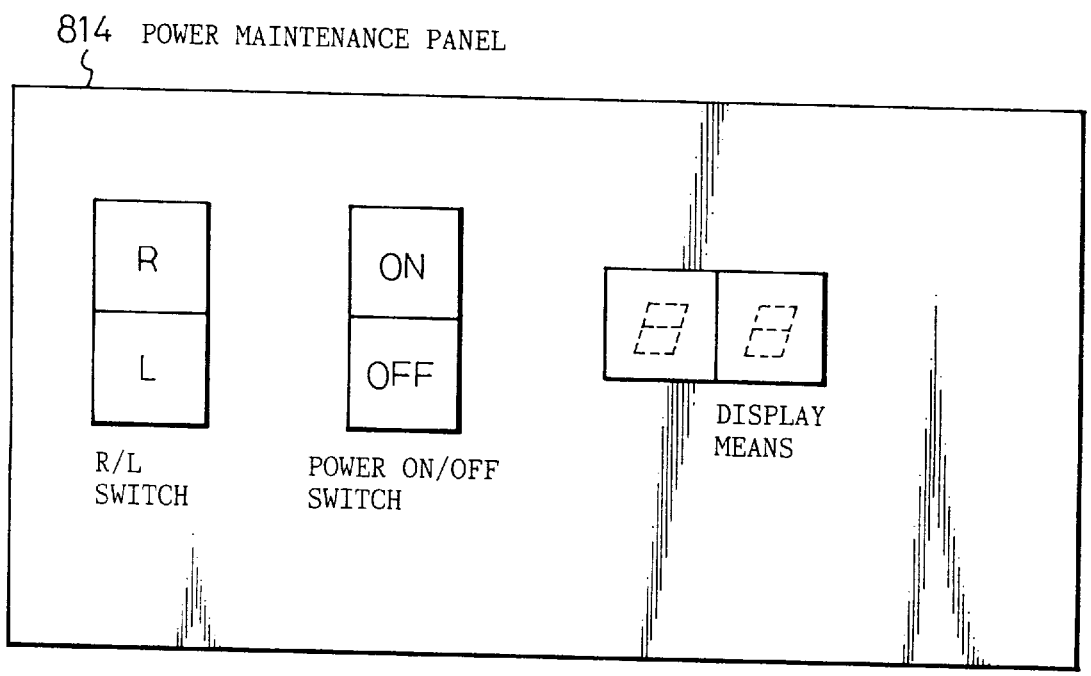
FIG. 50 is a basic structural view of a power maintenance display panel according to the present invention.

FIG. 50 is a structural view of key portions of the power maintenance panel according to the present invention. The present invention provides a magnetic disk control apparatus in a file control system in which provision is made, on a power maintenance panel of the system, of:

a power on/off switch which is operated manually at the time of maintenance work or controlled by a higher apparatus through a power control interface so as to input or cut off power, an R/L switch for switching between a side enabling remote input and cut-off of power (REMOTE) and a side enabling local input and cut-off of power (LOCAL), and a display means for displaying the state of the R/L switch, the R/L switch being switched to the "LOCAL" side, then the power on/off switch being used to cut off the power during maintenance work on the apparatus, then, after the end of the maintenance work, the R/L switch being switched to the "REMOTE" side and this being displayed on the display means.

In the present invention, provision is made of a display means for displaying the state of the R/L switch on the power maintenance panel. The power control unit 813 is provided with a means enabling detection of the state of the R/L switch, that is, if it is at the "REMOTE" side or the "LOCAL" side. When the "LOCAL" side, that state is displayed on the display means, whereby the maintenance worker is alerted to change it to the "REMOTE" side.

Figure 51:
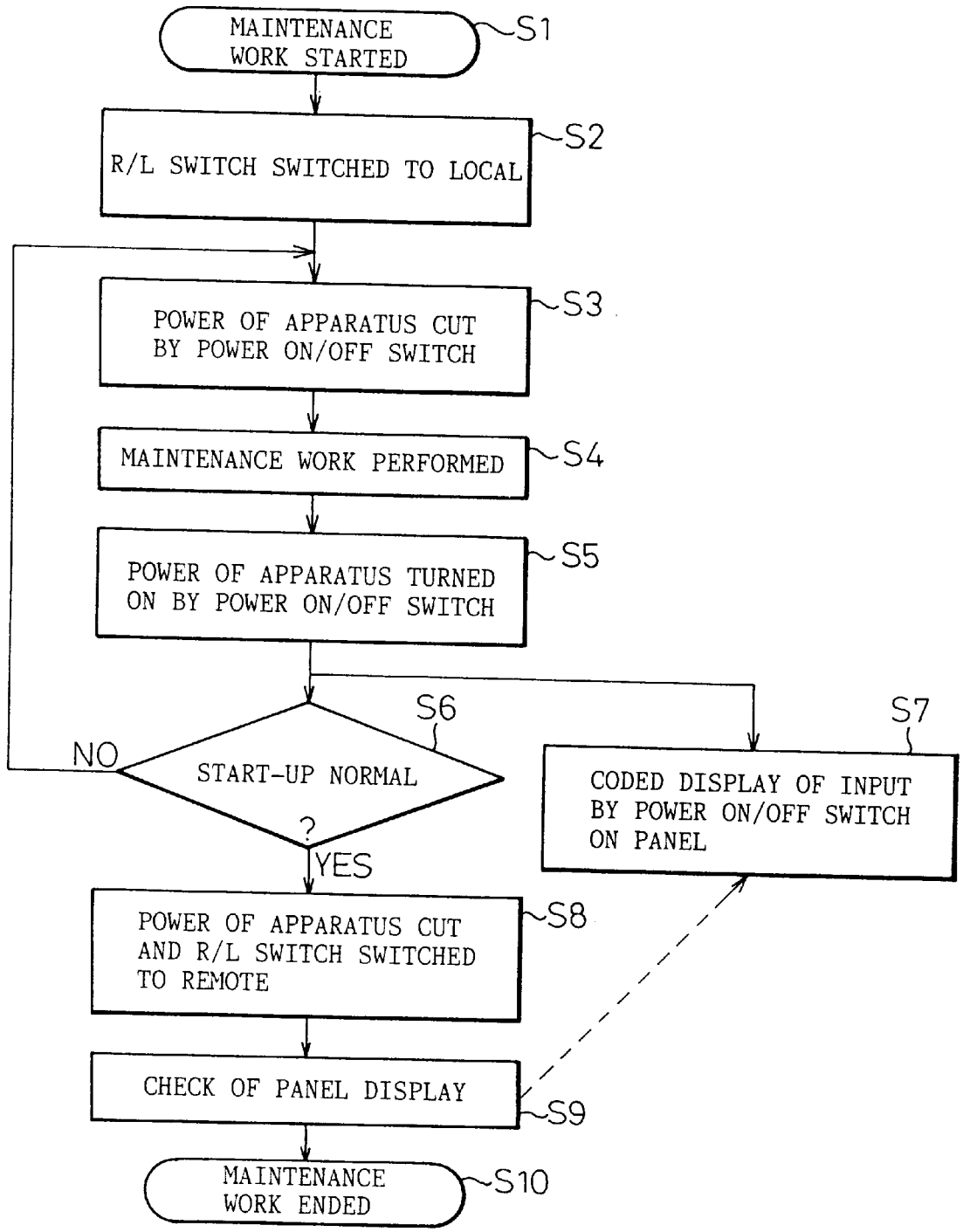
FIG. 51 is a flow chart of the processing of maintenance work in FIG. 50.

FIG. 51 is a flow chart of the processing routine of maintenance work of the present invention. Steps S1 to S6 are the same as in the past routine shown in FIG. 55. That is, when starting the maintenance work of the apparatus (S1), the maintenance worker switches the R/L switch of the power maintenance panel to the "LOCAL" side (S2) and cuts off the power by the power on/off switch (S3). Then, he performs the maintenance work (S4). When the predetermined maintenance work is finished, he turns on the power of the apparatus by the power on/off switch (S5) and judges if the apparatus starts up normally or not (S6). The fact that the power of the apparatus has been turned on by the power on/off switch at step S5 is displayed by a code, for example, on the display means of the power maintenance panel (S7).

If the maintenance worker can confirm at step S6 that the apparatus is starting up normally, he cuts the power of the apparatus, switches the R/L switch to the "REMOTE" side (S8), checks the display on the power maintenance panel (S9), and ends the maintenance work (S10).

In this case, the power control unit 813 shown in FIG. 53 judges the state of the R/L switch 812. When it is the "LOCAL" state, that is displayed on the display means. The maintenance worker therefore knows that the state is still the "LOCAL" state and switches the R/L switch to the "REMOTE" state. When the internal power control unit 813 detects that the state has become the "REMOTE" state, the display means is instructed to display a code. Note that the method of display in the display means may be any suitable method, such as "00" when switched to the "REMOTE" state and "11" when switched to the "LOCAL" state.

Figure 56:
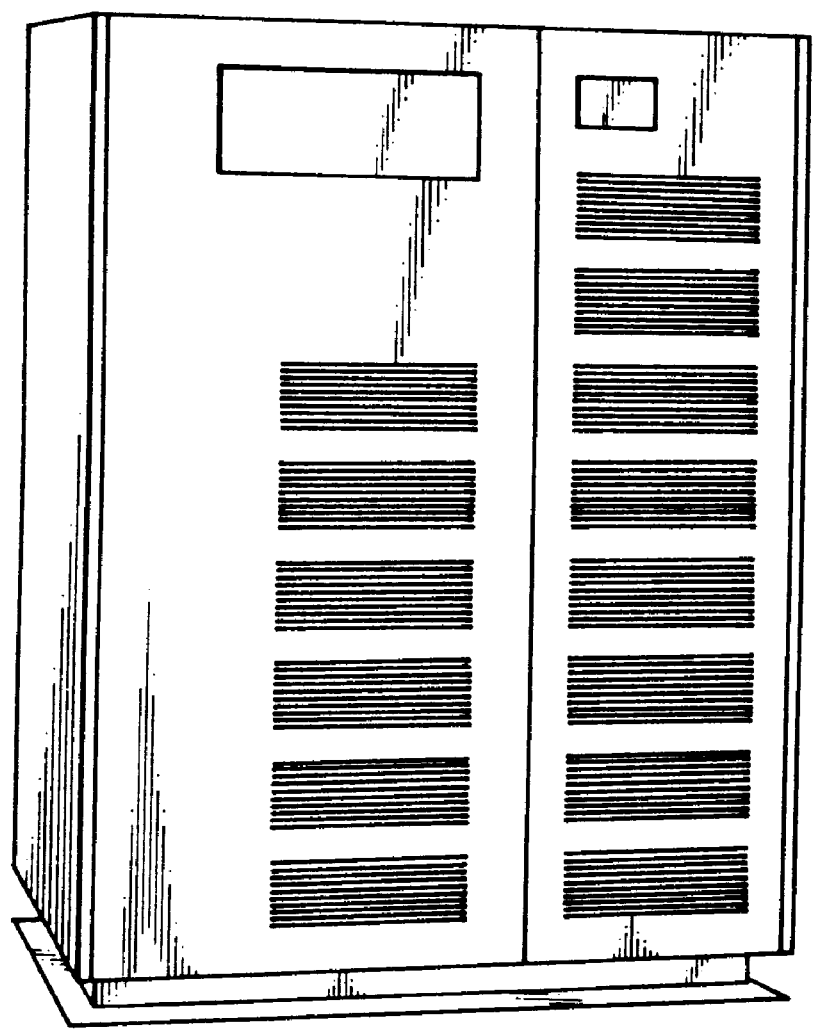
FIG. 56 is a perspective view of the exterior of a magnetic disk apparatus to which the present invention is applied.

FIG. 56 is a perspective view of the exterior of a magnetic disk apparatus to which the present invention is applied.

The results of the routine explained in FIG. 51 are displayed on a display means of the power maintenance panel 814 shown in FIG. 50. Further, the power maintenance panel is provided at the top of the front panel of FIG. 56.

As explained above, the maintenance panel display of the present invention enables the state of the R/L switch to be understood at a glance at the time of the end of the maintenance work, so it is possible to reduce work errors. Further, when power cannot be input from the higher apparatus, the reason why the power cannot be input can be immediately found and the maintenance time shortened.

CAPABILITY OF EXPLOITATION IN INDUSTRY

A magnetic disk apparatus used as a subsystem of a medium-sized computer system used in offices etc., according to the present invention, is provided with separate individual back-up batteries for the systems of the director units and magnetic disk modules and the power is supplied and controlled in accordance with the operating states of the director units, so it is possible to make the back-up batteries more compact and thereby possible to provide a magnetic disk apparatus which is compact and higher in density and satisfies fire prevention laws as well, thereby greatly increasing the capability of utilization in industry.

I claim:

1. A method for activating a magnetic disk apparatus having a plurality of magnetic disk modules, said method comprising the steps of:

dividing the plurality of magnetic disk modules into at least three groups;

activating a first set of at least two groups of said at least three groups by inputting corresponding rush currents to said first set of at least two groups so that activation times of said at least two groups of said first set are shifted by a first predetermined time and are overlapped; and activating a remainder of said at least three groups by inputting corresponding rush currents to said remainder upon completion of activation of said first set of at least two groups.

2. The method as in claim 1 wherein each of said at least three groups has the same number of the magnetic disk modules.

3. The method as in claim 1 wherein each of said at least three groups includes a mutually different number of the magnetic disk modules.

4. The method as in claim 1 wherein the magnetic disk apparatus includes at least four groups, further including the steps of:

dividing said remainder into a second set of at least two groups; and activating said second set of at least two groups of said at least four groups upon completion of said activation of said first set of at least two groups by inputting corresponding rush currents to said second set of at least two groups so that activation times of said at least two groups in said second set are shifted by a second predetermined time and are overlapped.

5. The method as in claim 4 wherein each of said at least four groups has the same number of the magnetic disk modules.

6. The method as in claim 4 wherein each of said at least four groups includes a mutually different number of the magnetic disk modules.

7. The method as in claim 6 wherein within said first and second sets of at least two groups, said groups are activated successively starting from a group having the greatest number of the magnetic disk modules to a group having the least number of the magnetic disk modules.

8. A method for activating a magnetic disk apparatus having a plurality of magnetic disk modules, said method comprising the steps of:

dividing the plurality of magnetic disk modules into at least two groups;

activating a first group of said at least two groups by inputting a rush current for a predetermined activation period; and successively activating a remainder of said at least two groups by inputting corresponding rush currents to said remainder so that an activation of a succeeding group is shifted approximately by half an activation period of a preceding group.

9. The method as in claim 8 wherein each of said groups has the same number of the magnetic disk modules.

10. The method as in claim 8 wherein each of said groups includes a mutually different number of the magnetic disk modules.

* * * * *